United States Patent
Futaki et al.

(10) Patent No.: US 11,765,635 B2
(45) Date of Patent: Sep. 19, 2023

(54) RADIO ACCESS NETWORK NODE, RADIO TERMINAL, CORE NETWORK NODE, AND METHOD THEREFOR

(71) Applicant: NEC CORPORATION, Tokyo (JP)

(72) Inventors: Hisashi Futaki, Tokyo (JP); Sadafuku Hayashi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/321,864

(22) PCT Filed: May 16, 2017

(86) PCT No.: PCT/JP2017/018323
§ 371 (c)(1),
(2) Date: Jan. 30, 2019

(87) PCT Pub. No.: WO2018/029933
PCT Pub. Date: Feb. 15, 2018

(65) Prior Publication Data
US 2019/0182737 A1 Jun. 13, 2019

(30) Foreign Application Priority Data
Aug. 10, 2016 (JP) ................. 2016-158281

(51) Int. Cl.
*H04W 36/14* (2009.01)
*H04W 36/00* (2009.01)
(Continued)

(52) U.S. Cl.
CPC ........... *H04W 36/14* (2013.01); *H04W 24/10* (2013.01); *H04W 36/0033* (2013.01);
(Continued)

(58) Field of Classification Search
CPC ............ H04W 24/10; H04W 36/0033; H04W 36/0038; H04W 36/0066; H04W 36/14; H04W 36/36; H04W 92/20
See application file for complete search history.

(56) References Cited

U.S. PATENT DOCUMENTS 8,553,643 B2   10/2013   Flore et al.
10,028,128 B2   7/2018   Salkintzis
(Continued)

FOREIGN PATENT DOCUMENTS

CN   101052208 A   10/2007
CN   101841824 A   9/2010
(Continued)

OTHER PUBLICATIONS

NTT Docomo, Inc. (Rapporteur), "Update of TR 38.801 (v020)", 3GPP TSG-RAN WG3 #92, R3-161442, May 23-27, 2016, Nanjing, China, 21 pages total.
(Continued)

*Primary Examiner* — Jason E Mattis
*Assistant Examiner* — Bao G Nguyen
(74) *Attorney, Agent, or Firm* — Sughrue Mion, PLLC

(57) ABSTRACT

A target RAN node (3) is configured to: receive, directly from a core network (5), core network context information about a handover of a radio terminal (1) from a first network to the second network; and control communication of the radio terminal (1) based on the core network context information. The target RAN node (3) is further configured to transfer a handover signaling message to a source RAN node on a direct interface (101) in response to receiving the core network context information. The core network context information includes at least one of flow information, slice information, and security-related information. It is thus possible, for example, to provide an inter-RAT handover
(Continued)

procedure involving transfer of handover signaling messages on a direct inter-base-station interface.

17 Claims, 43 Drawing Sheets

(51) Int. Cl.
*H04W 24/10* (2009.01)
*H04W 36/36* (2009.01)
*H04W 92/20* (2009.01)

(52) U.S. Cl.
CPC ........ *H04W 36/36* (2013.01); *H04W 36/0038* (2013.01); *H04W 36/0066* (2013.01); *H04W 92/20* (2013.01)

(56) References Cited

U.S. PATENT DOCUMENTS

| | | | |
|---|---|---|---|
| 10,644,955 | B2 | 5/2020 | Zhang et al. |
| 2007/0281697 | A1 | 12/2007 | Davis |
| 2008/0049677 | A1* | 2/2008 | Hayashi ............... H04W 36/08 370/331 |
| 2009/0016259 | A1 | 1/2009 | Zhang et al. |
| 2013/0010611 | A1* | 1/2013 | Wiemann ................ H04L 1/08 370/242 |
| 2013/0128866 | A1* | 5/2013 | Zhang ................ H04W 12/062 370/331 |
| 2014/0051443 | A1* | 2/2014 | Diachina ........... H04W 36/0022 455/436 |
| 2015/0139195 | A1 | 5/2015 | Xiao et al. |
| 2015/0215822 | A1 | 7/2015 | Won et al. |
| 2015/0229491 | A1 | 8/2015 | Solovyev et al. |
| 2015/0282021 | A1 | 10/2015 | Pao et al. |
| 2016/0057783 | A1 | 2/2016 | Rosa et al. |
| 2016/0205578 | A1* | 7/2016 | Lee ...................... H04W 36/18 455/442 |
| 2016/0353465 | A1 | 12/2016 | Vrzic et al. |
| 2017/0034749 | A1* | 2/2017 | Chandramouli .... H04L 12/4633 |
| 2017/0079059 | A1* | 3/2017 | Li ......................... H04W 16/02 |
| 2017/0086118 | A1 | 3/2017 | Vrzic |
| 2017/0164349 | A1 | 6/2017 | Zhu et al. |
| 2017/0195935 | A1 | 7/2017 | Xu et al. |
| 2017/0289019 | A1 | 10/2017 | Faccin et al. |
| 2017/0289046 | A1 | 10/2017 | Faccin et al. |
| 2017/0332295 | A1* | 11/2017 | Sunay ................... H04W 36/08 |
| 2017/0359768 | A1 | 12/2017 | Byun et al. |
| 2017/0367110 | A1* | 12/2017 | Li ..................... H04W 74/0816 |
| 2018/0014224 | A1 | 1/2018 | Cheng et al. |
| 2018/0035339 | A1 | 2/2018 | Mitsui et al. |
| 2018/0124660 | A1 | 5/2018 | Zhang et al. |
| 2018/0242304 | A1 | 8/2018 | Rong et al. |
| 2019/0021043 | A1 | 1/2019 | Youn et al. |
| 2019/0029000 | A1* | 1/2019 | Vikberg ................ H04W 76/10 |
| 2019/0098544 | A1 | 3/2019 | Han et al. |
| 2019/0150219 | A1 | 5/2019 | Wang et al. |
| 2019/0158360 | A1* | 5/2019 | Xu ........................ H04W 92/20 |
| 2019/0159027 | A1* | 5/2019 | Kuge .................... H04W 60/00 |
| 2019/0174368 | A1 | 6/2019 | Decarreau et al. |
| 2019/0174377 | A1 | 6/2019 | Decarreau et al. |
| 2019/0182733 | A1 | 6/2019 | Shimojou et al. |
| 2019/0182737 | A1 | 6/2019 | Futaki et al. |
| 2020/0305054 | A1 | 9/2020 | Zee et al. |

FOREIGN PATENT DOCUMENTS

| | | |
|---|---|---|
| CN | 102104927 A | 6/2011 |
| CN | 102215537 A | 10/2011 |
| CN | 102223669 A | 10/2011 |
| CN | 103548387 A | 1/2014 |
| CN | 104221405 A | 12/2014 |
| CN | 105376811 A | 3/2016 |
| CN | 105432135 A | 3/2016 |
| CN | 105637905 A | 6/2016 |
| CN | 109526252 A | 3/2019 |
| CN | 109565732 A | 4/2019 |
| EP | 2 870 795 A1 | 5/2015 |
| JP | 2007-214704 A | 8/2007 |
| JP | 2010-28816 A | 2/2010 |
| JP | 2011-151828 A | 8/2011 |
| JP | 2012-186865 A | 9/2012 |
| JP | 2015-527846 A | 9/2015 |
| JP | 2015-192453 A1 | 11/2015 |
| WO | 2013/033883 A1 | 3/2013 |
| WO | 2014/005653 A1 | 1/2014 |
| WO | 2014/161161 A1 | 10/2014 |
| WO | 2014161161 A1 | 10/2014 |
| WO | 2015/115761 A1 | 8/2015 |
| WO | 2015/119547 A1 | 8/2015 |
| WO | 2015119547 A1 | 8/2015 |
| WO | 2015/160329 A1 | 10/2015 |
| WO | 2015/162088 A1 | 10/2015 |
| WO | 2015162088 A1 | 10/2015 |
| WO | 2015/169387 A1 | 11/2015 |
| WO | 2015169387 A1 | 11/2015 |

OTHER PUBLICATIONS

Decision to Grant a Patent dated Jan. 7, 2020, issued by the Japanese Patent Office in counterpart Application No. 2018-533429.
Communication dated Jul. 17, 2019, from the European Patent Office in counterpart European Application No. 17839008.4.
Huawei, "Requirements and functionalities of the interface between LTE and NR", 3GPP TSG-RAN3 Meeting #92, R3-161138, Nanjing, China, May 23-27, 2016 (5 pages total).
Nokia, Alcatel-Lucent Shanghai Bell, "Interface consideration for tight LTE/NR interworking anchored to NextGen Core", 3GPP TSG-RAN WG2 Meeting #93bis, R2-162421, Dubrovnik, Croatia, Apr. 11-15, 2016 (2 pages total).
"3rd Generation Partnership Project; Technical Specification Group Services and System Aspects; 3GPP System Architecture Evolution (SAE); Security architecture (Release 13)", 3GPP TS 33.401, V13.3.0, Jun. 23, 2016, pp. 1-148 (148 pages total).
"3rd Generation Partnership Project; Technical Specification Group Radio Access Network Study on New Radio Access Technology; Radio Access Architecture and Interfaces (Release 14)", 3GPP TR 38.801, V0.2.0, Jul. 1, 2016, pp. 1-20 (20 pages total).
"3rd Generation Partnership Project; Technical Specification Group Radio Access Network; Evolved Universal Terrestrial Radio Access (EUTRA) and Evolved Universal Terrestrial Radio Access Network (E-UTRAN); Overall description; Stage 2 (Release 13)", 3GPP TS 36.300, V13.4.0, Jul. 7, 2016, pp. 1-314 (314 pages total).
Huawei, "Slice impact on mobility", 3GPP TSG-RAN WG3 95bis, R3-171789, Hangzhou, China, May 15-19, 2017 (3 pages total).
Ericsson, "Lossless Inter-RAT handover with 5GC", 3GPP TSG-RAN WG2 #97, Tdoc R2-1700877, Athens, Greece, Feb. 13-17, 2017 (4 pages total).
"3rd Generation Partnership Project; Technical Specification Group Services and System Aspects; Study on Architecture for Next Generation System (Release 14)", Jul. 2016, pp. 1-320, 3GPP TR 23.799 V0.6.0 (Jul. 2016).
"Inter-RAT handover", Huawei, May 23-27, 2016, 4 pgs, 3GPP TSG-RAN3 Meeting #92 R3-161140.
"Assignment of CP and UP network functions during an MM procedure", Samsung, Jul. 11-15, 2016, pp. 1-7, 3GPP SA WG2 Meeting #116 S2-164041.
International Search Report for PCT/JP2017/018323 dated Jun. 20, 2017 (PCT/ISA/210).
Communication dated Aug. 19, 2020, from The China National Intellectual Property Administration in English Application No. 201780048947.1.
3GPP TS 23.401 V14.0.0 (Jun. 2016), Technical Specification Group Services and System Aspects; General Packet Radio Service (GPRS) enhancements for Evolved Universal Terrestrial Radio Access Network (E-UTRAN) access (Release 14), pp. 1-374.
3GPP TS 48.018 V13.2.0 (Jun. 2016), Technical Specification Group GSM/EDGE Radio Access Network; General Packet Radio

(56) References Cited

OTHER PUBLICATIONS

Service (GPRS); Base Station System (BSS)—Serving GPRS Support Node (SGSN); BSS GPRS Protocol (BSSGP) (Release 13), pp. 1-205.
3GPP TS36.413 V13.3.0 (Jun. 2016), Technical Specification Group Radio Access Network; Evolved Universal Terrestrial Radio Access Network (E-UTRAN); S1 Application Protocol (S1AP) (Release 13), pp. 1-331.
3GPP TR23.799 V0.7.0 (Aug. 2016), Technical Specification Group Services and System Aspects; Study on Architecture for Next Generation System (Release 14), pp. 1-322.
3GPP TS25.413 V13.2.0 (Jun. 2016), Technical Specification Group Radio Access Network; UTRAN Iu interface Radio Access Network Application Part (RANAP) signalling (Release 13), pp. 1-451.
3GPP TS43.129 V13.0.0 (Dec. 2015), Technical Specification Group GSM/EDGE Radio Access Network; Packet-switched handover for GERAN A/Gb mode; Stage 2 (Release 13),pp. 1-95.
CATT, "Inter-RAT mobility in NR", R2-163472, RAN WG2 Meeting #94, China, May 23-27, 2016, pp. 1-4.
Huawei, "Inter-RAT handover", R3-161140, RAN WG3 Meeting #92, China, May 23-27, 2016.
3GPP TR 23.799, V.0.6.0 (Jul. 2016), Technical Specification Group Services and System Aspects; Study on Architecture for Next Generation System (Release 14), pp. 1-320.
INTEL, "Solution for interworking and migration", SA WG2 Meeting #116, S2-164247, Jul. 11-15, 2016, pp. 1-3.
Huawei et al: "Considerations on 5G RAN QoS framework", 3GPP TSG-RAN2 Meeting #94, R2-164267, May 22, 2016, China.
3GPP TS 38.300 V0.2.1, Technical Specification Group Radio Access Network; NR; NR and NG-RAN Overall Description; Stage 2 (Release 15), May 10, 2017, pp. 1-48.
3GPP TS 29.280 V14.0.0, Technical Specification Group Core Network and Terminals; Evolved Packet System (EPS) 3GPP Sv interface (MME to MSC, and SGSN to MSC) for SRVCC (Release 14), Mar. 22, 2017, pp. 1-23.
3GPP TR 38.801 V0.2.0 (Jun. 2016), Technical Specification Group Radio Access Network; Study on New Radio Access Technology; Radio Access Architecture and Interfaces (Release 14), pp. 1-20.
ETRI et al., "NextGen Core Architecture solution for Network Slice Instance Selection", 3GPP SA WG2 Meeting #115, S2-162551, May 23-27, 2016, China, pp. 1-5.
ZTE, "Consideration on RAN Side Network Slicing", 3GPP TSG RAN WG3 Meeting #91 bis, R3-160821, Apr. 11-15, 2016, India.
NEC, "RAN architecture impact due to Network Slicing", 3GPP TSG RAN2 #93bis, R2-162891, Apr. 11-15, 2016, Croatia.
Nokia, "Solution: Mobility Options", Apr. 11-15, 2016, SA WG2 Meeting #S2-114, S2-161625, France, pp. 1-5.
Huawei, "Slice impact on mobility", 3GPP TSG-RAN WG3 95bis, R3-171789, China, May 15-19, 2017.
NTT DOCOMO, "Solution to support a UE with simultaneous connections to multiple Network Slices", 3GPP Draft, SA WG2 Meeting #113AH, S2-161043, Feb. 18, 2016, France, pp. 1-4.
Samsung, "Inter-RAT handover with LTE", 3GPP TSG-RAN WG3#92, R3-161486, May 27, 2016, China.
NTT DOCOMO, "Update of Network Slicing Solution 1.3", 3GPP TSG-SA WG2#116, S2-163446, Jul. 5, 2016, pp. 1-8.
Nokia, Alcatel Lucent Shanghai Bell, "Update to Solution 2.3: Content Aware QoS Framework", 3GPP TSG SA WG2#115, S2-162706, May 2016, China, pp. 1-7.
Huawei, HiSilicon, "Update of Solution #1 for Key issue #1", 3GPP TSG SA WG2#114, S2-161503, Apr. 2016, France.
Huawei, "Requirements and functionalities of the interface between LTE and NR", 3GPP TSG-RAN3 Meeting #92, R3-161138, Nanjing, China, May 23-27, 2016.
Samsung, "RAN-CN interface aspects", 3GPP TSG-RAN WG3 Meeting #92, R3-161061, Nanjing, P.R., China, May 23-27, 2016.
3rd Generation Partnership Project; Technical Specification Group Radio Access Network; Evolved Universal Terrestrial Radio Access (E-UTRA) and Evolved Universal Terrestrial Radio Access Network (EUTRAN); Overall description; Stage 2 (Release 13), 3GPP TS 36.300 V13.4.0, Jun. 2016, pp. 1-314.
Nokia, Alcatel-Lucent Shanghai Bell, "Interface consideration for tight LTE/NR interworking anchored to NextGen Core", 3GPP TSG-RAN WG2 Meeting #93bis, R2-162421, Dubrovnik, Croatia, Apr. 11-15, 2016.
3rd Generation Partnership Project; Technical Specification Group Services and Systems Aspects; 3GPP System Architecture Evolution (SAE); Security architecture (Release 13), 3GPP TS 33.401 V13.3.0, Jun. 2016, pp. 1-148.
Ericsson, "Lossless Inter-RAT handover with 5GC", 3GPP TSG-RAN WG2 #97, Tdoc R2-1700877, Athens, Greece, Feb. 13-17, 2017, 1/3-4/3.
Samsung, "Assignment of CP and UP network functions during an MM procedure", SA WG2 Meeting #116, S2-163297, Jul. 11-15, 2016, Vienna, Austria, pp. 1-6.
CATT, "Control plane for support of NR standalone operation", 3GPP TSG RAN WG2 Meeting #94, R2-163468, May 23-27, 2016, Nanjing, China, pp. 1-5.
China Mobile et al., "Network Slicing Architecture and High-Level Function Definition", SA WG2 Meeting #115, S2-162365, May 23-27, 2016, Nanjing, China, pp. 1-5.
ETRI, "High-level Functional Architecture for the Network Slicing", SA WG2 Meeting #114, S2-161833, Apr. 11-15, 2016, Sophia Antipolis, France, pp. 1-4.
ZTE, "Network Slice Selection Procedure", 3GPP Draft, TSG RAN WG3 Meeting #92, R3-161107, May 22, 2016, China.
Huawei, HiSilicon, "Network slicing considerations", 3GPP TSG-RAN WG2 Meeting #93bis R2-162664, Apr. 1, 2016, Croatia.
Chinese Office Action for CN Application No. 201780048947.1 dated Feb. 19, 2021 with English Translation.
3GPP TR 23.799 V0.4.0, "Study on Architecture for Next Generation System (Release 14)", pp. 1-96, Apr. 27, 2016.
U.S. Office Action for U.S. Appl. No. 16/321,877 dated Aug. 9, 2021.
Japanese Office Action for JP Application No. 2021-025225 dated Feb. 22, 2022 with English Translation.
Ericsson, Update of QoS Interim agreements, 3GPP TSG-SA WG2#116, S2-163337, Jul. 11-15, 2016.
Chinese Office Communication for CN Application No. 201780048078.2 dated Aug. 2, 2021 with English Translation.
Yang Xiao-Long et al., Spectrum handoff model based on preemptive queuing theory in cognitive radio networks, Acta Phys. Sin. vol. 64, No. 10, Apr. 19, 2015.
Zhao Su et al., A Handover Algorithm Based on Prediction of Adjustable Threshold Hysteresis Margin in Ultra Dense Network, Journal of Electronics & Information Technology, vol. 38, No. 3, Mar. 15, 2016.
U.S. Office Action for U.S. Appl. No. 17/385,428, dated Oct. 4, 2022.
U.S. Office Action for U.S. Appl. No. 16/321,998, dated Sep. 29, 2022.
U.S. Office Action and PTO-892 for U.S. Appl. No. 16/321,998 dated Mar. 15, 2022.
JP Office Action for JP Application No. 2022-092163, dated Apr. 4, 2023 with English Translation.
Japanese Office Action for JP Application No. 2022-130339, dated Jun. 27, 2023 with English Translation.
Qualcomm Incorporated, "NR Mobility", 3GPP TSG-RAN WG3#92, R3-161343, May 27, 2016 * The number described in the document, "R2-161343" seems to be typo.
"3rd Generation Partnership Project; Technical Specification Group Radio Access Network; Evolved Universal Terrestrial Radio Access Network (E-UTRAN); X2 application protocol (X2AP) (Release 13)", 3GPP TS 36.423 V13.4.0 (Jun. 2016), Jun. 2016, 238 pages total.
ETRI, "Update the solution 6.2.1.1: Relation between PDU Flow and Service Data Flow", SA WG2 Meeting #116, S2-163520, Jul. 2016, 4 pages total.
Huawei, "NR RAN functions", 3GPP TSG-RAN3 Meeting #92, R3-161129, May 2016, 4 pages total.
Notice of Allowance dated Jul. 12, 2023 issued by the United States Patent and Trademark Office in U.S. Appl. No. 17/385,428.

(56) References Cited

OTHER PUBLICATIONS

JP Office Communication for JP Application No. 2022-167447, dated Jul. 4, 2023 with English Translation.
Huawei, Clean up of remaining FFS on Security, 3GPP TSG RAN WG3 #100 R3-183388, May 28, 2018.
Nokia (rapporteur), TS 38.413—latest agreed version (V0.1.0), 3GPP TSG RAN WG3 adhoc_R3_AH_NR_1706 R3-172260, Jun. 20, 2017.
U.S. Notice of Allowance for U.S. Appl. No. 16/321,998, dated Jul. 26, 2023.

* cited by examiner

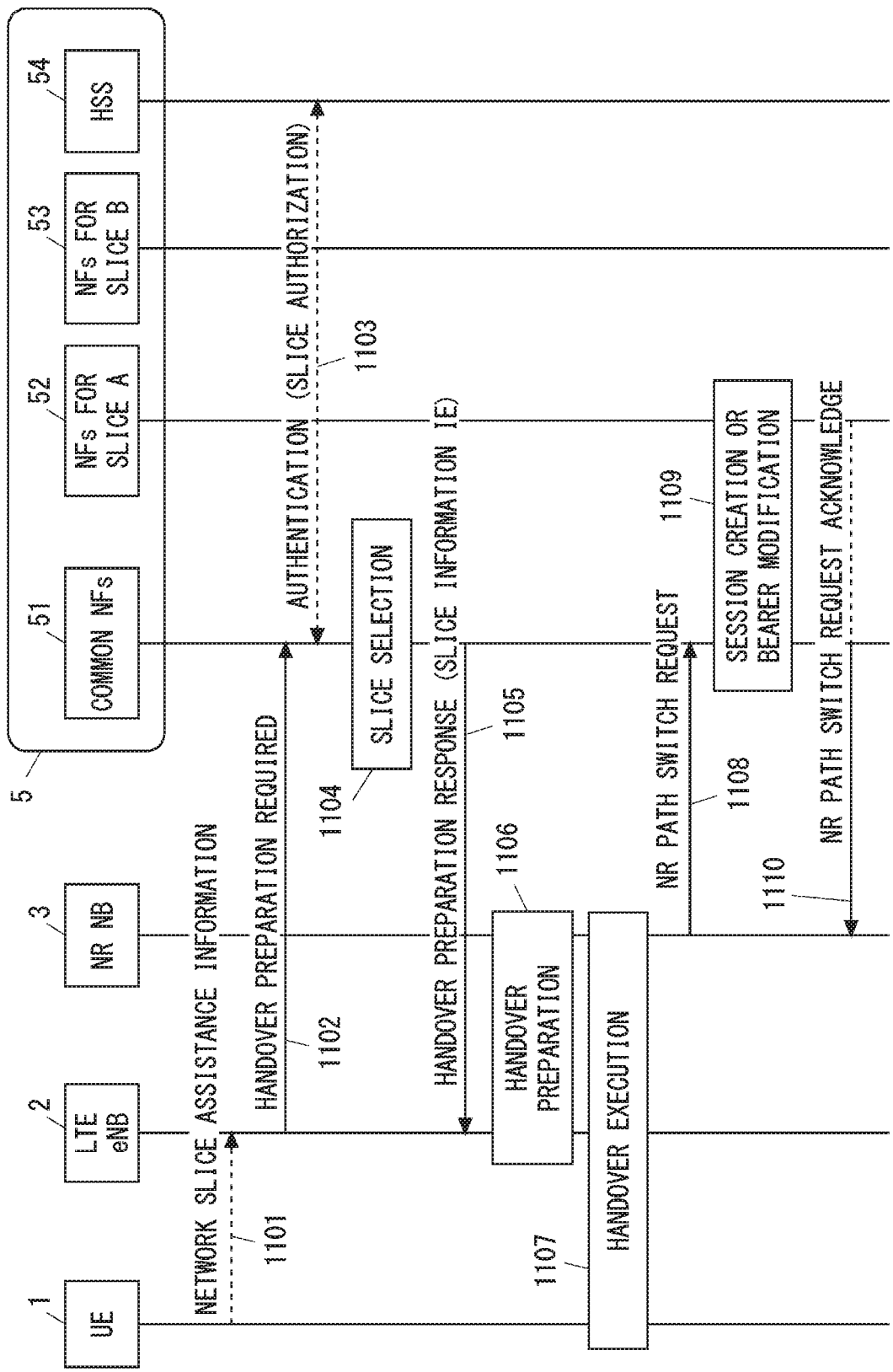

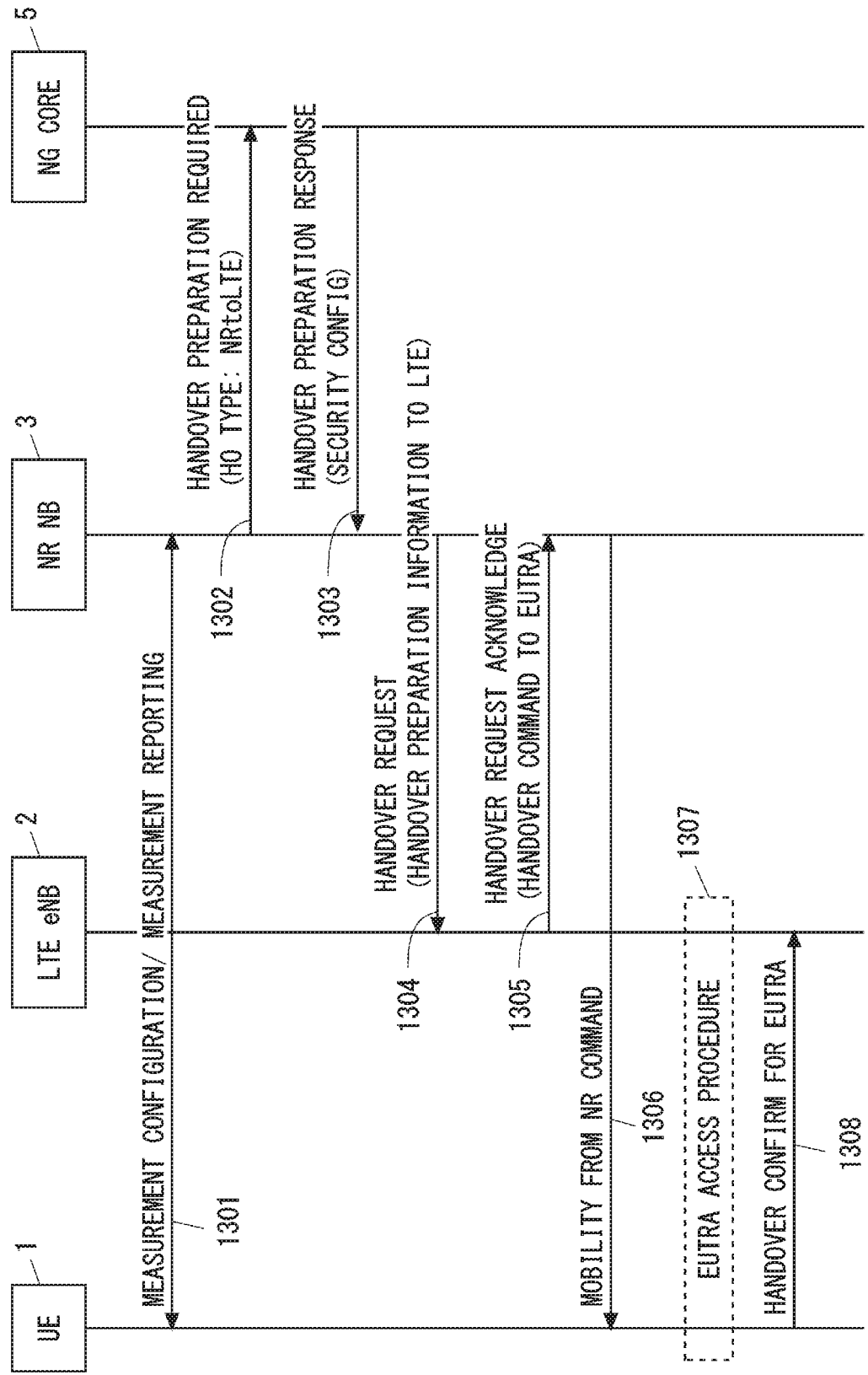

```
-- ASN1START

MobilityFromEUTRACommand ::=        SEQUENCE {
    rrc-TransactionIdentifier       RRC-TransactionIdentifier,
    criticalExtensions              CHOICE {
        c1                          CHOICE {
            mobilityFromEUTRACommand-r8     MobilityFromEUTRACommand-r8-IEs,
            mobilityFromEUTRACommand-r9     MobilityFromEUTRACommand-r9-IEs,
            spare2 NULL, spare1 NULL
        },
        criticalExtensionsFuture    SEQUENCE {}
    }
}

MobilityFromEUTRACommand-r8-IEs ::= SEQUENCE {
    cs-FallbackIndicator            BOOLEAN,
    purpose                         CHOICE{
        handover                    Handover,
        cellChangeOrder             CellChangeOrder
    },
    nonCriticalExtension            MobilityFromEUTRACommand-v8a0-IEs OPTIONAL
}
```

Fig. 18A

```
Handover ::=                        SEQUENCE {
    targetRAT-Type                      ENUMERATED {
                                            utra, geran, cdma2000-1XRTT, cdma2000-HRPD,
                                            ngutra, spare3, spare2, spare1, ...},
    targetRAT-MessageContainer          OCTET STRING,
    nas-SecurityParamFromEUTRA          OCTET STRING (SIZE (1))    OPTIONAL,   -- Cond OTHERRAN
    systemInformation                   SI-OrPSI-GERAN             OPTIONAL    -- Cond PSHO
}

-- ASN1STOP
```

Fig. 18B

HANDOVER PREPARATION REQUIRED message

| IE/Groupe Name | Presence | Range | Semantics description |
|---|---|---|---|
| Message Type | M | | |
| CCNF UE NG2AP ID | M | | UE ID used in NG2 for SM and/or MM |
| eNB UE NG2AP ID | M | | |
| Handover Type | M | | eLTE to NR over X3 |
| Cause | M | | |
| Target ID | M | | |
| Direct Forwarding Path Availability | O | | |
| SRVCC HO Indication | O | | |
| Source to Target Transparent Container | M | | "Source NR NB to Target NR NB Transparent Container". Transparent to MME and NG Core (CPF), from eNB to NR NB |
| Source to Target Transparent Container Secondary | O | | |
| .... | | | |
| PS Service Not Available | O | | |

Fig. 19

Source NR NB to Target NR NB Transparent Container

| IE/Groupe Name | Presence | Range | Semantics description/ Note |
|---|---|---|---|
| RRC Container | M | | Includes the RRC Handover Preparation Information message as defined in NR RRC |
| NG-RABs Information List | | 0..1 | |
| >NG-RABs Information Item | | 1..<maxnoof NG-RABs> | |
| >>NG-RAB ID | M | | |
| >>DL Forwarding | O | | |
| Target Cell ID | M | | CGI of NG RAN (NG-UTRAN) |
| Subscriber Profile ID for RAT/Frequency priority | O | | |
| UE Histroy Information | M | | |
| Mobility Information | O | | |
| UE Histroy Information from the UE | O | | |

Fig. 20

Source NR NB to Target NR NB Transparent Container

| IE/Groupe Name | Presence | Range | Semantics description/ Note |
|---|---|---|---|
| RRC Container | M | | Includes the RRC Handover Preparation Information message as defined in NR RRC |
| NG-RABs Information List | | 0..1 | |
| >NG-RABs Information Item | | 1..<maxnoof NG-RABs> | |
| >>NG-RAB ID | M | | |
| >>DL Forwarding | O | | |
| >>Flows Information List | | 1 | |
| >>>Flows Information Item | | 1..<maxnoof Flows> | |
| >>>>Flow ID | M | | |
| Target Cell ID | M | | CGI of NG RAN (NR) |
| ..... | | | |

Fig. 21

Source NR NB to Target NR NB Transparent Container

| IE/Groupe Name | Presence | Range | Semantics description/ Note |
|---|---|---|---|
| RRC Container | M | | Includes the RRC Handover Preparation Information message as defined in NR RRC |
| Sessions Information List | | 0..1 | |
| >PDU Sessions Information List | | 0..1 | |
| >>PDU Session ID Information Item | | 1..<maxnoof PDUsessions> | |
| >>>PDU Session ID | M | | |
| >>>DL Forwarding | O | | |
| >NG-RABs Information List | | 0..1 | |
| >>NG-RABs Information Item | | 1..<maxnoof E-RABs> | |
| >>>NG-RAB ID | M | | |
| >>>DL Forwarding | O | | |
| Target Cell ID | M | | CGI of NG RAN (NG-UTRAN) |
| ... | | | |

IRAT HANDOVER REQUEST message

| IE/Groupe Name | Presence | Range | Semantics description/ Note |
|---|---|---|---|
| Message Type | M | | |
| CCNF UE NG2AP ID | M | | UE ID used in NG2 for SM and/or MM |
| Handover Type | M | | "LTE to NR" |
| Cause | M | | |
| UE Aggregate Maximum Bit Rate | M | | |
| NG-RABs To Be Setup List | | 1 | |
| >NG-RABs To Be Setup Item IEs | | 1..<maxnoof NG-RABs> | |
| >>NG-RAB ID | M | | |
| >>Transport Layer Address | M | | |
| >>GTP-TEID | M | | To Deliver Uplink PDUs. |
| >>NG-RAB Level QoS Parameters | M | | Inculudes necessaray QoS parameters. |
| >>Data Forwarding Not Possible | O | | |
| Source to Target Transparent Container | M | | "Source NR NB to Target NR NB Transparent Container". |
| UE Security Capabilites | M | | |
| .... | | | |
| Security Context | M | | Next-Hop Chaining Count, Next-Hop NH |
| NAS Security Parameters to NG-UTRAN | C- iffrom EUTRAN | | The NR NB shall use this IE as specified in TS 33.401 |
| .... | | | |
| ProSe Authorized | O | | |

IRAT HANDOVER REQUEST message

| IE/Groupe Name | Presence | Range | Semantics description/ Note |
|---|---|---|---|
| ... | | | |
| NG-RABs To Be Setup List | | 1 | |
| >NG-RABs To Be Setup Item IEs | | 1..<maxnoof NG-RABs> | |
| >>NG-RAB ID | M | | |
| >>Flows Information List | | 0..1 | |
| >>>Flows Information Item | | 1..<maxnoof Flows> | |
| >>>>Flow ID | M | | |
| >>Transport Layer Address | M | | To Deliver Uplink PDUs. |
| >>GTP-TEID | M | | To Deliver Uplink PDUs. |
| >>NG-RAB Level QoS Parameters | M | | Inculudes necessaray QoS parameters. |
| >>Data Forwarding Not Possible | O | | |
| ... | | | |

IRAT HANDOVER REQUEST message

| IE/Groupe Name | Presence | Range | Semantics description/ Note |
|---|---|---|---|
| ... | | | |
| Session To Be Setup List | | 1 | |
| >PDU Sessions Information List | | 0..1 | |
| >>PDU Session ID Information Item | | 1..<maxnoof PDUsessions> | |
| >>>PDU Session ID | M | | |
| >>>Transport Layer Address | M | | |
| >>>Session Endpoint ID | M | | GTP-TEID, GRE-TEID, or NF ID |
| >>>Slice Information | M | | |
| >>>PDU Session Level QoS Parameters | M | | |
| >>>Data Forwarding Not Possible | O | | |
| >NG-RABs To Be Setup List | | 0..1 | |
| >>NG-RABs To Be Setup Item IEs | | 1..<maxnoof NG-RABs> | |
| >>>NG-RAB ID | M | | |
| >>>Transport Layer Address | M | | |
| >>>GTP-TEID | M | | To Deliver Uplink PDUs. |
| >>>NG-RAB Level QoS Parameters | M | | Inculudes necessaray QoS parameters. |
| >>>Data Forwarding Not Possible | O | | |
| ... | | | |

Slice Information

| IE/Groupe Name | Presence | Range | Semantics description/ Note |
|---|---|---|---|
| Slice Information | | | |
| >Network Slice Instance ID | M | | |
| >Network Function ID | M | | One or some of DCN ID, SCNF ID, SUNF ID, CPF ID, UPF ID, Gateway ID, DNN, etc. If some, maybe "Network Function ID List". |
| >Multi-Dimensional Descriptor | O | | |
| >>Slice Type | M | | E.g., Service Category, Use case{eMBB, URLLC, mMTC}, ... |
| >>Tenant ID | M | | E.g., Use case, Subscription group{home, roaming}, ... |
| >Mobility Class | O | {high mobility, low mobility, No mobility, ...} | |
| >Session Class | O | {Session pre-setup, Session post-setup, No PDU session, ...} | |

Fig. 26

Session Endpoint ID

| IE/Groupe Name | Presence | Range | Semantics description/ Note |
|---|---|---|---|
| *CHOICE Session Endpoint ID* | M | | |
| >GTP | M | | |
| >>GTP-TEID | M | | |
| >GRE | | | |
| >>GRE-TEID | M | | |
| >UP Network Function ID | M | | |
| >>Network Function ID | | | One or some of DCN ID, CUNF ID, SUNF ID, UPF ID, Gateway ID, DNN, TUPF ID, etc. If more than one, "UP Network Function ID List" used. |

Fig. 27

NR HANDOVER COMMAND message

| IE/Groupe Name | Presence | Range | Semantics description/ Note |
|---|---|---|---|
| Message Type | M | | |
| Old eNB UE X3AP ID | M | | Allocated at the source eNB |
| New NR NB UE X3AP ID | M | | Allocated at the target NR NB (gNB) |
| NG-RABs Admitted List | | 1 | |
| >NG-RABs Admitted Item IEs | | 1..<maxnoof NG-RABs> | |
| >>NG-RAB ID | M | | |
| >>UL GTP-TEID | O | | Identifies the X3 transport bearer used for forwarding of UL PDUs |
| >>DL GTP-TEID | O | | Identifies the X3 transport bearer used for forwarding of DL PDUs |
| NG-RABs Not Admitted List | O | | A value for *NG-RAB ID* shall only be present once in *NG-RABs Admitted List* IE and *NG-RABs Not Admitted List* IE. |
| Target to Source Transparent Container | M | | "Target NR NB to Source NR NB Transparent Container". |
| .... | | | |

Fig. 28

Target to Source Transparent Container

| IE/Groupe Name | Presence | Range | IE type and reference | Semantics description/ Note |
|---|---|---|---|---|
| RRC Container | M | | OCTET STRING | Includes the RRC NG-UTRA Handover Command message as defined in NR RRC |

Fig. 29

HANDOVER PREPARATION REQUIRED message

| IE/Groupe Name | Presence | Range | Semantics description |
|---|---|---|---|
| Message Type | M | | |
| CCNF UE NG2AP ID | M | | |
| eNB UE NG2AP ID | M | | |
| Handover Type | M | | eLTE to NR over X3 |
| Cause | M | | |
| Target ID | M | | |
| Direct Forwarding Path Availability | O | | |
| SRVCC HO Indication | O | | |
| ..... | | | |
| PS Service Not Available | O | | |

Fig. 30

HANDOVER PREPARATION RESPONSE message

| IE/Groupe Name | Presence | Range | Semantics description/ Note |
|---|---|---|---|
| Message Type | M | | |
| CCNF UE NG2AP ID | M | | |
| eNB UE NG2AP ID | M | | |
| Handover Type | M | | eLTE to NR over X3 |
| Target ID | M | | This IE identifies the target for the handover. The target ID may be, e.g., the target Global eNB-ID (for intra SAE/LTE), the RNC-ID (for SAE/LTE-UMTS handover) or the Cell Global ID of the handover target (in case of SAE/LTE to GERAN A/Gb mode handover). |
| NG Core Context | C-ifto NGUTRAN | | Includes the NG Core Information, e.g., Slice Information, Flow Information (or PDU Session Information), transparent to eNB. |
| .... | | | |

Fig. 31

NG Core Context

| IE/Groupe Name | Presence | Range | Semantics description/Note |
|---|---|---|---|
| NG Core Context | | | |
| >NAS Security Parameters to NG-UTRAN | M | | The target NR NB shall use this IE as specified in TS 33.401, if the incoming handover from E-UTRAN accepted. |
| >Slice information | O | | This IE identifies the information applicable to the Network Slicing. The target NR NB shall use this IE at the NNSF. |
| >Flow information | O | | This IE identifies the informaion applicable to the Flow based packet transmission. The target NR NB shall use this IE at the PDU session establishment. |
| >..... | | | |

Fig. 32

Flow Information

| IE/Groupe Name | Presence | Range | Semantics description/ Note |
|---|---|---|---|
| Flow Information | | | |
| >PDU Session Information List | | 1..<maxnoof PDUsessions> | |
| >>PDU Session ID | M | | |
| >>Transport Layer Address | M | | |
| >>Session Endpoint ID | M | | |
| >>NE-RAB ID | M | | |
| >>.... | | | |

Fig. 33

HANDOVER REQUEST message

| IE/Groupe Name | Presence | Range | Semantics description/ Note |
|---|---|---|---|
| Message Type | M | | |
| Old eNB UE X3AP ID | M | | Allocated at the source eNB |
| Cause | M | | |
| Target Cell ID | M | | |
| GUCNFI | M | | Globally Unique CNF ID |
| NG Core Context | M | | Includes the NG Core Information, e.g., Slice Information, Flow Information (or PDU Session Information), transparent to eNB. |
| UE Context Information | | 1 | |
| .... | | | |

UE Context Information

| IE/Groupe Name | Presence | Range | Semantics description/ Note |
|---|---|---|---|
| UE Context Information | | | |
| >CCNF UE NG2AP ID | M | 1 | Allocated at the CCNF |
| >UE Security Capabilities | M | | |
| >AS Security Information | M | | |
| >UE Aggregated Maximum Bit Rate | M | | |
| >Subscriber Profile ID for RAT/ Frequency priority | O | | |
| >NE-RABs To Be Setup List | | 1..<maxnoof Bearers> | |
| >>NE-RABs To Be Setup Item | | 1 | |
| >>>NE-RAB ID | M | | |
| >>>NE-RAB Level QoS Parameters | M | | Includes necessary QoS parameters |
| >>>DL Forwarding | O | | |
| >>>UL Tunnel Endpoint | M | | UPF (e.g., Edge GW) endpoint of the NG2 transport bearer. For delivery of UL PDUs. (Either GTP or GRE tunnel) |
| >>>Bearer Type | O | | "ENUMERATED (non-IP, ...)" |
| >RRC Context | M | | Includes the RRC handover Preparation Information message as defined in RRC. |
| >Handover Restriction List | O | | |
| >Location Reporting Information | O | | Includes the necessary parameters for location reporting |
| ... | | | |

HANDOVER REQUEST ACKNOWLEDGE message

| IE/Groupe Name | Presence | Range | Semantics description/ Note |
|---|---|---|---|
| Message Type | M | | |
| Old eNB UE X3AP ID | M | | Allocated at the source eNB |
| New NR NB UE X3AP ID | M | | Allocated at the target NR NB |
| NE-RABs Admitted List | | 1 | |
| >NE-RABs Admitted Item | | 1..<maxnoof Bearers> | |
| >>NE-RAB ID | M | | |
| >>UL GTP Tunnel Endpoint | O | | Identifies the X3 transport bearer used for forwarding of UL PDUs |
| >>DL GTP Tunnel Endpoint | O | | Identifies the X3 transport bearer used for forwarding of DL PDUs |
| NE-RABs Not Admitted List | O | | A value for NE-RAB ID shall only be present once in NE-RABs Admitted List IE and NE-RABs Not Admitted List IE. |
| Target to Source Transparent Container | M | | Includes the RRC NG-UTRA Handover Command message as defined in RRC. |
| ... | | | |

Fig. 36

RADIO ACCESS NETWORK NODE, RADIO TERMINAL, CORE NETWORK NODE, AND METHOD THEREFOR

CROSS REFERENCE TO RELATED APPLICATIONS

This application is a National Stage of International Application No. PCT/JP2017/018323 filed May 16, 2017, claiming priority based on Japanese Patent Application No. 2016-158281 filed Aug. 10, 2016, the disclosure of which is incorporated herein in its entirety by reference.

TECHNICAL FIELD

The present disclosure relates to a radio communication system and, in particular, to handover of a radio terminal between different Radio Access Technologies (RATs).

BACKGROUND ART

The 3rd Generation Partnership Project (3GPP) has started to work on the standardization for the fifth generation mobile communication system (5G), i.e., 3GPP Release 14, in 2016 to make 5G a commercial reality in 2020 (see Non-patent Literature 1). 5G is expected to be realized by continuous enhancement/evolution of LTE and LTE-Advanced and an innovative enhancement/evolution by an introduction of a new 5G air interface (i.e., a new Radio Access Technology (RAT)). The new RAT supports, for example, frequency bands higher than the frequency bands (e.g., 6 GHz or lower) supported by LTE/LTE-Advanced and its continuous evolution. For example, the new RAT supports centimeter-wave bands (10 GHz or higher) and millimeter-wave bands (30 GHz or higher).

In this specification, the fifth generation mobile communication system is also referred to as a Next Generation (NextGen) System (NG System). The new RAT for the NG System is referred to as a New Radio (NR), a 5G RAT, or a NG RAT. A new Radio Access Network (RAN) and a core network for the NG System are referred to as a NextGen RAN (NG RAN) and a NextGen Core (NG Core), respectively. A radio terminal (i.e., User Equipment (UE)) that is connected to the NG System is referred to as NextGen UE (NG UE). Official names for RATs, UEs, radio access networks, core networks, network entities (or nodes), protocol layers, etc. for the NG System will be determined in the future as the standardization work progresses.

The term "LTE" used in this specification includes enhancement/evolution of LTE and LTE-Advanced to provide interworking with the NG System, unless otherwise specified. The enhancement/evolution of LTE and LTE-Advanced for the interworking with the NG System is also referred to as LTE-Advanced Pro, LTE+, or enhanced LTE (eLTE). Further, terms related to LTE networks and logical entities used in this specification, such as "Evolved Packet Core (EPC)", "Mobility Management Entity (MME)", "Serving Gateway (S-GW)", and "Packet Data Network (PDN) Gateway (P-GW))", include their enhancement/evolution to provide interworking with the NG System, unless otherwise specified. Enhanced EPC, enhanced MME, enhanced S-GW, and enhanced P-GW are also referred to, for example, as enhanced EPC (eEPC), enhanced MME (eMME), enhanced S-GW (eS-GW), and enhanced P-GW (eP-GW), respectively.

In LTE and LTE-Advanced, for achieving Quality of Service (QoS) and packet routing, a bearer per QoS class and per PDN connection is used in both a RAN (i.e., an Evolved Universal Terrestrial RAN) and a core network (i.e., an Evolved Packet core (EPC)). That is, in the Bearer-based QoS (or per-bearer QoS) concept, one or more Evolved Packet System (EPS) bearers are configured between a UE and a P-GW in an EPC, and a plurality of Service Data Flows (SDFs) having the same QoS class are transferred through one EPS bearer satisfying this QoS. A SDF is one or more packet flows that match an SDF template (i.e., packet filters) based on a Policy and Charging Control (PCC) rule. Further, each packet to be sent through an EPS bearer for packet routing contains information for identifying which bearer (i.e., a General Packet Radio Service (GPRS) Tunneling Protocol (GTP) tunnel) this packet is associated with.

In contrast, with regard to the NG System, it has been suggested that although radio bearers may be used in the NG RAN, no bearers are used in the NG Core or in the interface between the NG RAN and the NG Core (see Non-patent Literature 1). Specifically, PDU flows are defined instead of an EPS bearer, and one or more SDFs are mapped to one or more PDU flows. A PDU flow between an NG UE and a user-plane terminating entity in an NG Core (i.e., an entity corresponding to a P-GW in the EPC) corresponds to an EPS bearer in the EPS Bearer-based QoS concept. That is, the NG System adopts the Flow-based QoS (or per-flow QoS) concept instead of the Bearer-based QoS concept. In the Flow-based QoS concept, QoS is handled per PDU flow. Note that, association between a UE and a data network is referred to as a "PDU session". The term "PDU session" corresponds to the term "PDN connection" in LTE and LTE-Advanced. A plurality of PDU flows can be configured in one PDU session.

In this specification, a system that configures an end-to-end bearer (e.g., an EPS bearer) between a UE and an edge node (e.g., a P-GW) in a core network and adopts the Bearer-based QoS concept, such as the LTE and LTE-Advanced system, is referred to as a "bearer-based system" or a "bearer-based network". In contrast, a system that does not use any bearer in a core network or in an interface between the core network and a RAN and adopts the Flow-based QoS concept, such as the NG system, is referred to as a "bearer-less system" or a "bearer-less network". Similarly to the above-described NG System, radio bearers may be used in a RAN in the bearer-less network. The term "bearer-less" can also be expressed as, for example, GTP-less, (PDN) connection-less, tunnel-less, (IP) flow-based, SDF-based, stream-based, or (PDU) session-based. However, in this specification, the NG System may function as a bearer-based system and may support both a flow-based transfer of user data and a bearer-based transfer of user data.

Further, it has been suggested that the NG System supports network slicing (see Non-patent Literature 1). The network slicing uses a Network Function Virtualization (NFV) technology and a software-defined networking (SDN) technology and makes it possible to create a plurality of virtualized logical networks on a physical network. Each virtualized logical network is referred to as a network slice or a network slice instance, includes logical nodes and functions, and is used for specific traffic and signaling. The NG RAN or the NG Core or both have a Slice Selection Function (SSF). The SSF selects one or more network slices suitable for an NG UE based on information provided by at least one of this NG UE and the NG Core.

Patent Literature 1 discloses handover from a bearer-less network (e.g., 5G) to a bearer-based network (e.g., LTE) and handover from a bearer-based network (e.g., LTE) to a bearer-less network (e.g., 5G). In the handover from 5G to LTE disclosed in Patent Literature 1, a source control node (i.e., an Access Control Server (ACS)/eMME) in the 5G core (or NG Core) maps QoS parameters of service flows in the bearer-less network (i.e., 5G) to EPS-bearer-level QoS in the bearer-based network (i.e., LTE). The 5G QoS parameters of the service flows are, for example, DiffServ code point (DSCP) values. The EPS-bearer-level QoS in LTE is, for example, a QoS class identifier (QCI) and an allocation and retention priority (ARP). The mapping of DSCP values to EPS bearers may be performed in a one-to-one manner or an n-to-one manner. The source ACS/eMME sends APN information including information about the EPS-bearer-level QoS to a target MME. The target MME sets up GTP tunnels for the UE according to the received APN information.

Further, in the handover from LTE to 5G disclosed in Patent Literature 1, a source MME in the LTE core (i.e., the EPC) sends a forward relocation request containing necessary bearer context information to a target ACS/eMME in the 5G core (the NG Core). The target ACS/eMME performs mapping of QCI values received from the LTE (i.e., the source MME) to 5G QoS parameters (i.e., DSCP values) and supplies them to a transfer node (i.e., a Mobility Gateway Access Router (M-GW/AR) or a Mobility Gateway Edge Router (M-GW/ER)) in the 5G core (or NG Core). By doing so, the Target ACS/eMME sets up at least one Generic Routing Encapsulation (GRE) tunnel for transferring service flows (i.e., IP packets) of the UE.

CITATION LIST

Patent Literature

Patent Literature 1: International Patent Publication No. WO2015/160329

Non Patent Literature

Non-patent Literature 1: 3GPP TR 23.799 V0.6.0 (2016 July) "3rd Generation Partnership Project; Technical Specification Group Services and System Aspects; Study on Architecture for Next Generation System (Release 14)", July 2016

SUMMARY OF INVENTION

Technical Problem

The inventors have studied handovers between the NG System (i.e., 5G) and the LTE system, and found several problems. For example, FIG. 4 of Patent Literature 1 shows that a handover procedure from the NG System (5G) to the LTE System is implemented by modifications of an LTE S1-based handover. However, Patent Literature 1 does not disclose that the handover procedure from the NG System (5G) to the LTE System includes transfer of handover signaling messages on a direct inter-base-station interface.

Accordingly, one of the objects to be attained by embodiments disclosed herein is to provide an apparatus, a method, and a program that contribute to providing an Inter-RAT handover procedure involving transfer of handover signaling messages on a direct inter-base-station interface. It should be noted that the above-described object is merely one of the objects to be attained by the embodiments disclosed herein. Other objects or problems and novel features will be made apparent from the following description and the accompanying drawings.

Solution to Problem

In an aspect, a target radio access network (RAN) node associated with a second network includes at least one memory and at least one processor coupled to the at least one memory. The at least one processor is configured to receive, directly from a core network, core network context information about a handover of a radio terminal from a first network to the second network. The at least one processor is configured to control communication of the radio terminal based on the core network context information. The at least one processor is further configured to transfer, in response to receiving the core network context information, a handover signaling message on a direct interface with a source RAN node associated with the first network. The core network context information includes at least one of flow information, slice information, and security-related information. The slice information relates to a network slice in the second network to which the radio terminal is to be connected. The flow information relates to at least one session to be established in the second network in order to transfer at least one packet flow of the radio terminal. The security-related information includes Non-Access Stratum (NAS) security configuration information.

In an aspect, a source radio access network (RAN) node associated with a first network includes at least one memory and at least one processor coupled to the at least one memory. The at least one processor is configured to determine a handover of a radio terminal from the first network to a second network, and configured to request, upon determining the handover, a core network to transmit core network context information, and receive the core network context information from the core network. The at least one processor is further configured to send a handover request message containing the core network context information to a target RAN node on a direct interface in order to start the handover. The core network context information includes at least one of flow information, slice information, and security-related information. The slice information relates to a network slice in the second network to which the radio terminal is to be connected. The flow information relates to at least one session to be established in the second network in order to transfer at least one packet flow of the radio terminal. The security-related information includes Non-Access Stratum (NAS) security configuration information.

In an aspect, a radio terminal includes at least one memory and at least one processor coupled to the at least one memory. The at least one processor is configured to, during handover from a first network to which the radio terminal is connected to a second network, receive a handover-related message from a radio access network (RAN) node of the first network. The handover-related message contains at least one of slice information about a network slice in the second network and radio resource configuration information based on the network slice in the second network.

In an aspect, a core network node includes at least one memory and at least one processor coupled to the at least one memory. The at least one processor is configured to, during handover of a radio terminal from a first network to a second network, send, to a target radio access network (RAN) node associated with the second network, slice information about a network slice which is included in the second network and to which the radio terminal is to be connected.

In an aspect, a method, in a target radio access network (RAN) node associated with a second network, includes: receiving, directly from a core network, core network context information about a handover of a radio terminal from a first network to the second network; controlling communication of the radio terminal based on the core network context information; and transferring, in response to receiving the core network context information, a handover signaling message on a direct interface with a source RAN node associated with the first network. The core network context information includes at least one of flow information, slice information, and security-related information. The slice information relates to a network slice in the second network to which the radio terminal is to be connected. The flow information relates to at least one session to be established in the second network in order to transfer at least one packet flow of the radio terminal. The security-related information includes Non-Access Stratum (NAS) security configuration information.

In an aspect, a method, in a source radio access network (RAN) node associated with a first network, includes: determining a handover of a radio terminal from the first network to a second network; requesting, upon determining the handover, a core network to transmit core network context information, and receiving the core network context information from the core network; and sending a handover request message containing the core network context information to a target RAN node on a direct interface in order to start the handover. The core network context information includes at least one of flow information, slice information, and security-related information. The slice information relates to a network slice in the second network to which the radio terminal is to be connected. The flow information relates to at least one session to be established in the second network in order to transfer at least one packet flow of the radio terminal. The security-related information includes Non-Access Stratum (NAS) security configuration information.

In an aspect, a program includes a set of instructions (software codes) that, when loaded into a computer, causes the computer to perform a method according to the above-described aspects.

Advantageous Effects of Invention

According to the above-described aspects, it is possible to provide an apparatus, a method, and a program that contribute to providing an Inter-RAT handover procedure involving transfer of handover signaling messages on a direct inter-base-station interface.

BRIEF DESCRIPTION OF DRAWINGS

FIG. 11 is a sequence diagram showing an example of an inter-RAT handover procedure from an LTE System to an NG System according to the second embodiment;

FIG. 13A is a sequence diagram showing an example of an inter-RAT handover procedure form an NG System to an LTE System according to the third embodiment;

FIG. 18A shows an example of a format of a Mobility from EUTRA command message;

FIG. 18B shows an example of the format of the Mobility from EUTRA command message;

FIG. 19 shows an example of the format of a Handover Preparation Required message;

FIG. 20 shows an example of a format of a Source NR NB to Target NR NB Transparent Container;

FIG. 21 shows an example of a format of a Source NR NB to Target NR NB Transparent Container;

FIG. 22 shows an example of a format of a Source NR NB to Target NR NB Transparent Container;

FIG. 23 shows an example of a format of an IRAT Handover Request message;

FIG. 24 shows an example of a format of an IRAT Handover Request message;

FIG. 25 shows an example of a format of an IRAT Handover Request message;

FIG. 26 shows an example of a format of Slice Information;

FIG. 27 shows an example of a format of a Session Endpoint ID.

FIG. 28 shows an example of a format of an NR Handover Command message;

FIG. 29 shows an example of a format of a Target to Source Transparent Container;

FIG. 30 shows an example of a format of a Handover Preparation Required message;

FIG. 31 shows an example of a format of a Handover Preparation Response message;

FIG. 32 shows an example of a format of an NG Core Context;

FIG. 33 shows an example of a format of a Flow Information;

FIG. 34 shows an example of a format of an NR Handover Request message;

FIG. 35 shows an example of a format of a UE Context Information; and

FIG. 36 shows an example of a format of an NR Handover Request Acknowledge message.

DESCRIPTION OF EMBODIMENTS

Specific embodiments will be described hereinafter in detail with reference to the drawings. The same or corresponding elements are denoted by the same symbols throughout the drawings, and duplicated explanations are omitted as necessary for the sake of clarity.

Each of the embodiments described below may be used individually, or two or more of the embodiments may be appropriately combined with one another. These embodiments include novel features different from each other. Accordingly, these embodiments contribute to attaining objects or solving problems different from one another and also contribute to obtaining advantages different from one another.

First Embodiment

Figure 1:
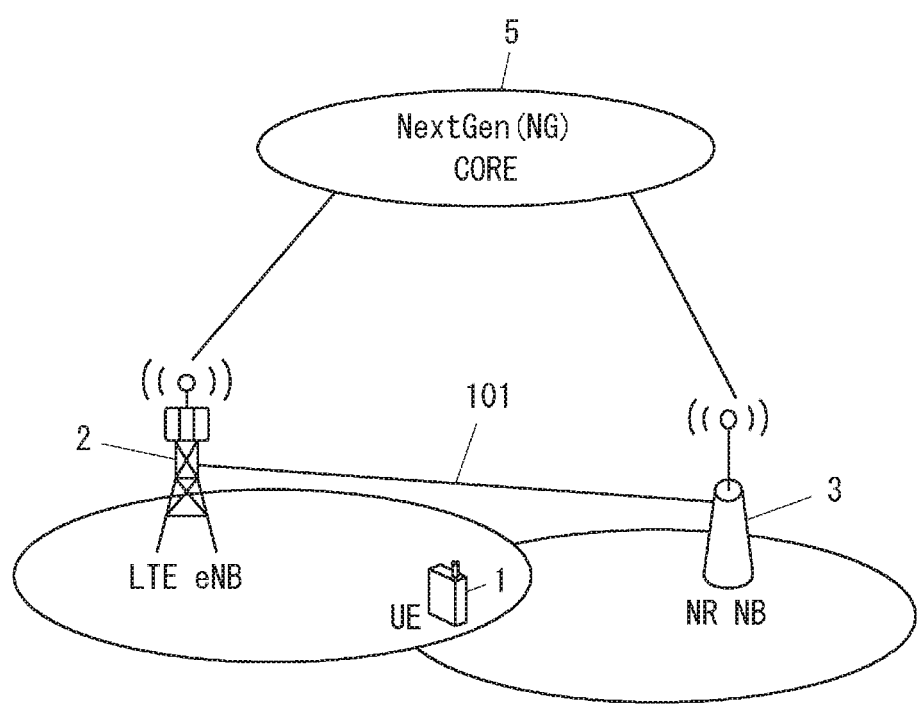
FIG. 1 shows a configuration example of a radio communication network according to some embodiments.

FIG. 1 shows a configuration example of a radio communication network according to some embodiments including this embodiment. In the example shown in FIG. 1, the radio communication network includes a radio terminal (UE) 1, an LTE base station (i.e., eNB) 2, a New Radio (NR) base station (i.e., NR NodeB (NR NB)) 3, and a NextGen (NG) Core 5. The LTE eNB 2 is connected to the NG Core 5. Specifically, the LTE eNB 2 is connected to an MME in the NG Core 5, or to a control node (i.e., Control-plane Function (CPF) node) that is disposed in the NG Core 5 and has at least a part of the functions of the MME, via a control-plane interface (e.g., NG2 interface). The LTE eNB 2 is also connected to a Serving Gateway (S-GW) in the NG Core 5, or to a data node (i.e., User-plane Function (UPF) node) that is disposed in the NG Core 5 and has at least a part of the functions of the S-GW, via a user-plane interface (e.g., NG3 interface). The LTE eNB 2, which is enhanced to be connected to the NG Core 5, may be referred to as an eLTE eNB.

Similarly, the NR NB 3 may be connected to one or more CPF nodes in the NG Core 5 via a control-plane interface (e.g., NG2 interface). Further, the NR NB 3 may be connected to one or more UPF nodes in the NG Core 5 via a user-plane interface (e.g., NG3 interface). Furthermore, the UE 1 may be connected to one or more CPF nodes in the NG Core 5 via a control-plane interface (e.g., NG1 interface). The NG1 interface may be defined as a logical interface for transferring NAS-layer information, and transmission of NAS-layer information may be performed through the NG2 interface and through the radio interface (e.g., NG Uu) between the NR NB 3 and the UE 1.

In some implementations, the NG Core 5 may set up a virtualized network slice that provides logical EPC nodes and EPC functions. In some implementations, an E-UTRAN including the LTE eNB 2 may be connected to the same network slice as an NG RAN including the NR NB 3. Alternatively, the E-UTRAN including the LTE eNB 2 and the NG RAN including the NR NB 3 may be connected to network slices different from each other. The UE 1 has a capability of connecting to an LTE system provided by the LTE eNB 2 and the NG Core 5 and also has a capability of connecting to a NextGen (NG) system provided by the NR NB 3 and the NG Core 5.

The LTE eNB 2 is connected to the NR NB 3 through a direct inter-base-station interface 101. The direct inter-base-station interface 101 is referred to, for example, as an X3 interface. The direct inter-base-station interface 101 is used at least for transfer of signaling messages between the LTE eNB 2 and the NR NB 3. The direct inter-base-station interface 101 may also be used for transfer of user packets between the LTE eNB 2 and the NR NB 3. The control-plane protocol structure and user-plane protocol structure of the direct inter-base-station interface 101 may be similar, for example, to those of the X2 interface between LTE eNBs.

The NG System may further include other interfaces in addition to the above-described NG1, NG2 and NG3 interfaces. Each interface may be referred to as a reference point. NG RANs (i.e., different NR NBs) may be connected to each other through an NX2 interface. A CPF node having either or both of a Mobility Management Function (MMF) and a Session Management Function (SMF) may be connected to an UPF node through a control-plane interface (e.g., NG4 interface). Different UPF nodes may be connected to each other through a user-plane interface (e.g., NG9 interface). CPF nodes having different functions may be connected to each other through a control-plane interface. For example, a CPF node having an MMF and an SMF may be connected through a control-plane interface (e.g., NG7 interface) to a CPF node having a Policy Control Function (PCF). A CPF node having an MMF and an SMF may be connected through a control-plane interface (e.g., NG8 interface) to a node having a Subscriber Data Management (SDM) function. A CPF node may be connected through a control-plane interface (e.g., NG5 interface) to a node having an Application Function (AF). A UPF node may be connected to an external or local Data Network (DN) through a user-plane interface (e.g., NG6 interface). The SMF may include a function of authenticating a user or a terminal and a function of authorizing a service or network slicing. The above-described network nodes are individually or collectively referred to as a Network Function(s) (NF(s)).

In some implementations, the NG System, including the NR NB 3 and the NG Core 5, supports a data transfer based on the above-described Flow-based QoS (or per-flow QoS) concept. The NG System including the NR NB 3 and the NG Core 5 may be further configured to support a bearer-based transfer using a bearer per QoS class and per PDU session. A bearer in the NG System may be configured between a pair of Network Functions (NFs), for example, between the NR NB 3 and a user-plane function in the NG Core 5, or between two user-plane functions in the NG Core 5. Alternatively, a bearer in the NG System may be configured between the UE 1 and a user-plane function in the NG Core 5 through the NR NB 3. A bearer in the NG System may be referred to as an NG-EPS-bearer and a radio access bearer in the NG System may be referred to as an NG-RAB. A bearer in the NG System can be used for transfer of a plurality of packet flows (i.e., PDU flows).

The NG-RAB may be composed of a radio bearer configured between the UE 1 (NG UE) and the NR NB 3 and a bearer configured between the NR NB 3 and a user-plane function (e.g., Edge Gateway (Edge GW)) in the NG Core 5 (e.g., NG3 bearer). The NG-EPS-bearer may be composed of the NG-RAB and a core network bearer (e.g., NG9 bearer) configured between user-plane functions in the NG Core 5 (e.g., between an Edge GW and a Data Network Gateway (DN GW)). The Edge GW is a gateway to a radio access network and is similar to the user-plane function of an LTE S-GW. However, in the NG System, unlike the LTE S-GW, the UE 1 may be connected to a plurality of Edge GWs. The DN GW is a gateway to an external network (i.e., Data Network) and is similar to the user-plane function of an LTE P-GW. In the NG System, similarly to the LTE P-GW, the UE 1 may be connected to a plurality of DN GWs.

More specifically, the NG-EPS-bearer may be configured between the UE 1 (i.e., NG UE) and a slice specific user-plane function (i.e., Slice specific User-plane NF (SUNF)) in the NG Core 5. The NG-RAB may be configured between the UE 1 (i.e., NG UE) and a common user-plane function (i.e., Common User plane NF (CUNF)) in the NG Core 5. In this case, the CUNF provides the functions of the Edge GW and the SUNF provides the functions of the DN GW. The CUNF may associate the NG-RAB with a core network bearer (e.g., NG9 bearer). That is, the NG-EPS-bearer may be composed of the NG-RAB between the UE 1 (i.e., NG UE) and the CUNF and the core network bearer (e.g., NG9 bearer) between the CUNF and the SUNF.

The NG System that supports the bearer-based transfer may be further configured to distinguish between data flows (e.g., PDU flows) in a bearer to perform QoS handling (e.g., discard of packets) on a per-data-flow basis (e.g., on a per-PDU-flow basis). For example, the NR NB 3 may associate a bearer (e.g., NG3 bearer) configured between the NR NB 3 and a user-plane function in the NG Core 5 with a radio bearer, perform packet forwarding between this bearer (e.g., NG3 bearer) and the radio bearer, and perform QoS handling (e.g., discard of packets) per data flow (e.g., PDU flow) in this bearer.

Note that when the (e)LTE eNB 2 is connected to the NG Core 5 through an NG2 interface, a radio access bearer corresponding to an LTE EPS Radio Access Bearer (E-RAB) may be defined as an NG EPS Radio Access Bearer (NE-RAB) and a bearer corresponding to an LTE EPS bearer may be defined as an NG EPS bearer (NEPS bearer). The NE-RAB may be composed of a radio bearer configured between the UE 1 and the LTE eNB 2 and a bearer (e.g., NG3 bearer) configured between the LTE eNB 2 and a user-plane function (e.g., Edge GW or CUNF) in the NG Core 5. The NEPS bearer may be composed of the NE-RAB and a core network bearer (e.g., NG9 bearer) configured between user-plane functions in the NG Core 5 (e.g., between an Edge GW and a DN GW, or between a CUNF and an SUNF).

The LTE eNB 2 connected to the NG System may be configured to distinguish between data flows (e.g., PDU flows) in a NE-RAB to perform QoS handling (e.g., discard of packets) on a per-data-flow basis (e.g., on a per-PDU-flow basis). For example, the LTE eNB 2 may associate a bearer (e.g., NG3 bearer) configured between the LTE eNB 2 and a user-plane function in the NG Core 5 with a radio bearer, perform packet forwarding between this bearer (e.g., NG3 bearer) and the radio bearer, and perform QoS handling (e.g., discard of packets) per data flow (e.g., PDU flow) in this bearer.

Figure 2A:
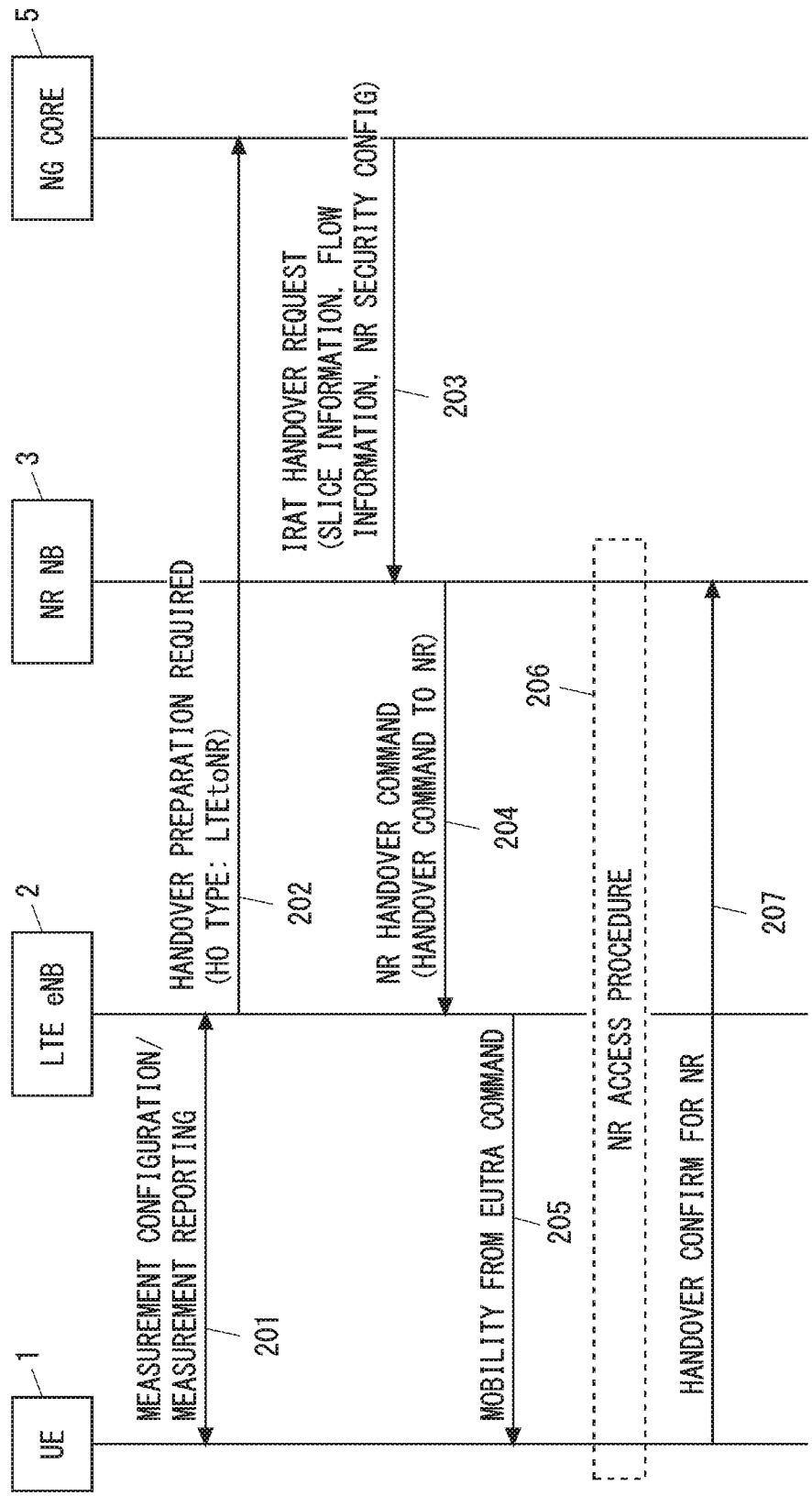
FIG. 2A is a sequence diagram showing an example of an inter-RAT handover procedure form an LTE System to an NG System according to a first embodiment.
Figure 2B:
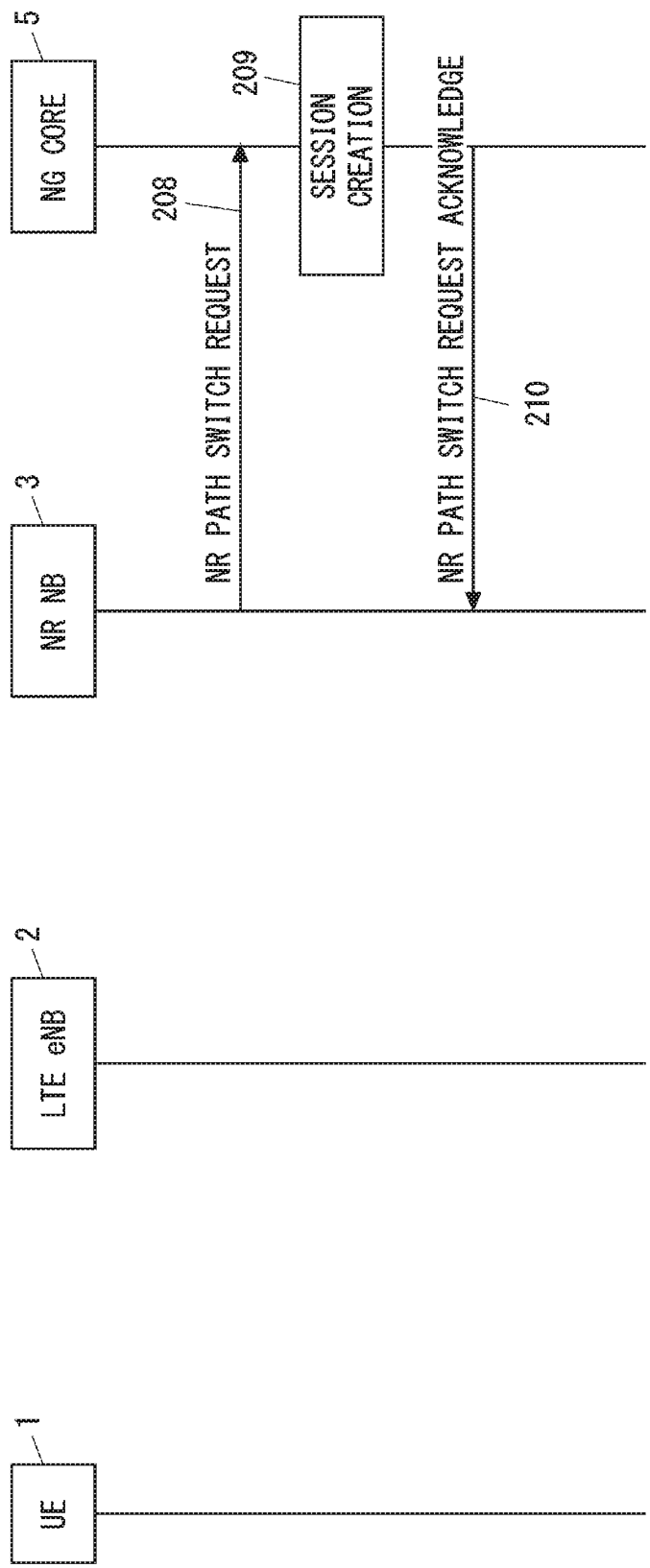
FIG. 2B is a sequence diagram showing an example of the inter-RAT handover procedure form the LTE System to the NG System according to the first embodiment.

This embodiment provides a method for handing over the UE 1 from an LTE System that does not support network slicing to an NG System that supports network slicing. FIGS. 2A and 2B show an example of a procedure for handing over the UE 1 from the LTE System to the NG System in the configuration example of the radio communication network shown in FIG. 1. FIG. 2A shows a handover preparation phase and a handover execution phase, while FIG. 2B shows a handover completion phase.

The procedure shown in FIGS. 2A and 2B resembles the "X2-based handover" in LTE in that it involves transfer of handover signaling messages on the direct inter-base-station interface 101 (i.e., Step 204) during the handover preparation phase. However, if only transfer of handover signaling messages on the direct inter-base-station interface 101 is performed, there is not enough information in the NG RAN for a relocation of the UE 1 from the LTE system to the NG system. In the procedure shown in FIGS. 2A and 2B, the handover preparation phase is improved to include signaling (i.e., steps 202 and 203) between the LTE eNB 2 and the NG Core 5 and between the NR NB 3 and the NG Core 5 to acquire information needed for the relocation of the UE 1 from the LTE system to the NG system.

In Step 201, the UE 1 is connected to the LTE eNB 2 and is in a connected state (i.e., RRC_Connected). The UE 1 receives a Measurement Configuration from the LTE eNB 2, performs neighbor cell measurements and inter-Radio-Access-Technology (inter-RAT) measurements including measurements of E-UTRAN (LTE) cells and NG-RAN cells according to the received measurement configuration, and sends a measurement report to the LTE eNB 2. The measurement configuration is contained, for example, in an RRC Connection Reconfiguration message transmitted from the E-UTRAN to the UE.

In Step 202, the LTE eNB 2 determines an inter-RAT handover to a cell of the NR NB 3. Upon determining the Inter-RAT handover, the LTE eNB 2 sends a Handover Preparation Required message to the NG Core 5. As already described, in the network configuration example shown in FIG. 1, the E-UTRAN including the LTE eNB 2 and the NG RAN including the NR NB 3 may be connected to the same network slice. In this implementation, handover of the UE 1 from the LTE eNB 2 to the NR NB 3 is carried out by signaling among one or more logical control nodes (i.e., control-plane functions) and one or more logical transfer nodes (i.e., user-plane functions) created within the same network slice. In this implementation, the Handover Preparation Required message in Step 202 may be sent to a new or enhanced control node corresponding to the MME.

Alternatively, the E-UTRAN including the LTE eNB 2 and the NG RAN including the NR NB 3 may be connected to different network slices. In this implementation, handover of the UE 1 from the LTE eNB 2 to the NR NB 3 is carried out by inter-slice communication between a network slice instance corresponding to an EPC to which the LTE eNB 2 is connected and a network slice instance corresponding to a pure NG Core to which the NR NB 3 is connected. In this implementation, the Handover Preparation Required message in Step 202 may be sent to an (enhanced) MME in the network slice instance to which the LTE eNB 2 is connected.

The Handover Preparation Required message in Step 202 contains an identifier of the target NR NB 3. Further, this Handover Preparation Required message may contain a Handover Type Information Element (IE) indicating a handover from LTE to NR. For example, the Handover Type IE is set to "LTEtoNR". Additionally or alternatively, this Handover Preparation Required message may contain a target NR-NB identifier information element (IE). This Handover Preparation Required message may contain a Source to Target Transparent Container IE. The Source to Target Transparent Container IE may contain Handover Preparation Information that is required by the target NR NB 3. The handover preparation information may include RRC layer information (e.g., RRC container) and may further include information regarding a bearer (e.g., E-RAB). The RRC layer information (e.g., RRC container) includes, for example, at least a part of the Radio Resource Configuration in the serving cell of the UE 1 managed by the LTE eNB 2, which is needed for the radio resource configuration in the NR NB 3. The Handover Preparation Information may be contained in the Handover Preparation Required message as its information element.

In Step 203, a control node (e.g., CPF) in the NG Core 5 determines that the type of the handover is an Inter-RAT handover to the NR (or NG System) based on the Handover Type IE or the Target NR-NB Identifier IE contained in the received Handover Preparation Required message. The NG Core 5 then sends, to the target NR NB 3, an inter-RAT (IRAT) handover request message containing the handover preparation information, the core network information (e.g., NG Core information), or the security-related information, or any combination thereof. The handover preparation information is used by the target NR NB 3 to perform a radio resource configuration setting and a security-related setting to communicate with the UE 1 in the NG system. Several examples of the core network information and the security-related information are described below.

In an example, the core network information may include slice information. This slice information includes information about at least one of: a network slice that is included in the NG Core 5 and to which the UE 1 is going to connect (or the UE 1 is to be connected) after the handover; a network slice that is included in the NG Core 5 and to which the UE 1 is allowed to connect; and a network slice that is included in the NG Core 5 and to which the UE 1 can connect. A control node (e.g., CPF) in the NG Core 5 determines (or selects) a network slice to which the UE 1 to be connected after the handover. In an example, the control node (CPF) in the NG Core 5 may select a network slice for the UE 1 based on QoS needed for the EPS bearer(s) or SDF(s) of the UE 1. Additionally or alternatively, the NG Core 5 may take network slice assistance information into consideration. The network slice assistance information assists the control node (e.g., CPF) in the NG Core 5 to select, configure, or authorize a network slice. The network slice assistance information may be generated by the UE 1, the LTE eNB 2, or an EPC network slice instance within the NG Core 5.

The network slice assistance information may indicate, for example: any one or any combination of: a type of the UE 1 (e.g., Device Type or UE Category); a purpose of access by the UE 1 (e.g., UE Usage Type); a type of a service that the UE 1 desires (e.g., Requested/Preferred Service Type or Multi-Dimensional Descriptor (MDD)); slice information selected by the UE 1 (e.g., Selected Slice Type, Selected Slice Identity (ID), or Selected Network Function (NF) ID); slice information for which the UE 1 has been previously authorized (e.g., Authorized Slice Type, Authorized Slice ID, or Authorized NF ID); and acceptable latency of the UE 1 (e.g., Allowed Latency or Tolerable Latency). The Service Type may indicate, for example, a type of a Use Case, such as broadband communication (e.g., enhanced Mobile Broad Band: eMBB), high-reliable/low-latency communication (e.g., Ultra Reliable and Low Latency Communication: URLLC), M2M communication with a large number of connections (e.g., massive Machine Type Communication: mMTC), or a type similar thereto. The Slice ID may indicate, for example, any one or any combination of: slice instance information (e.g., Network Slice Instance (NSI) ID); dedicated network information (e.g., Dedicated Core Network (DCN) ID); and network domain name information (e.g., Domain Network Name (DNN) ID). The NF ID may indicate, for example, an identifier(s) of any one or any combination of: a common network function (e.g., Common NF (CNF)); a common control-plane function (e.g., Common Control plane NF (CCNF)); a common user plane function (e.g., Common User plane NF (CUNF)); and a data gateway (e.g., Data Network Gateway (DN GW)).

The slice information may include identification information of the determined (or selected) slice (i.e., network slice: NS), identification information of a network node (NF), or type information of the slice, or any combination thereof. The slice identification information may be, for example, a Slice ID, an NSI ID, an MDD, a DCN ID, or a DNN, or any combination thereof. The identification information of the network node may include, for example, an NF ID, a CNF ID, a CCNF ID, a Slice specific Control plane NF (SCNF) ID, a CUNF ID, a Slice specific User plane NF (SUNF) ID, an UPF ID, or a DN GW ID, or any combination thereof. The slice type information may include, for example, a Slice Type indicating any one or any combination of a Service Type, a Service Category, and a Use Case. Additionally or alternatively, the slice type information may include a Tenant ID indicating a Use Case or a subscription contract (a Subscription Group, e.g., a home UE or a roaming UE). The slice type information may include an MDD that includes a Slice Type and a Tenant ID as its elements. Note that the contents of the above-described slice information may be designated per network slice. Accordingly, when the UE 1 is to be connected simultaneously to a plurality of network slices, the slice information may include plural sets of information items corresponding to the number of network slices to which the UE 1 is to be connected.

The slice information may further include a Mobility Class or a Session Class, or both. The Mobility Class may indicate one of predefined mobility levels (e.g., high mobility, low mobility, and no mobility). For example, the high mobility means that a geographical area in which a network slice supports mobility for the UE 1 (or permits mobility to the UE 1) is larger than that of the low mobility, and a level required for continuity of services (or PDU sessions) during handover is higher. The No mobility means a network slice supports mobility for the UE 1 (or permits mobility to the UE 1) only in a very limited geographic area. The Mobility Class may be designated per UE or may be designated per network slice. The Session Class may indicate one of predefined session types (e.g., Session pre-setup, Session post-setup, and No PDU session). For example, in order to maintain services (or PDU Sessions) during mobility as in the case of the existing handovers, the Session pre-setup may indicate that a PDU session needs to be established before the UE completes the movement to the target (i.e., a cell, a beam, etc.). In contrast, the Session post-setup may indicate that a PDU session may be established after the UE has moved to the target. The Session Class may be designated per PDU session. The Mobility Class and the Session Class may be contained in the Slice Type. In other words, the Slice Type may contain a plurality of attributes including the Mobility Class and the Session Class.

In other examples, the core network information may contain flow information. This flow information relates to at least one session (i.e., PDU session(s)) established in the bearer-less network (i.e., NG system) to transfer at least one packet flow (i.e., PDU flow(s)) of the UE 1. In respect of each packet flow (i.e., each PDU flow) of the UE 1, the flow information includes: a flow identifier (e.g., PDU flow ID); an address (Transport Layer Address) and an uplink (UL) Session Endpoint Identifier (SEID) of a transfer node in the NG Core 5; and a flow QoS parameter. The session endpoint identifier (SEID) may be, for example, a Tunnel Endpoint Identifier (TEID) or a network function (or node) identifier (NF ID). The TEID may be, for example, a GTP-TEID or a GRE-TEID.

The flow information may further indicate mapping between EPS bearers for the UE 1 and PDU Flows. For example, the flow information may indicate one or more SDFs mapped to each EPS bearer of the UE 1 and a flow identifier (e.g., PDU flow ID) assigned to each of these one or more SDFs. The flow information may further include priority information (e.g., priority indicator), flow type information (e.g., flow type indicator), or a Flow Class. The priority information may indicate, for example, a relative priority order among a plurality of flows or an absolute priority order of each flow. The flow type information may indicate, for example, which use case or which service the flow corresponds to. Further, the flow class may indicate, for example, one of predefined flow types (e.g., loss-less, delay tolerant, delay sensitive, and mission critical). The flow information may include the above-described Mobility Class or the Session Class or both.

Meanwhile, the security-related information may include Non-Access Stratum (NAS) security configuration information (security configuration) used between the NG Core 5 and the UE 1 in the NG System. The NAS security configuration information includes, for example, a NAS security algorithm including ciphering and integrity protection. The NAS security configuration information may be an NAS Security Transparent Container IE. That is, the NAS security configuration information (or NAS Security Transparent Container IE) is sent from the target NR NB 3 to the UE 1 transparently through the source LTE eNB 2.

The security-related information further includes security parameters to be used by the target NR NB 3 to derive an Access Stratum (AS) security key. These security parameters include a base key (i.e., a key corresponding to $K_{eNB}$ of LTE) for deriving a security key (or a temporary key) used by the AS layer, or include parameters (e.g., {NH, NCC} pair) for deriving this base key. The Next Hop parameter (NH) and the Next Hop Chaining Counter parameter (NCC) are used to derive $K_{eNB}$ according to a vertical key derivation algorithm. These security parameters may further include UE security capabilities regarding the NG RAT or the NG System. The UE security capabilities indicate ciphering and integrity protection algorithms implemented in the UE 1.

The core network information contained in the IRAT Handover Request message in Step 203 may include either or both of the above-described two examples (i.e., the slice information and the flow information).

In Step 204, the target NR NB 3 generates a UE context and allocates resources in response to receiving the inter-RAT (IRAT) handover request message containing the handover information, the core network information, or the security-related information, or any combination thereof.

When the core network information contained in the inter-RAT (IRAT) handover request message includes the slice information, the target NR NB 3 may operate as follows. The target NR NB 3 may perform admission control based on the core network information containing the slice information. For example, the target NR NB 3 may determine whether to accept a bearer or flow on a per-bearer or per-flow basis. Additionally or alternatively, the target NR NB 3 may perform admission control for each network slice, to which the UE 1 is to be connected, based on the slice information. Note that the NR NB 3 may determine whether it can accept each network slice. When there is a network slice that the NR NB 3 cannot accept (or does not accept), the NR NB 3 may map this network slice to a specific network slice (e.g., a default network slice), or may connect this network slice to a specific NF (e.g., CUPF). Alternatively, the NR NB 3 may determine that it has failed in accepting this network slice.

Additionally or alternatively, the target NR NB 3 may generate, based on the slice information (or derive, from the slice information), radio resource configuration information (e.g., radio parameters) needed by the UE 1 to establish a radio connection (e.g., an RRC connection or a radio bearer) associated with the NG System that supports network slicing. The radio resource configuration information may include at least one parameter included in the slice information.

The radio resource configuration information derived from the slice information may include a radio (or RAN) parameter(s) per network slice (or per use case). The use cases include, for example, an enhanced mobile broadband (eMBB), massive machine-type communications (mMTC), and Ultra-reliable and low-latency communications (URLLC). The radio parameter(s) per network slice (or per use case) may be fundamental physical channel parameters or fundamental layer 2/layer 3 (L2/L3) configurations. The fundamental physical channel parameter may include, for example, a frame/subframe structure, a Transmission Time Interval (TTI) length, subcarrier spacing, and a Physical Random Access Channel (PRACH) resource. The PRACH resource may be either or both of a preamble index and time/frequency resources. The fundamental L2/L3 configurations may include, for example, a frame/subframe pattern and configurations of L2 protocol sublayers (L2 configuration, e.g., PDCP config, RLC config, or MAC config).

Additionally or alternatively, in RRC signaling that specifies (or indicates) the radio resource configuration information derived from the slice information, at least one of: message structures; formats of an information element (IE); parameter values; and targets of encoding and decoding of ASN.1 (Abstract Syntax Notation One) indicating a structure definition of information, may be different between slices.

When the core network information contained in the inter-RAT (IRAT) handover request message includes the flow information, the target NR NB 3 may operate as follows. The target NR NB 3 may take the flow information into consideration for creation of a UE context and radio resource configuration information. Specifically, the target NR NB 3 may generate, based on the flow information, a UE context including information about a packet flow (i.e., PDU flow(s)) and a security context. Further, the target NR NB 3 may generate, based on the flow information (or derive, from the flow information), radio resource configuration information needed by the UE 1 to establish a radio connection (e.g., an RRC connection or a radio bearer) associated with the bearer-less network (i.e., NG System). The radio resource configuration information may include at least one parameter included in the flow information. The radio resource configuration information may include system information (e.g., System Information Block: SIB) in a cell (or a mobility area or a beam covering area) of the target NR NB 3, a common radio resource configuration for UEs (e.g., Common Resource Configuration), or a UE dedicated radio resource configuration (e.g., Dedicated Resource Configuration). The radio resource configuration information may further include information indicating mapping between a bearer (e.g., EPS bearer or Data Radio Bearer (DRB)) in a cell of the source LTE eNB 2 and a flow (e.g., PDU flow) to be established in a cell of the target NR NB 3.

As already described, the NG System including the NR NB 3 and the NG Core 5 may be configured to support a bearer-based transfer using a bearer per QoS class and per PDU session, or may be configured to distinguish between data flows (e.g., PDU flows) in the bearer to perform QoS handling (e.g., discard of packets) on a per-data-flow basis (e.g., on a per-PDU-flow basis). For example, the NR NB 3 may associate a bearer (e.g., NG3 bearer) configured between the NR NB 3 and a user-plane function in the NG Core 5 with a radio bearer, perform packet forwarding between this bearer (e.g., NG3 bearer) and the radio bearer, and perform QoS handling (e.g., discard of packets) per data flow (e.g., PDU flow) in this bearer.

In this case, the above-described flow information may indicate an association between a bearer for the UE 1 (e.g., NG-RAB or NG3 bearer) and one or more packet flows (i.e., PDU flow(s)) for the UE 1 transferred through this bearer. In other words, the control node (e.g., CPF) in the NG Core 5 may send the flow information to the NR NB 3 to notify the NR NB 3 of an association between a bearer for the UE 1 (e.g., NG-RAB or NG3 bearer) and one or more packet flows (i.e., PDU flow(s)) for the UE 1 transferred through this bearer. The NR NB 3 may receive the flow information from the control node in the NG Core 5 and then, according to the received flow information, perform QoS handling (e.g., discard of packets) per data flow (e.g., PDU flow) in the bearer (e.g., NG3 bearer) configured between the NR NB 3 and the user-plane function in the NG Core 5.

When the inter-RAT (IRAT) handover request message includes the security-related information, the target NR NB 3 may operate as follows. As described above, the security-related information includes the NAS security configuration information (e.g., NAS Security Transparent Container IE) and the security parameters for AS security. The Target NR NB 3 may incorporate the NAS security configuration information (e.g., NAS Security Transparent Container IE) into a transparent container to be sent to the UE 1. Additionally or alternatively, the target NR NB 3 may select an AS security algorithm based on UE security capabilities included in the security parameters. The AS security algorithm includes a ciphering algorithm for Radio Resource Control (RRC) and a user plane (UP), and also includes an integrity protection algorithm for the RRC. Further, the target NR NB 3 may derive temporary keys for RRC ciphering (or encryption), UP ciphering (or encryption), and RRC integrity protection from a base key (i.e., a key corresponding to $K_{eNB}$ of LTE) obtained from the security parameters by using the selected security algorithm.

The target NR NB 3 generates a Target To Source Transparent Container to be sent to the UE 1. This Target To Source Transparent Container includes, for example, an RRC: HandoverCommand message (e.g., Handover Command To NR) containing an RRCConnectionRecofiguration message and other RRC messages. The target NR NB 3 then generates an NR Handover Command message containing this Target To Source Transparent Container. The Target To Source Transparent Container contains, for example, radio resource configuration information set up by the target NR NB 3 (e.g., radio parameters), an identifier of the AS security algorithm selected by the target NR NB 3, and NAS security configuration information. The target NR NB 3 sends the NR Handover Command message to the source LTE eNB 2 on the direct inter-base-station interface 101 (e.g., X3 interface).

The NR Handover Command message may further contain a list of bearers that are subject to downlink data forwarding (e.g., bearers subject to data forwarding list). The "Bearers Subject to Data forwarding list" IE includes, for example, an address(es) and a TEID(s) for user traffic data forwarding, and an identifier(s) of a flow(s) (e.g., PDU flow(s)) that is subject to data forwarding. The address(es) and a TEID(s) for user traffic data forwarding may be an address(es) and a TEID(s) for the target NR NB 3 on the direct inter-base-station interface 101. The source LTE eNB 2 starts data forwarding for the bearer(s) or flow(s) (e.g., PDU flow(s)) designated by the "Bearers Subject to Data forwarding list" IE.

In Step 205, the source LTE eNB 2 sends, to the UE 1, a Radio Resource Control (RRC) message containing a Handover Command message including the transparent container generated by the target NR NB 3. This RRC message may be, for example, a Mobility from EUTRA command message or an RRC Connection Reconfiguration message.

In Step 206, in response to receiving the RRC message containing the Handover Command message, the UE 1 moves to a target RAN (i.e., NG-RAN) and performs a handover according to the transparent container (e.g., the radio resource configuration information, the AS security algorithm, and the NAS security configuration information) provided by the Handover Command message. That is, the UE 1 establishes a radio connection with the target NR NB 3 associated with the bearer-less network (i.e., NG System). In Step 207, after successfully synchronizing to the target cell, the UE 1 sends a Handover Confirm for NR message to the target NR NB 3. The message in Step 207 may be an NR RRC Connection Reconfiguration Complete message.

In Step 208, when the UE 1 has successfully accessed the target NR NB 3, the target NR NB 3 sends an NR Path Switch Request message to the NG Core 5 in order to notify the NG Core 5 that the UE 1 has changed its cell and to request a path switch. The NR Path Switch Request message may include a list of EPS bearers of the UE 1, which have been switched to the cell of the target NR NB 3.

In Step 209, a control node in the NG Core 5 performs a procedure for creating a bearer-less session. Specifically, the control node determines that the packet transfer node (or gateway) for the UE 1 needs to be relocated and then selects a target transfer node (or gateway) for the NG System in the NG Core 5. The target transfer node (or gateway) for the NG System is a node corresponding to the S-GW in LTE. The control node sends a Create Session Request message to the target transfer node (or gateway). This Create Session Request message may include information (e.g., SDF templates, or Traffic Flow Templates (TFTs)) for identifying one or more service data flows associated with each EPS bearer context. For example, the information for identifying the one or more service data flows may be derived from a message (e.g., Forward Relocation Request message) that is sent from an MME within a network slice instance corresponding to an EPC to which the LTE eNB 2 is connected to a control node within a network slice instance corresponding to a pure NG Core to which the NR NB 3 is connected. The target transfer node (or gateway) allocates its local resources and sends a Create Session Response message to the control node.

Note that, when the NG System supports a bearer-based transfer using a bearer per QoS class and per PDU session, and when the relocation of the transfer node is not needed, the control node in the NG Core 5 may perform a bearer modification procedure in Step 209 instead of the session creation procedure. The bearer may be configured between a pair of Network Functions (NFs), for example, between the NR NB 3 and a user-plane function in the NG Core 5, or between two user-plane functions in the NG Core 5.

Further, in Step 209, the control node in the NG Core 5 may select (or re-select) a network slice to which the UE 1 is to be connected after the handover. The (re-)selection of the network slice in Step 209 may be performed after the (initial) selection of the network slice in Step 203. For example, the NR Handover Confirm for NR message sent from the UE 1 to the target NR NB 3 (step 207) may include network slice assistance information, and the target NR NB 3 may incorporate the received network slice assistance information into the NR Path Switch Request message (step 208). The network slice assistance information may indicate, for example, a type of the UE 1, a service that the UE 1 desires, acceptable latency of the UE 1, or any combination thereof. The control node in the NG Core 5 may perform creation of the selected network slice instance.

In Step 210, the NG Core 5 sends an NR Path Switch Request Acknowledge message to the target NR NB 3. This NR Path Switch Request Acknowledge message may include an address and an uplink (UL) session endpoint identifier (SEID) of a transfer node in the NG Core 5 (after the relocation).

After the handover is completed according to the procedure shown in FIGS. 2A and 2B, the paths shown below may be used for the data transfer for the UE 1. When the NG System including the NR NB 3 and the NG Core 5 supports a bearer-based transfer in the NG Core 5 and a bearer (e.g., NG-EPS-bearer) is used for the UE 1 after the handover, both the uplink path and the downlink path may include, for example, a path (e.g., GTP tunnel or GRE tunnel) between the source (or old) S/P-GW and the target (or New) User-plane function (e.g., CUNF) in the NG Core 5. Specifically, the S/P-GW may transfer downlink data to the User-plane Function (e.g., the CUNF) in the NG Core 5, while the User-plane Function (e.g., the CUNF) in the NG Core 5 may transfer uplink data to the S/P-GW.

In contrast, when a bearer (e.g., NG-EPS-bearer) is not used for the UE 1 after the handover, for example, the CUNF may relay between the source (or old) S/P-GW and the target (or New) User-plane Function (e.g., SUNF having the NW Slicing function). Specifically, the S/P-GW may transfer downlink data to the CUNF in the NG Core 5 and then the CUNF may transfer downlink data to another UNF having a flow-by-flow control function. Alternatively, data transfer may be performed directly between the S/P-GW and the SUNF without traversing the CUNF. The above-described data transfer paths after the handover may also be used in other handover procedures described below.

Figure 3A:
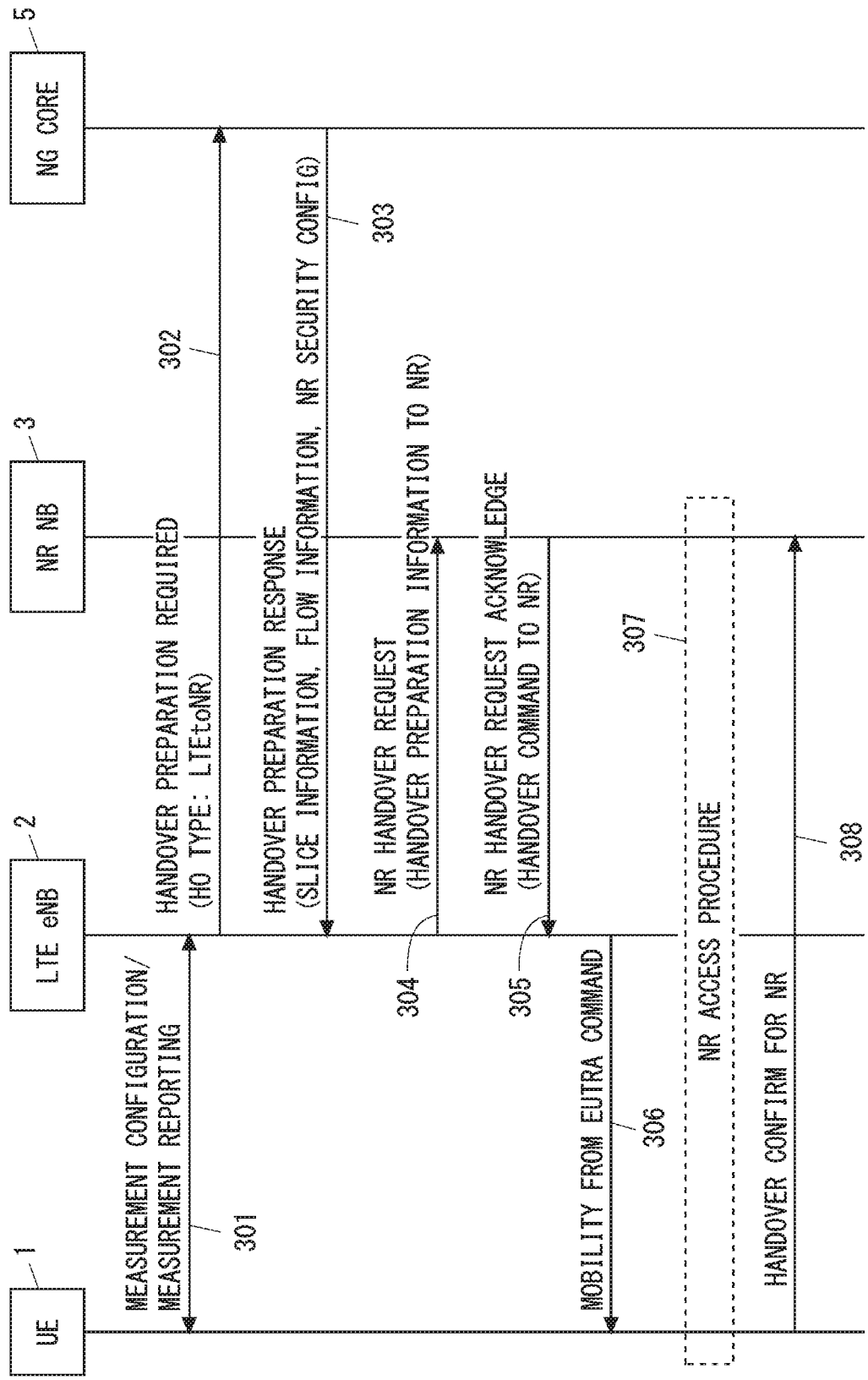
FIG. 3A is a sequence diagram showing an example of an inter-RAT handover procedure form an LTE System to an NG System according to the first embodiment.
Figure 3B:
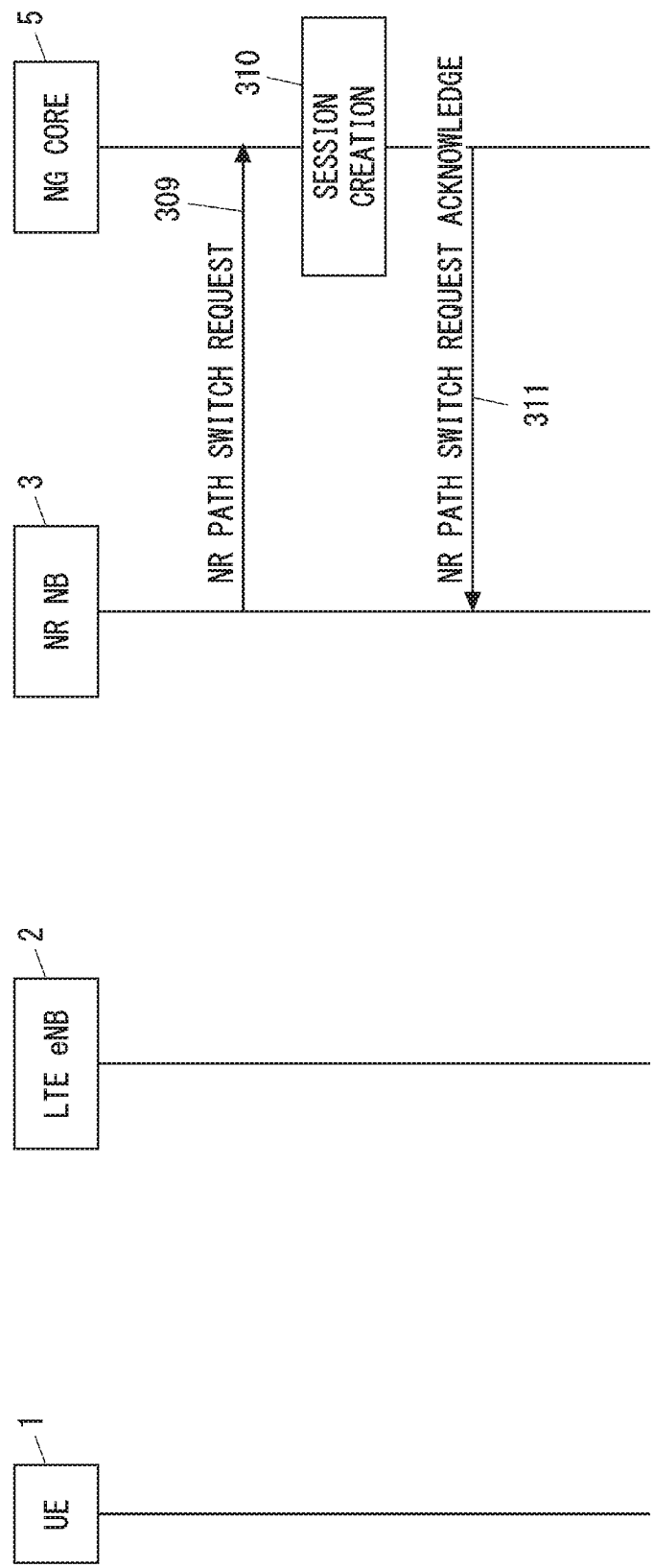
FIG. 3B is a sequence diagram showing an example of the inter-RAT handover procedure form the LTE System to the NG System according to the first embodiment.

FIGS. 3A and 3B show another example of a procedure for handing over the UE 1 from an LTE System to an NG System in the configuration example of the radio communication network shown in FIG. 1. FIG. 3A shows a handover preparation phase and a handover execution phase, while FIG. 3B shows a handover completion phase. In the above-described procedure shown in FIGS. 2A and 2B, the NG Core 5 sends the core network information and the security-related information directly to the target NR NB 3 (step 203). In contrast to this, in the procedure shown in FIGS. 3A and 3B, the core network information and the security-related information are indirectly sent from the NG Core 5 to the NR NB 3 through the source LTE eNB 2 (steps 303 and 304). This difference is mainly described below.

Processes in Steps 301 and 302 are similar to those in Steps 201 and 202 in FIG. 2A. In Step 303, the NG Core 5 generates core network context information (e.g., NG Core Context IE) including either or both of the core network information and the security-related information, and sends a Handover Preparation Response message including this core network context information to the source LTE eNB 2. The core network context information may be information transparent to the source LTE eNB 2, or may be sent by the NG Core 5 as information that the source LTE eNB 2 can recognize (or decode). A process performed by the NG Core 5 in Step 303 is similar to that performed by the NG Core 5 in Step 203 in FIG. 2A.

In Step 304, the source LTE eNB 2 sends an NR Handover Request message to the target NR NB 3 on the direct inter-base-station interface 101. This NR Handover Request message contains handover preparation information and also contains the core network context information (e.g., NG Core Context) received from the NG Core 5.

In Step 305, the target NR NB 3 generates a UE context and allocates resources in response to receiving the handover request (e.g., NR Handover Request) message containing the handover preparation information and the core network context information (e.g., NG Core Context). A process performed by the NR NB 3 in Step 305 is similar to that performed by the NR NB 3 in Step 204 in FIG. 2A. Specifically, the target NR NB 3 generates a transparent container (e.g., RRCConnectionReconfiguration) to be sent to the UE 1. The target NR NB 3 sends an NR Handover Request Acknowledge message containing the transparent container (e.g., RRCConnectionReconfiguration) to the source LTE eNB 2 on the direct inter-base-station interface 101.

Processes in Steps 306 to 311 are similar to those in Steps 205 to 210 in FIG. 2A.

Figure 4A:
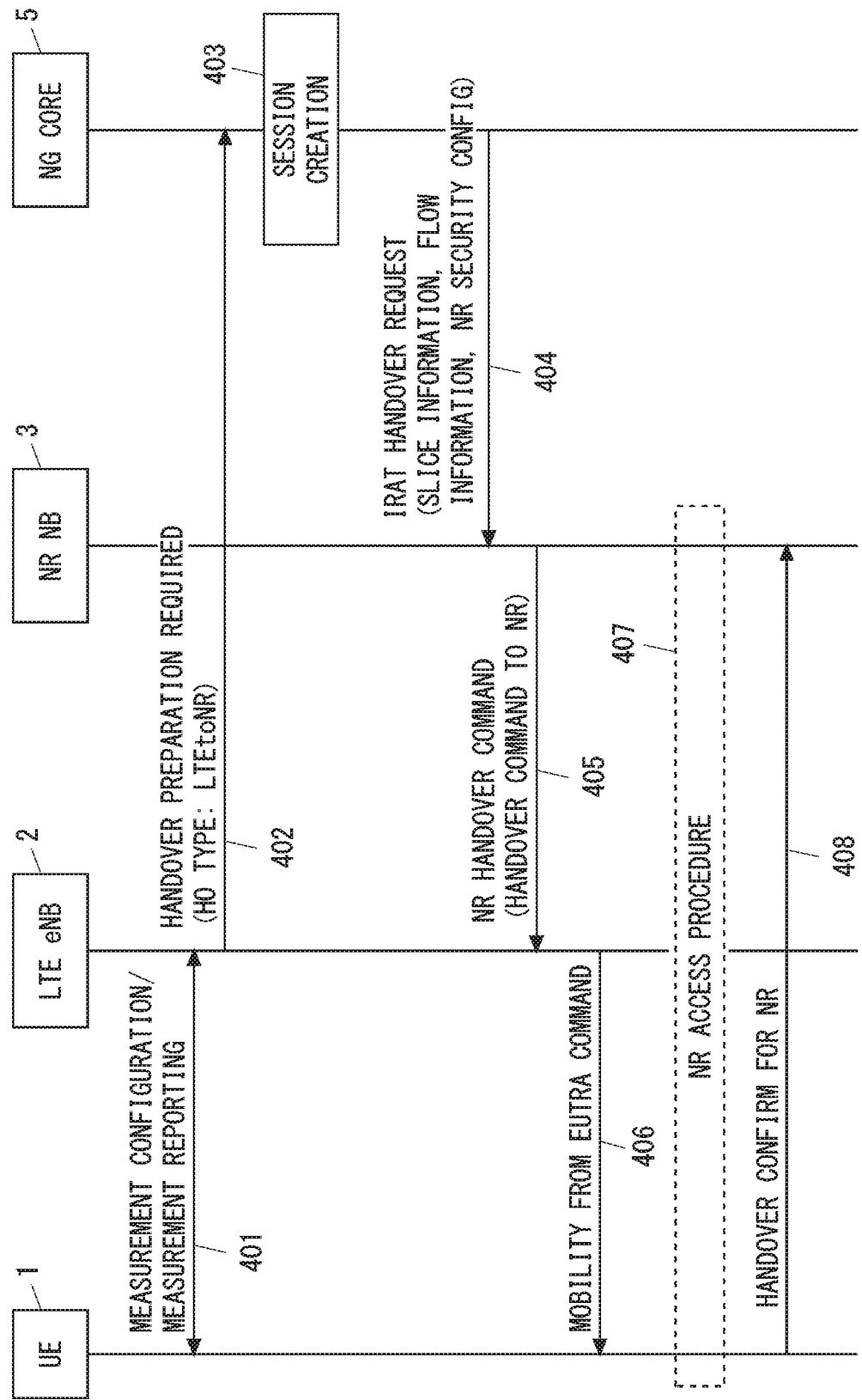
FIG. 4A is a sequence diagram showing an example of an inter-RAT handover procedure form an LTE System to an NG System according to a first embodiment.
Figure 4B:
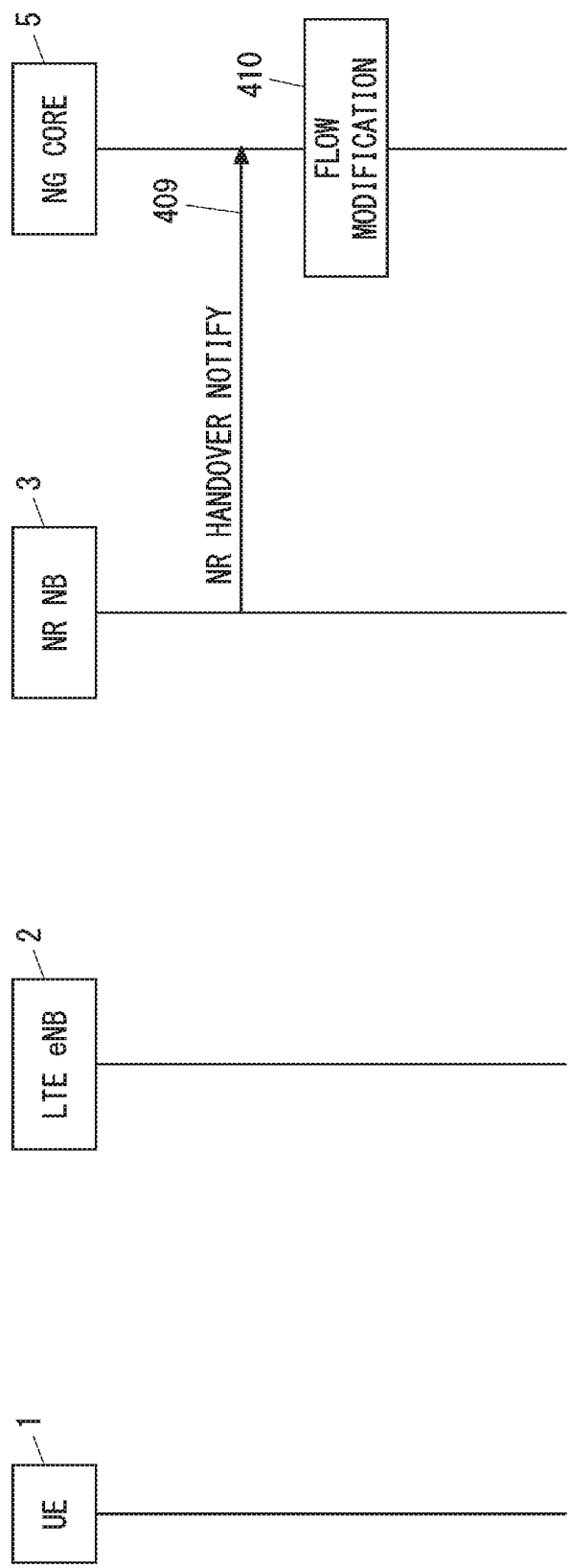
FIG. 4B is a sequence diagram showing an example of the inter-RAT handover procedure form the LTE System to the NG System according to the first embodiment.

FIGS. 4A and 4B show a modified example of the handover procedure shown in FIGS. 2A and 2B. FIG. 4A shows a handover preparation phase and a handover execution phase, while FIG. 4B shows a handover completion phase. In the above-described procedure shown in FIGS. 2A and 2B, the session creation procedure or the bearer modification procedure is performed in the handover completion phase (step 209). In contrast to this, in the procedure shown in FIGS. 4A and 4B, the session creation procedure or the bearer modification procedure is performed in the handover preparation phase (step 403). Thus, the procedure shown in FIGS. 4A and 4B may be enhancement/evolution of "E-UTRAN to UTRAN Iu mode Inter RAT handover" in LTE. Alternatively, the procedure shown in FIGS. 4A and 4B may be enhancement/evolution of "S1-based handover" involving MME relocation in LTE.

Processes in Steps 401 and 402 are similar to those in Steps 201 and 202 shown in FIG. 2A. In Step 403, the NG Core 5 performs the process in Step 203 of FIG. 2A (i.e., creation of either or both of core network information and security-related information) and the process in Step 209 of FIG. 2A (i.e., creation of a bearer-less session or modification of a bearer).

In Step 404, the NG Core 5 sends an IRAT Handover Request message containing either or both of the core network information and the security-related information to the target NR NB 3. The core network information sent in Step 404 includes at least the flow information. In respect of each packet flow (i.e., each PDU flow) of the UE 1, this flow information includes an address and an uplink (UL) Session Endpoint Identifier (SEID) of the transfer node in the NG Core 5 (after the relocation). The core network information sent in Step 404 may further include other flow information and slice information described above in relation to Step 203.

A process in Step 405 is similar to that in Step 204 of FIG. 2A. However, in Step 405, the target NR NB 3 can complete a PDU flow configuration for transmitting uplink user data to the transfer node in the NG Core 5 (after the relocation) based on the address and UL TEID of the transfer node (after the relocation) included in the IRAT Handover Request message.

Processes in Steps 405 to 408 are similar to those in Steps 204 to 207 of FIGS. 2A and 2B. In Step 409, when the UE 1 has successfully accessed the target NR NB 3, the target NR NB 3 notifies the control node in the NG Core 5 about that by sending an NR Handover Notify message. In Step 410, the control node in the NG Core 5 performs a flow modification procedure and thereby completes the Inter-RAT handover procedure. For example, the control node in the NG Core 5 may send a Modify Flow Request message per session (i.e., per PDU session) to a transfer node in the NG Core 5. This Modify Flow Request message may contain a flow identifier (e.g., PDU flow ID), and also contain an address and a downlink (DL) session endpoint identifier (SEID) of the target NR NB 3. The session endpoint identifier (SEID) may be, for example, a Tunnel Endpoint Identifier (TEID). The transfer node in the NG Core 5 may send a Modify Flow Response message to the control node in the NG Core 5.

Figure 5A:
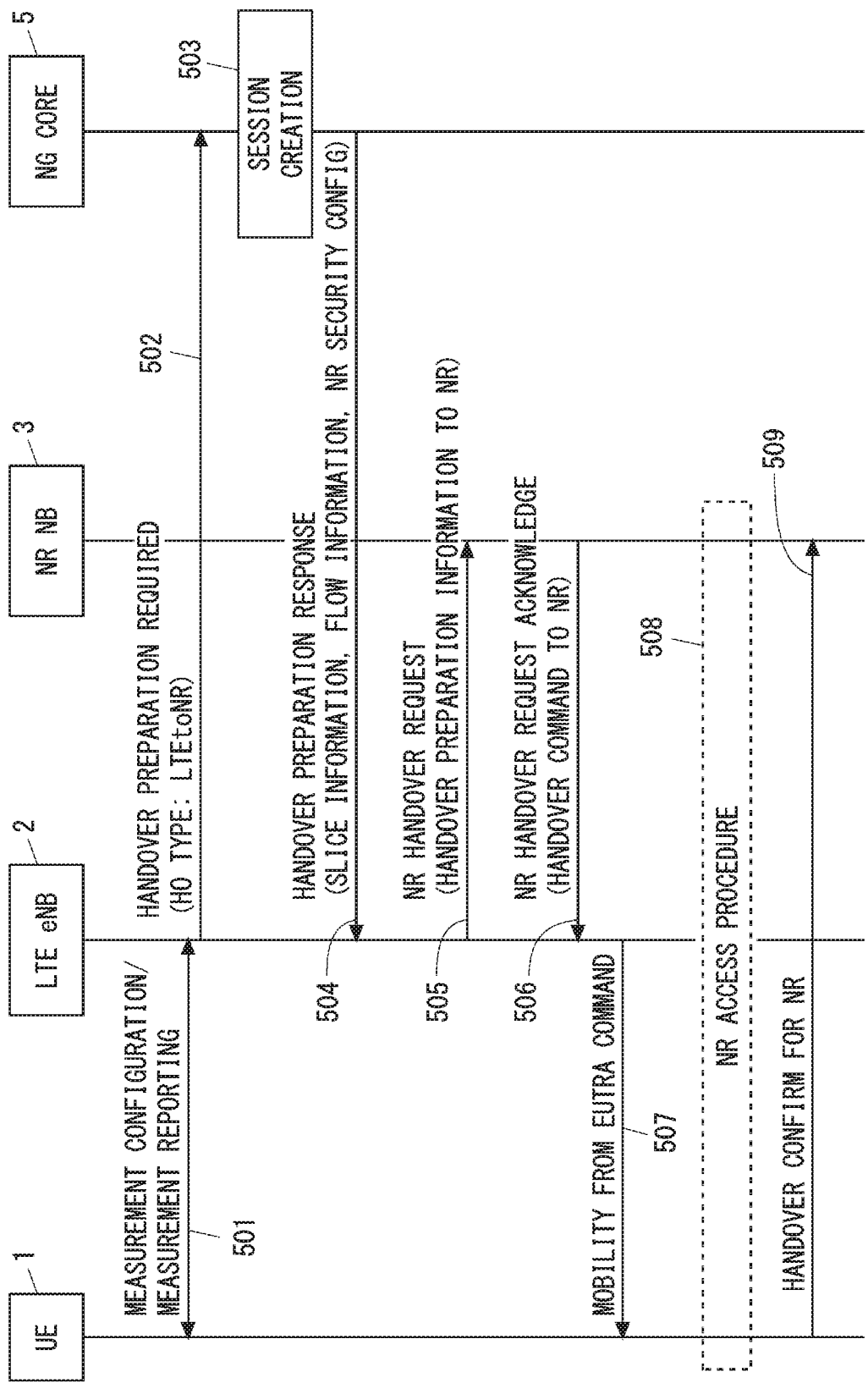
FIG. 5A is a sequence diagram showing an example of an inter-RAT handover procedure form an LTE System to an NG System according to the first embodiment.
Figure 5B:
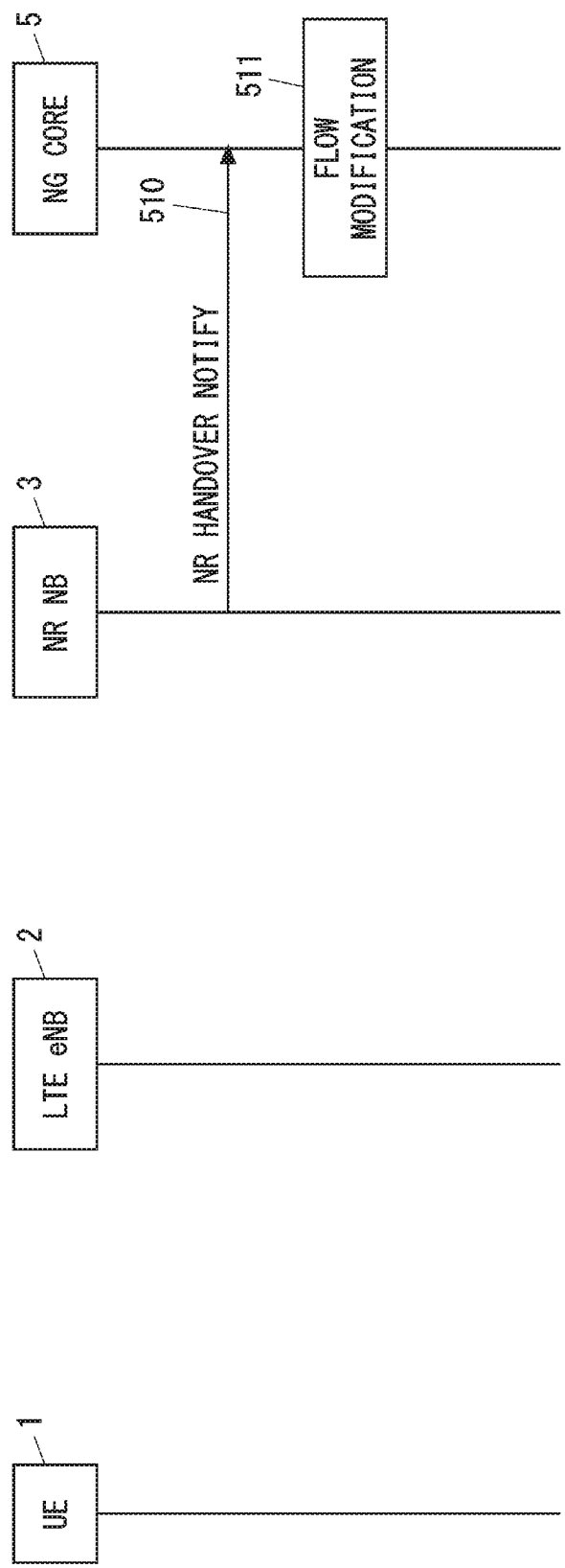
FIG. 5B is a sequence diagram showing an example of the inter-RAT handover procedure form the LTE System to the NG System according to the first embodiment.

FIGS. 5A and 5B show a modified example of the handover procedure shown in FIGS. 3A and 3B. FIG. 5A shows a handover preparation phase and a handover execution phase, while FIG. 5B shows a handover completion phase. Similarly to the procedure shown in FIGS. 4A and 4B, in the procedure shown in FIGS. 5A and 5B, the session creation procedure or the bearer modification procedure is performed in the handover preparation phase (step 503). The procedure (steps 501 to 511) shown in FIGS. 5A and 5B is obtained by changing the procedure (steps 301 to 311) shown in FIGS. 3A and 3B in a manner similar to the changes made to the procedure shown in FIGS. 4A and 4B. Thus, detailed descriptions of the processes in Steps 501 to 511 are omitted.

Figure 6:
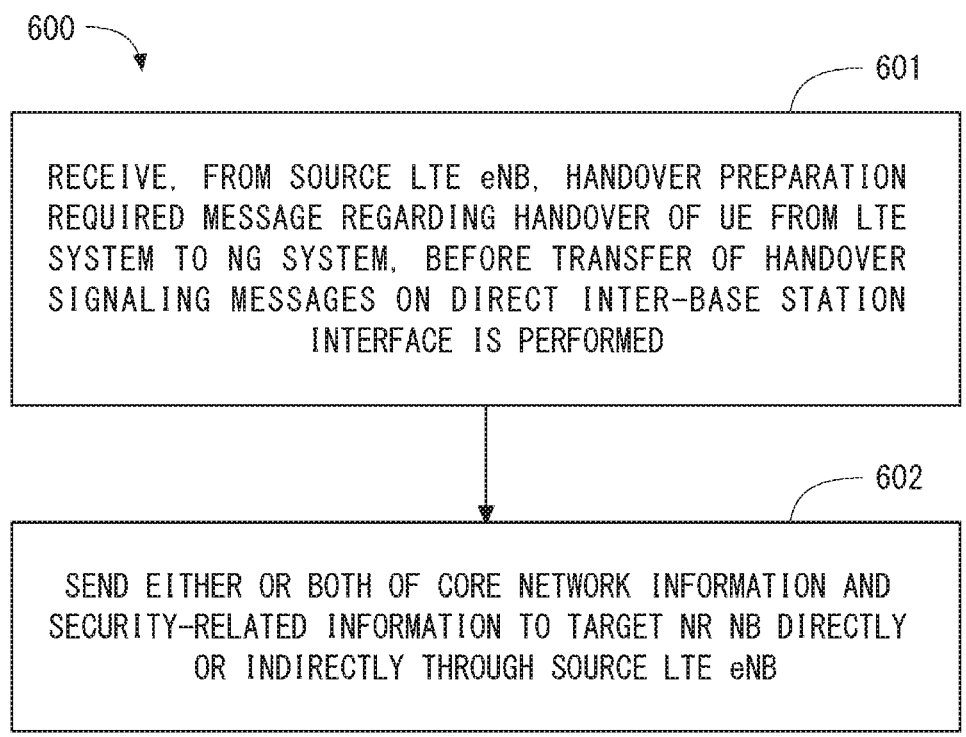
FIG. 6 is a flowchart showing an example of a method performed by a core network according to the first embodiment.

FIG. 6 is a flowchart showing a process 600 that is an example of a method performed by the core network (i.e., NG Core 5). The process shown in FIG. 6 may be performed by a single control node in the NG Core 5 or may be performed by two control nodes (i.e., a source MME and a target control node) in the NG Core. In Step 601, the NG Core 5 receives a Handover Preparation Required message from the source LTE eNB 2, before transfer of handover signaling messages on the direct inter-base-station interface 101 is performed. This Handover Preparation Required message relates to a handover of the UE 1 from the LTE system to the NG system. Step 601 corresponds, for example, to Step 202 in FIG. 2A or Step 302 in FIG. 3A.

In Step 602, the NG Core 5 sends either or both of the core network information and the security-related information to the target NR NB 3 directly or indirectly through the source LTE eNB 2. The core network information includes, for example, either or both of slice information and flow information. The security-related information includes, for example, NAS security configuration information and security parameters for AS security derivation. Step 602 corresponds, for example, to Step 203 in FIG. 2A or Steps 303 and 304 in FIG. 3A.

Figure 7:
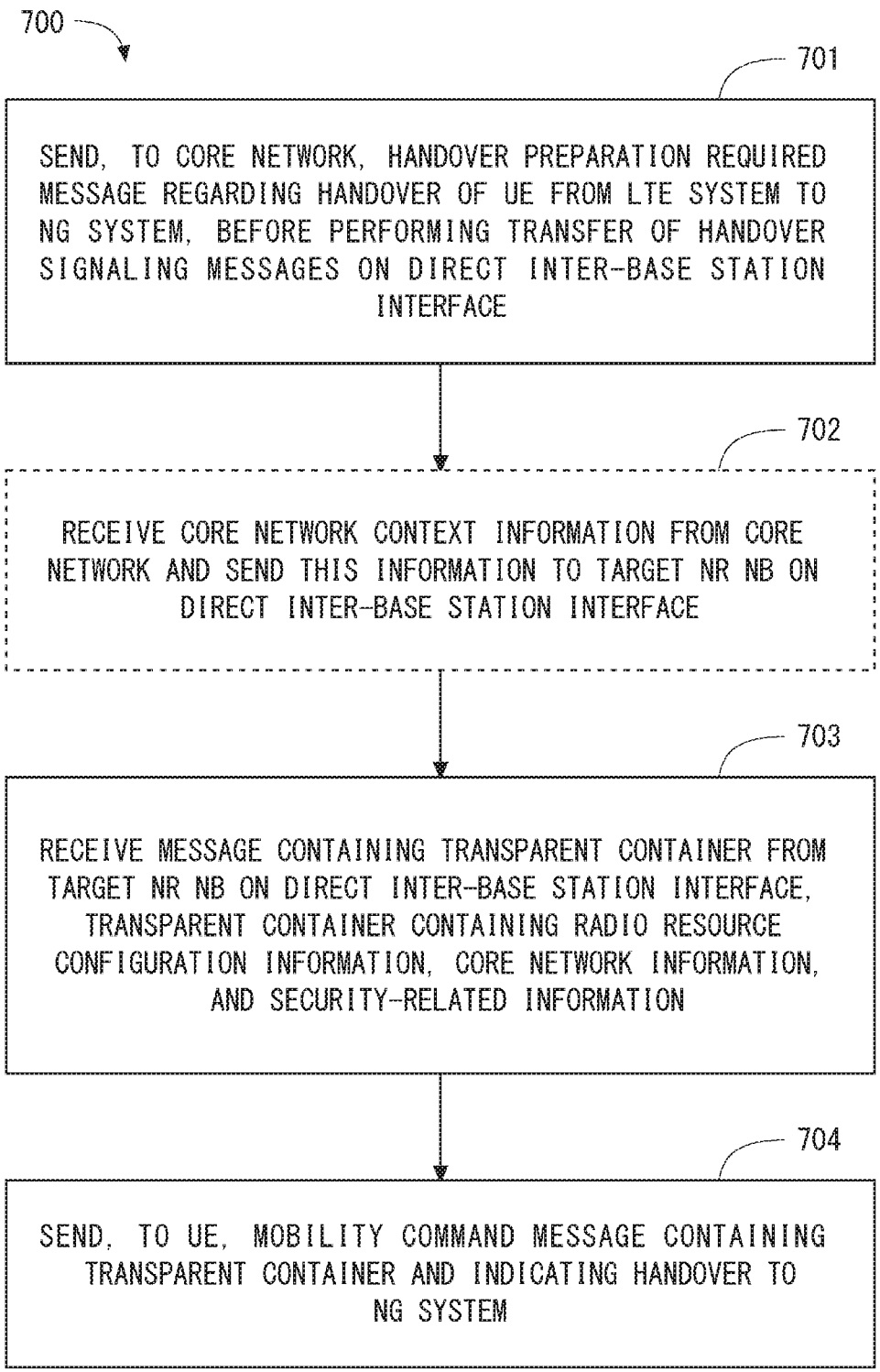
FIG. 7 is a flowchart showing an example of a method performed by a source LTE eNB according to the first embodiment.

FIG. 7 is a flowchart showing a process 700 that is an example of a method performed by the source LTE eNB 2. In Step 701, the source LTE eNB 2 sends a Handover Preparation Required message to the NG Core 5 before performing transfer of handover signaling messages on the direct inter-base-station interface 101 (e.g., X3 interface). This Handover Preparation Required message relates to a handover of the UE 1 from the LTE system to the NG system. Step 601 corresponds, for example, to Step 202 in FIG. 2A or Step 302 in FIG. 3A.

In Step 702, the source LTE eNB 2 receives core network context information (e.g., NG Core Context) from the core network and sends this information and handover preparation information to the target NR NB 3 on the direct inter-base-station interface 101. As already described, the core network context information (e.g., NG Core Context) includes either or both of the core network information and the security-related information. Step 702 corresponds, for example, to Step 304 shown in FIG. 3A. Note that, when the NG Core 5 sends an inter-RAT handover request message containing either or both of the core network information and the security-related information directly to the target NR NB 3, Step 702 is skipped.

In Step 703, the source LTE eNB 2 receives a message (e.g., NR Handover Command message or NR Handover Request Acknowledge message) containing a Target To Source Transparent Container (e.g., RRCConnectionReconfiguration) from the target NR NB 3 on the direct inter-base-station interface 101 (e.g., X3 interface). This transparent container contains radio resource configuration information (e.g., RadioResourceConfig) set up by the target NR NB 3, core network information, and security-related information (e.g., NAS security-related information). As already described, this transparent container may contain an identifier of an AS security algorithm selected by the target NR NB 3. Further, the core network information may be contained in a message sent from the target NR NB 3 to the source LTE eNB 2 as NAS layer information (e.g., NAS PDU). Step 703 corresponds, for example, to Step 204 in FIG. 2A or Step 305 in FIG. 3A.

In Step 704, the source LTE eNB 2 sends, to the UE 1, a mobility command message (e.g., Handover Command message) that contains the transparent container received from the target NR NB 3 and indicates a handover to a bearer-less network. Step 704 corresponds to Step 205 in FIG. 2A or Step 306 in FIG. 3A.

Figure 8:
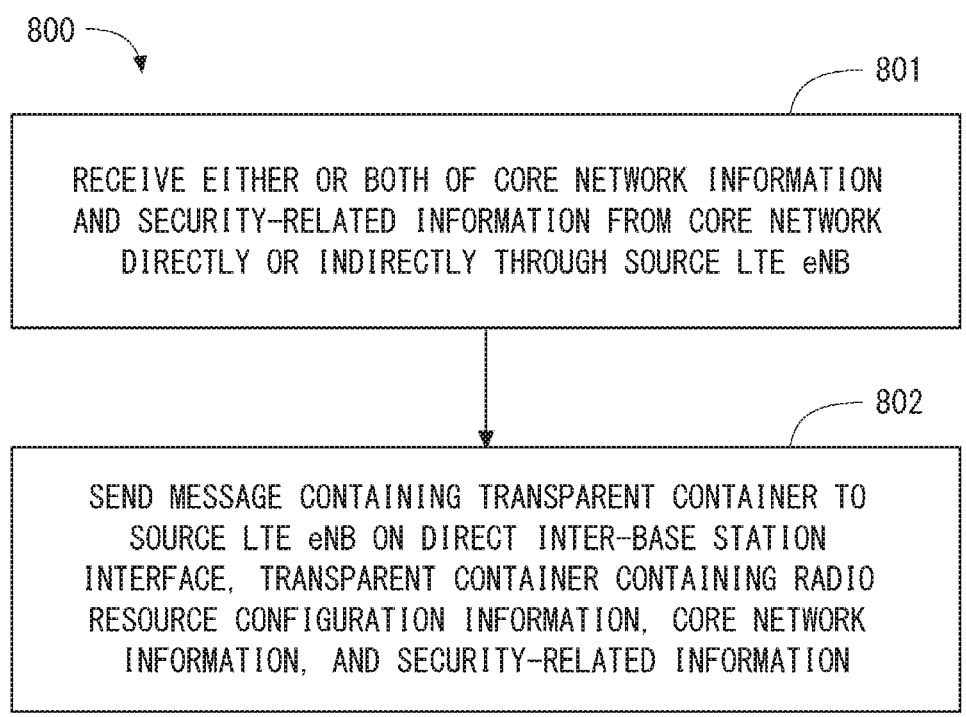
FIG. 8 is a flowchart showing an example of a method performed by a target NR NodeB (NR NB) according to the first embodiment.

FIG. 8 is a flowchart showing a process 800 that is an example of a method performed by the target NR NB 3. In Step 801, the target NR NB 3 receives either or both of the core network information and the security-related information from the core network (i.e., NG Core 5) directly or indirectly through the source LTE eNB 2. The core network information includes, for example, slice information and flow information. The security-related information includes, for example, NAS security configuration information and security parameters for AS security derivation. Step 801 corresponds, for example, to Step 203 in FIG. 2A or Step 304 in FIG. 3A.

In Step 802, the target NR NB 3 controls communication of the UE 1 based on either or both of the core network information and the security-related information. For example, the target NR NB 3 sends a message (e.g., NR Handover Command message or NR Handover Request Acknowledge message) containing a Target To Source Transparent Container (e.g., RRCConnectionReconfiguration) to the source LTE eNB 2 on the direct inter-base-station interface 101. This transparent container includes radio resource configuration information (e.g., RadioResourceConfig) set up by the target NR NB 3, core network information, and security-related information (e.g., NAS security-related information). As already described, this transparent container may contain an identifier of an AS security algorithm selected by the target NR NB 3. The core network information may be contained in a message sent from the target NR NB 3 to the source LTE eNB 2 as NAS layer information (e.g., NAS PDU). Step 703 corresponds, for example, to Step 204 in FIG. 2A or Step 305 in FIG. 3A.

Figure 9:
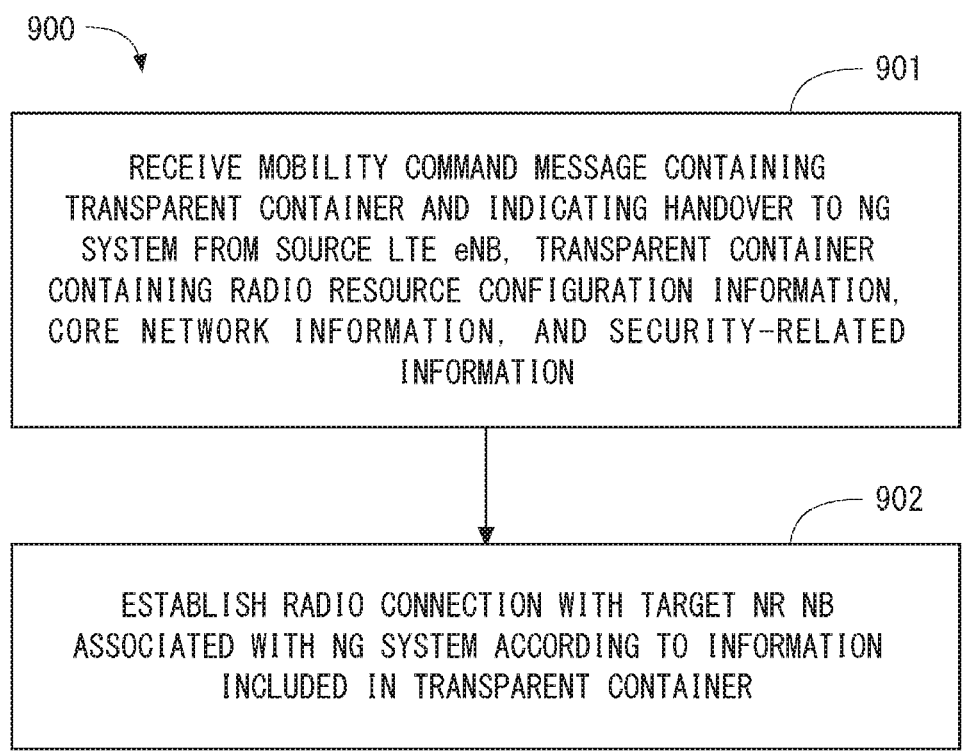
FIG. 9 is a flowchart showing an example of a method performed by a radio terminal according to the first embodiment.

FIG. 9 is a flowchart showing a process 900 that is an example of a method performed by the UE 1. In Step 901, the UE 1 receives a mobility command message (e.g., Handover Command message) from the source LTE eNB 2. This mobility command message includes a transparent container (e.g., RRCConnectionReconfiguration) sent from the target NR NB 3. This transparent container contains radio resource configuration information set up by the target NR NB 3, core network information, and security-related information (e.g., NAS security-related information). As already described, this transparent container may contain an identifier of an AS security algorithm selected by the target NR NB 3. Step 801 corresponds, for example, to Step 205 in FIG. 2A or Step 306 in FIG. 3A.

In Step 902, the UE 1 establishes a radio connection with the target NR NB 3 associated with the NG System according to the information included in the received transparent container. Step 902 corresponds, for example, to Steps 206 and 207 in FIG. 2A or Steps 307 and 308 in FIG. 3A.

In this embodiment, the network may be configured to enable the UE 1 to know in advance whether the handover target cell (i.e., NR cell) supports network slicing. For example, the NR NB 3 may broadcast system information (e.g., System Information Block Type-x: SIBx, E.g., x=1) including network slicing support information that explicitly or implicitly indicates that network slicing is supported in the NR cell (or that it is possible to connect to the NG core capable of providing network slicing). To indicate a supported network slice, the explicitly-transmitted network slicing support information may further include a type of a supported service (e.g., Supported Service Type) or a type of a supported slice (e.g., Supported Slice Type). In contrast, the implicitly-transmitted network slicing support information may include information regarding a different radio resource configuration per network slice. The UE 1 may know that network slicing is supported in the cell upon detecting that at least a part of the received radio resource configuration is designated per network slice. This information regarding a radio resource configuration may include configuration information about physical resources, or system configuration information, or both. The configuration information about physical resources may indicate at least one of a code, a time, a frequency, and an RACH preamble sequence (group). The system configuration information may indicate at least one of subcarrier spacing, a sampling rate, a TTI, and a subframe/frame format type. The network slicing support information may be transmitted as NAS-layer information or may be transmitted as AS-layer information. In the former case, the AS layer (i.e., RRC) of the UE 1 receives this information and transfers it to the NAS layer.

The detailed procedure of handover from the LTE System to the NG System according to this embodiment is not limited to the above-described specific examples. For instance, the names of messages in the handover procedure are not limited to those shown in the above-described several examples. In the above-described several examples of the handover procedure, the order of messages may be changed and some of them may be omitted. Further, they may include one or more additional messages.

As understood from the above descriptions, in the handover procedures from the LTE System to the NG System described in this embodiment, upon determining a handover, the source LTE eNB 2 requests the NG Core 5 to provide the target NR NB 3 with either or both of core network information and security-related information. This request is performed before transfer of handover signaling messages on the direct inter-base-station interface 101 (e.g., X3 interface). In this way, the target NR NB 3 can properly make settings for the handed-over UE 1 in the Inter-RAT handover procedure involving transfer of handover signaling messages on the direct inter-base-station interface 101.

Further, in the handover procedure shown in FIGS. 2A and 2B, the inter-RAT handover request message is sent from the NG Core 5 directly to the target NR NB 3 without traversing the source LTE eNB 2. For example, the inter-RAT handover request message includes handover preparation information, core network information, and security-related information. Therefore, the handover procedure shown in FIGS. 2A and 2B can enhance forward key separation as compared to the existing X2 handover and the handover procedure shown in FIGS. 3A and 3B. For example, in the existing X2 handover, a source eNB has knowledge about a {NH, NCC} pair and a target eNB uses $K_{eNB}*$ generated by the source eNB. Note that, a Next Hop parameter (NH) and a Next Hop Chaining Counter parameter (NCC) are included in an AS security context and are used to derive AS keys for the next hop (i.e., the target eNB). That is, the source eNB in the X2 handover has knowledge about the base key $K_{eNB}*$ used by the target eNB, and thus the X2 handover procedure can only achieve two-hop forward key separation. In contrast to this, in the handover procedure shown in FIGS. 2A and 2B, the NG Core 5 can directly provide a base key corresponding to $K_{eNB}*$ or a parameter for deriving the base key (e.g., an unused {NH, NCC} pair) to the target NR NB 3, which thereby can achieve one-hop key forward separation. Accordingly, the source LTE eNB 2 neither has knowledge about the base key in the target NR NB 3 nor can infer the base key.

Meanwhile, in the handover procedure shown in FIGS. 3A and 3B, the core network context information (e.g., NG Core Context) containing either or both of the core network information and the security-related information is sent from the NG Core 5 to the target NR NB 3 through the source LTE eNB 2. It is thus, for example, possible to reduce the network load by reducing an amount of signaling in the network, and thereby reduce the handover delay time. Further, there is another advantage that by having the source LTE eNB 2 acquire control information regarding the core network which will be required for an expected inter-RAT handover in advance (that is, making a preparation in advance), it is possible to perform a handover (i.e., to complete at least switching of a radio link) when the handover actually becomes necessary without causing any delay other than the handover delay in the radio part (RAN).

Second Embodiment

Figure 10:
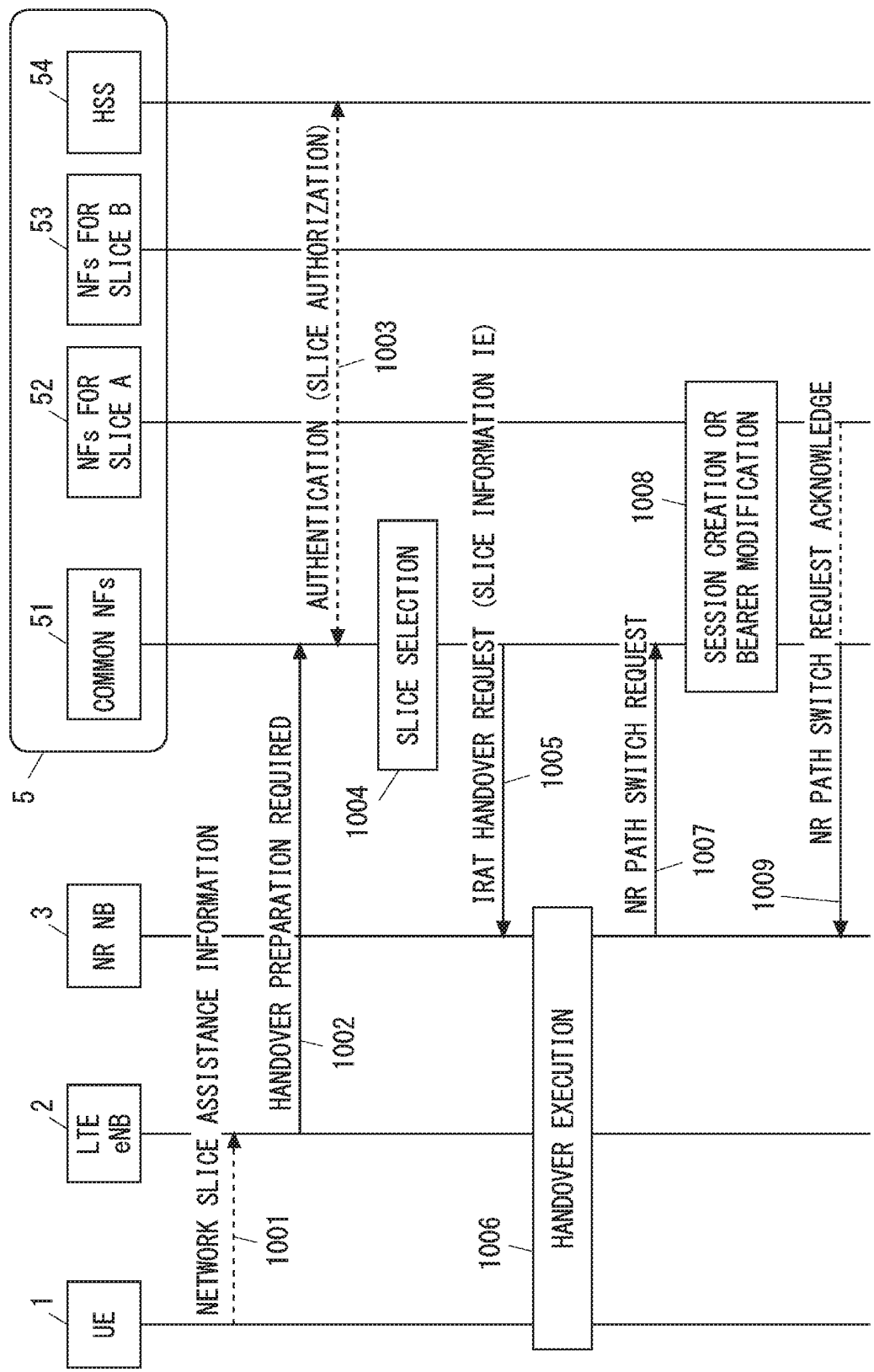
FIG. 10 is a sequence diagram showing an example of an inter-RAT handover procedure from an LTE System to an NG System according to a second embodiment.

This embodiment provides a modified example of the method for handing over the UE 1 from the LTE System to the NG System according to the first embodiment. FIG. 10 shows an example of a procedure for handing over the UE 1 from the LTE System to the NG System in the configuration example of the radio communication network shown in FIG. 1. Note that the handover procedure shown in FIG. 10 provides details and modifications to the handover procedure shown in FIGS. 2A and 2B. Specifically, FIG. 10 shows a configuration within the NG Core 5 and a selection of a network slice performed by the NG Core 5 in a concrete manner.

The NG Core 5 shown in FIG. 10 includes Common Network Functions (NFs) 51, network functions for a network slice A (NFs for slice A) 52, network functions for a network slice B (NFs for slice B) 53, and a Home Subscriber Server (HSS) 54.

Note that each network element (i.e., NF) is a component of a network slice. Each network slice is composed of network functions (NFs) necessary for providing required telecommunication services and network capabilities. Each network element (NF) is a processing function in a network and defines functional behaviour and interfaces. Each network element may be implemented as a network element on dedicated hardware, as a software instance running on dedicated hardware, or as a virtualized function instantiated on an appropriate platform.

Each network slice may be identified by a Network Slice specific Instance ID (NSI-ID). Each network function (NF) may be identified by a Network Function ID (NF ID). When common control-plane network functions (Common CP NFs) exist (or are used), NSI-IDs may be a combination of Common CP NF IDs and Slice specific IDs (i.e., NF IDs for selected slice).

The Common NFs 51 shown in FIG. 10 include control-plane network functions (CP NFs). The Common NFs 51 may further include user-plane network functions (UP NFs). The NFs for slice-A 52 include UP NFs and may further include CP NFs. Similarly, the NFs for slice-B 53 include UP NFs and my further include CP NFs.

FIG. 10 shows an example in which a Slice Selection Function (SSF) is co-located with the Common NFs 51. However, the SSF may be located separately from the Common NFs 51. In this case, the Common NFs 51 exchange messages with the SSF. The SSF selects a network slice to be associated with the UE 1. For example, the SSF may associate the UE 1 with a default network slice. Additionally or alternatively, the SSF may associate the UE 1 with a network slice (or a slice type) that has been designated by the UE 1. Further, the SSF may provide a NAS Node Selection Function (NNSF) to select CP NFs (or CP NFIDs) corresponding to the selected slice. Note that the default network slice may be configured per Public Land Mobile Network (PLMN), per RAT, per UE usage type, per Service type, or per Slice type.

An assignment of one or more packet flows of the UE 1 to a network slice may be performed according to one of the three examples described below. In the first example, the NG System including the NR NB 3 and the NG Core 5 supports a bearer-based transfer using a bearer per QoS class and per PDU session. As already described, a bearer in the NG System may be referred to as an NG-EPS-bearer and a radio access bearer in the NG System may be referred to as an NG-RAB. In the first example, each bearer is assigned to a network slice. In some implementations, the Common NFs 51 communicates with a Slice specific User-plane NF(s) (SUNF(s)) of the network slice selected for the UE 1 and sets up a bearer for the UE 1 in this SUNF(s).

In the second example, similarly to the first example, the NG System including the NR NB 3 and the NG Core 5 supports a bearer-based transfer using a bearer per QoS class and per PDU session. A bearer in the NG System can be used for transfer of a plurality of packet flows (e.g., PDU flows). In the second example, the NG System is configured to distinguish between data flows (e.g., PDU flows) in the bearer to perform QoS handling (e.g., discard of packets) on a per-data-flow basis (e.g., on a per-PDU-flow basis). In the second example, each packet flow (e.g., PDU flow) of the UE 1 is assigned to a network slice on a per-flow basis (e.g., on a per-PDU-flow basis).

In the third example, the NG System including the NR NB 3 and the NG Core 5 supports a flow-based transfer of user data. In the third example, network slicing is configured per PDU session of the UE 1. In other words, a set of the packet flows (e.g., PDU flows) included in one PDU session is collectively assigned to a network slices.

In Step 1001, the UE 1 is connected to the LTE eNB 2 and is in a connected state (i.e., RRC Connected). The UE 1 sends network slice assistance information to the LTE eNB 2. As already described, the network slice assistance information may indicate, for example, a type of the UE 1, a service that the UE 1 desires, acceptable latency of the UE 1, or any combination thereof. This network slice assistance information may be NAS information, and may be included in a measurement report sent from the UE 1 to the LTE eNB 2. Alternatively, the transmission of the network slice assistance information by the UE 1 may be omitted.

Step 1002 corresponds to Step 202 shown in FIG. 2A. That is, upon the determination of the inter-RAT handover to a cell of the NR NB 3, the LTE eNB 2 sends a Handover Preparation Required message to the Common NFs 51 in the NG Core 5. This Handover Preparation Required message contains an EPS Radio Access Bearer (E-RAB) QoS information element (IE). The E-RAB QoS IE indicates QoS (e.g., QoS class identifier (QCI), Allocation and retention priority (ARP)) of the E-RAB of the UE 1. This Handover Preparation Required message may further include the network slice assistance information (step 1001) sent from the NAS layer of the UE 1.

In Step 1003, if necessary, the Common NFs 51 perform authentication of the UE 1. This authentication includes confirming of a slice allowed (or authorized) to the UE 1 (slice authorization). In the slice authorization, the Common NFs 51 may decide/determine for each slice whether the UE 1 is allowed.

In Step 1004, the Common NFs 51 select a slice. In other words, the Common NFs 51 select a network slice to be associated with the UE 1. In the example shown in FIG. 10, the Common NFs 51 select the slice A for the UE 1. The slice selection in Step 1004 may be performed per ongoing service performed by the UE 1 or per service requested by the UE 1 (e.g., EPS bearer/E-RAB, IP flow). As already described, the slice selection in Step 1004 may be performed by an SSF located separately from the Common NFs 51.

Step 1005 corresponds to Step 203 in FIG. 2A. That is, the Common NFs 51 send an IRAT Handover Request message to the target NR NB 3. This IRAT Handover Request message includes information (i.e., Slice Information information element (IE)) about the network slice selected by the Common NFs 51 (or SSF). The Slice Information IE may contain, for example, an NSI ID indicating the selected network slice, NF IDs indicating the selected network functions (NFs), or a multi-dimensional descriptor (MDD), or any combination thereof. The MDD can be provided by the UE in an RRC signaling layer and an NAS signaling layer. The MDD represents a Tenant ID and a Service Descriptor/slice type. The service descriptor/slice type indicates a service or a use case (e.g., eMBB, mMTC, URLLC, or critical communications (CriC)) associated with the UE 1 or with the selected network slice.

Step 1006 is the handover execution phase and corresponds to Steps 204 to 207 in FIG. 2A. Processes performed in Step 1006 are similar to those in Steps 204 to 207 in FIG. 2A.

Step 1007 corresponds to Step 208 shown in FIG. 2B. That is, the target NR NB 3 sends an NR Path Switch Request message to the Common NFs 51 in the NG Core 5 in order to notify them that the UE 1 has changed its cell and to request a path switch.

Step 1008 corresponds to Step 209 in FIG. 2B. The Common NFs 51 communicate with UP NFs (i.e., NFs for slice-A 52) of the slice selected for the UE 1 (in this example, the slice A) to create a bearer-less session in the selected slice. Note that, when the NG System supports a bearer-based transfer of user data and when the relocation of the transfer node is not needed, the Common NFs 51 may perform a bearer modification procedure instead of the session creation procedure.

Step 1009 corresponds to Step 210 in FIG. 2B. The Common NFs 51 send an NR Path Switch Request Acknowledge message to the target NR NB 3. CP NFs (e.g., NFs for slice-A 52) of the selected slice may send the NR Path Switch Request Acknowledge message to the target NR NB 3 on behalf of the Common NFs 51.

FIG. 11 shows another example of the procedure for handing over the UE 1 from the LTE System to the NG System in the configuration example of the radio communication network shown in FIG. 1. The handover procedure shown in FIG. 11 provides details and modifications to the handover procedure shown in FIGS. 3A and 3B. Specifically, FIG. 11 shows a configuration within the NG Core 5 and a selection of a network slice performed by the NG Core 5 in a concrete manner. Differences between the procedure shown in FIG. 10 and the procedure shown in FIG. 11 are mainly described below.

Processes in Steps 1101 to 1105 are similar to those in Steps 1001 to 1005 shown in FIG. 10. However, Step 1105 corresponds to Step 303 in FIG. 3A. That is, the Common NFs 51 send a Handover Preparation Response message to the source LTE eNB 2. Similarly to the IRAT Handover Request message in Step 1005 in FIG. 10, this Handover Preparation Response message includes information (i.e., slice information information element (IE)) about the network slice selected by the Common NFs 51 (or SSF).

Step 1106 is the remaining handover preparation phase and corresponds to Step 304 shown in FIG. 3A. Step 1107 is the handover execution phase and corresponds to Steps 305 to 308 in FIG. 3A. Processes performed in Steps 1106 and 1107 are similar to those in Steps 304 to 308 in FIG. 3A.

Processes in Steps 1108 to 1110 are similar to those in Steps 1007 to 1009 shown in FIG. 10.

According to the handover procedure from the LTE System to the NG System in accordance with this embodiment, the NG Core 5 can provide the Target NR NB 3 with information (e.g., NSI-ID, MDD, NFIDs) regarding a network slice selected for the UE 1 by the Common NFs 51. Therefore, for example, the target NR NB 3 can use this information regarding the network slice selected for the UE 1 by the Common NFs 51, to generate or derive information or parameters to be included in a Handover Command (i.e., transparent container (RRCConnectionReconfiguration)) and to be sent to the UE 1.

Third Embodiment

Figure 12A:
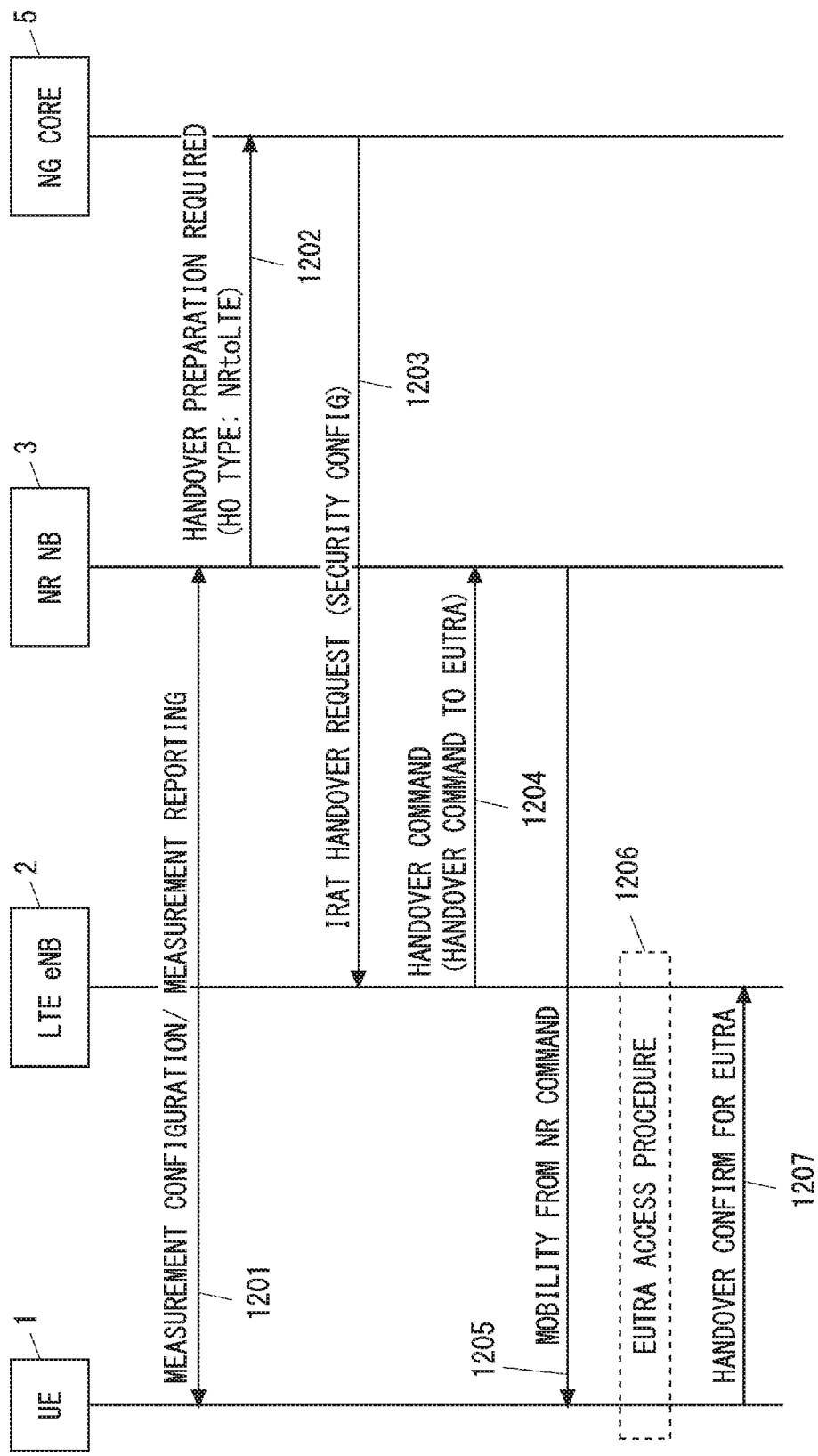
FIG. 12A is a sequence diagram showing an example of an inter-RAT handover procedure form an NG System to an LTE System according to a third embodiment.
Figure 12B:
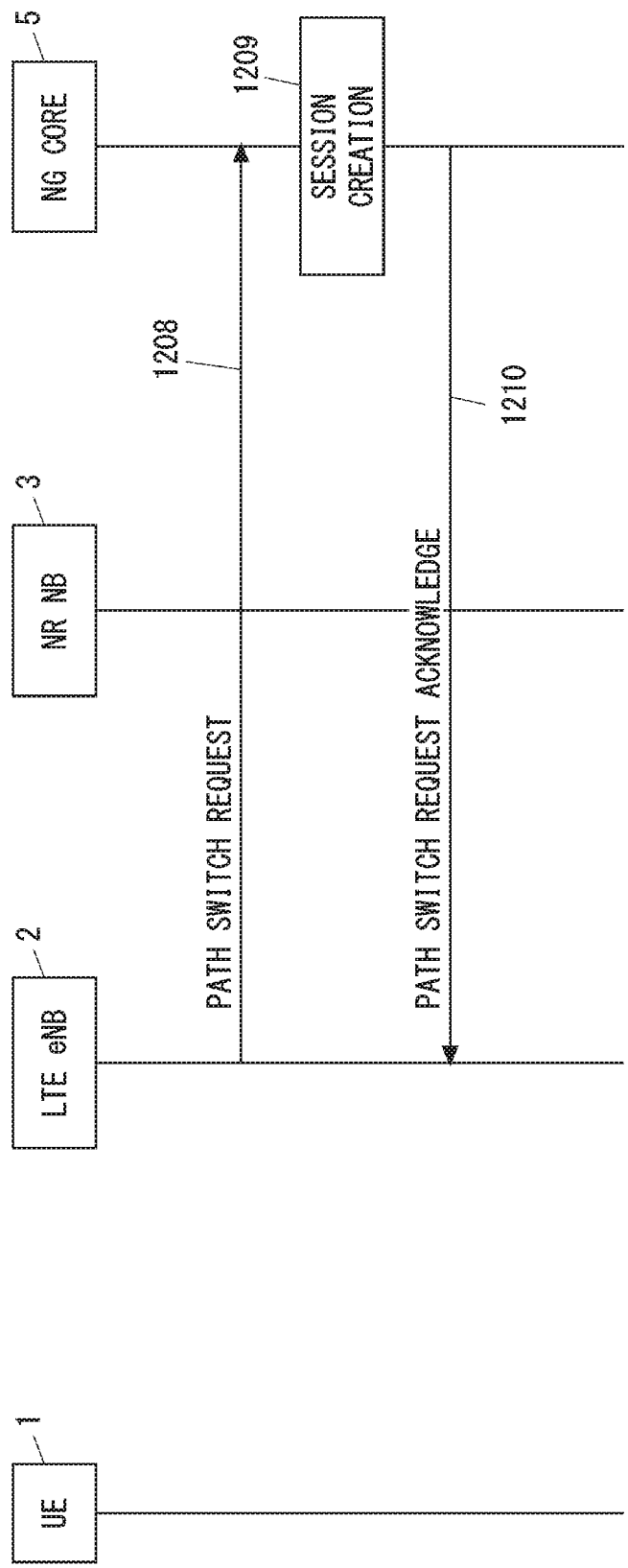
FIG. 12B is a sequence diagram showing an example of the inter-RAT handover procedure form the NG System to the LTE System according to the third embodiment.

This embodiment provides a method for handing over the UE 1 from an NG System to an LTE System. FIGS. 12A and 12B show an example of a procedure for handing over the UE 1 from the NG System to the LTE System in the configuration example of the radio communication network shown in FIG. 1. FIG. 12A shows a handover preparation phase and a handover execution phase, while FIG. 12B shows a handover completion phase.

The procedure shown in FIGS. 12A and 12B resembles the "X2-based handover" in LTE in that it involves transfer of handover signaling messages on the direct inter-base-station interface 101 (i.e., step 1204) during the handover preparation phase. However, if only transfer of handover signaling messages on the direct inter-base-station interface 101 is performed, there is not enough information needed for a relocation of the UE 1 from the NG system to the LTE system. In the procedure shown in FIGS. 12A and 12B, the handover preparation phase is improved to include signaling (i.e., steps 1202 and 1203) between the LTE eNB 2 and the NG Core 5 and between the NR NB 3 and the NG Core 5 to acquire information needed for the relocation of the UE 1 from the NG system to the LTE system.

In Step 1201, the UE 1 is connected to the NR NB 3 and is in connected state (e.g., RRC_Connected). The UE 1 receives a Measurement Configuration from the NR NB 3, performs neighbor cell measurements and inter-RAT measurements including measurements of NG-RAN cells and E-UTRAN (LTE) cells according to the received measurement configuration, and sends a measurement report to the NR NB 3.

In Step 1202, the NR NB 3 determines inter-RAT handover to a cell of the LTE eNB 2. Upon determining the Inter-RAT handover, the NR NB 3 sends a Handover Preparation Required message to the NG Core 5.

The Handover Preparation Required message in Step 1202 contains an identifier of the target LTE eNB 2. Further, this Handover Preparation Required message may contain a Handover Type Information Element (IE) indicating a handover from the NR to the LTE. For example, the Handover Type IE is set to "NRtoLTE". Alternatively, this Handover Preparation Required message may contain a target LTE eNB identifier information element (IE). This Handover Preparation Required message may contain a Source to Target Transparent Container IE.

In Step 1203, the NG Core 5 determines that the type of the handover is an Inter-RAT handover to the LTE system based on the Handover Type IE or the Target LTE eNB Identifier IE contained in the received Handover Preparation Required message. The NG Core 5 then generates security-related information and sends an inter-RAT (IRAT) handover request message containing this information to the target LTE eNB 2. The security-related information is used by the target LTE eNB 2 to perform settings related to resources and security for communicating with the UE 1 in the LTE system.

The security-related information includes NAS security configuration information to be used between the NG Core 5 and the UE 1 in the LTE System. The NAS security configuration information includes, for example, a NAS security algorithm (including ciphering and integrity protection). The NAS security configuration information may be an NAS Security Transparent Container IE. That is, the NAS security configuration information (or NAS Security Transparent Container IE) is sent from the target LTE eNB 2 to the UE 1 transparently through the source NR NB 3.

The security-related information further includes security parameters to be used by the target LTE eNB 2 to derive an Access Stratum (AS) security key. These security parameters include a base key (i.e., $K_{eNB}$) for deriving a security key (or a temporary key) used by the AS layer, or include parameters (i.e., {NH, NCC} pair) for deriving this base key. These security parameters may further include UE security capabilities related to the LTE RAT or the LTE System. The UE security capabilities indicate ciphering and integrity protection algorithms implemented in the UE 1.

In Step 1204, the target LTE eNB 2 generates a UE context and allocates resources in response to receiving the inter-RAT (IRAT) handover request message. When the IRAT handover request message includes the security-related information, the target LTE eNB 2 may operate as follows. As described above, the security-related information includes NAS security configuration information (e.g., NAS Security Transparent Container IE) and security parameters for AS security. The Target LTE eNB 2 may incorporate the NAS security configuration information (e.g., NAS Security Transparent Container IE) into a transparent container to be sent to the UE 1. Additionally or alternatively, the target LTE eNB 2 may select an AS security algorithm (i.e., a ciphering algorithm for RRC and UP, and an integrity protection algorithm for RRC) based on UE security capabilities included in the security parameters. Further, the target LTE eNB 2 may derive temporary keys for RRC ciphering (or encryption), UP ciphering (or encryption), and RRC integrity protection from a base key (i.e., $K_{eNB}$) obtained from the security parameters by using the selected security algorithm The target LTE eNB 2 generates a Target To Source Transparent Container (e.g., RRCConnectionReconfiguration) to be sent to the UE 1. This Target To Source Transparent Container includes, for example, an RRC: Handover-Command message (e.g., Handover Command To EUTRA) containing an RRCConnectionRecofiguration message and other RRC messages. The target LTE eNB 2 then generates a Handover Command message containing this Target To Source Transparent Container. The Target To Source Transparent Container contains, for example, radio resource configuration information set up by the target LTE eNB 2 (e.g., a radio parameter), an identifier of an AS security algorithm selected by the target LTE eNB 2, and NAS security configuration information. The target LTE eNB 2 sends the Handover Command message to the source NR NB 3 on the direct inter-base-station interface 101.

The Handover Command message may further contain a list of bearers that are subject to downlink data forwarding (e.g., bearers subject to data forwarding list). The "Bearers Subject to Data forwarding list" IE includes, for example, an address(es) and a TEID(s) for user traffic data forwarding, and an identifier(s) of a flow(s) (e.g., PDU flow(s)) that is subject to data forwarding. The address(es) and a TEID(s) for user traffic data forwarding may be an address(es) and a TEID(s) for the target NR NB 3 on the direct inter-base-station interface 101. The source NR NB 3 starts data forwarding for the bearer(s) or flow(s) (e.g., PDU flow(s)) designated by the "Bearers Subject to Data forwarding list" IE.

In Step 1205, the source NR NB 3 sends, to the UE 1, a Radio Resource Control (RRC) message containing a Handover Command message including the transparent container generated by the target LTE eNB 2. This RRC message may be, for example, a Mobility from NR command message or an RRC Connection Reconfiguration message.

In Step 1206, in response to receiving the RRC message containing the Handover Command message, the UE 1 moves to a target RAN (i.e., E-UTRAN) and performs a handover according to the transparent container (e.g., the radio resource configuration information, the AS security algorithm, and the NAS security configuration information) provided by the Handover Command message. That is, the UE 1 establishes a radio connection with the target LTE eNB 2 associated with the LTE System. In Step 1207, after successfully synchronizing to the target cell, the UE 1 sends a Handover Confirm for EUTRA message to the target LTE eNB 2. The message in Step 1207 may be an RRC Connection Reconfiguration Complete message.

In Step 1208, when the UE 1 has successfully accessed the target LTE eNB 2, the target LTE eNB 2 sends a Path Switch Request message to the NG Core 5 in order to notify the NG Core 5 that the UE 1 has changed its cell and to request a path switch. This Path Switch Request message may include a list of EPS bearers (or PDU flows) of the UE 1, which have been switched to the cell of the target LTE eNB 2.

In Step 1209, a control node (e.g., MME) in the NG Core 5 performs a procedure for creating a bearer-based session. Specifically, the control node determines that the packet transfer node (or gateway) for the UE 1 needs to be relocated and selects a target transfer node (i.e., S-GW) in the NG Core 5. The control node sends a Create Session Request message to the target S-GW. This Create Session Request message may include information (e.g., SDF templates, or Traffic Flow Templates (TFTs)) for identifying one or more service data flows associated with each PDU flow context. The target S-GW allocates its local resources and sends a Create Session Response message to the control node.

In Step 1210, the NG Core 5 sends a Path Switch Request Acknowledge message to the target LTE eNB 2. This Path Switch Request Acknowledge message may include an address and an uplink (UL) tunnel endpoint identifier (TEID) of the transfer node in the NG Core 5 (after the relocation).

Note that, when the NG System supports a bearer-based transfer of user data and when the relocation of the transfer node is not needed, the control node in the NG Core 5 may perform a bearer modification procedure in Step 1209 instead of the session creation procedure.

Figure 13B:
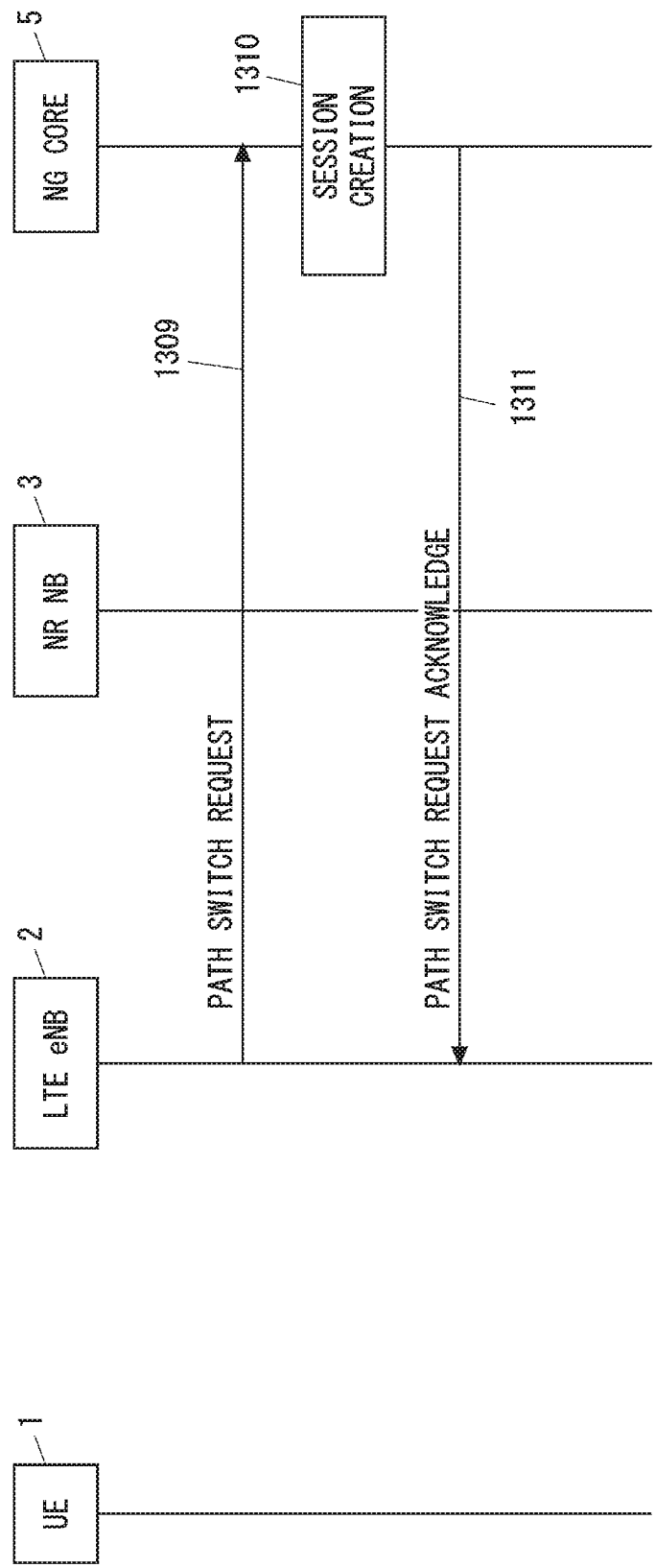
FIG. 13B is a sequence diagram showing an example of the inter-RAT handover procedure form the NG System to the LTE System according to the third embodiment.

FIGS. 13A and 13B show an example of a procedure for handing over the UE 1 from an NG System to an LTE System in the configuration example of the radio communication network shown in FIG. 1. FIG. 13A shows a handover preparation phase and a handover execution phase, while FIG. 13B shows a handover completion phase. In the above-described procedure shown in FIGS. 12A and 12B, the NG Core 5 sends the security-related information directly to the target NR NB 3 (step 1203). In contrast to this, in the procedure shown in FIGS. 13A and 13B, the security-related information is indirectly sent from the NG Core 5 to the NR NB 3 through the source LTE eNB 2 (steps 1303 and 1304). This difference is mainly described below.

Processes in Steps 1301 and 1302 are similar to those in Steps 1201 and 1202 shown in FIG. 2A. In Step 1303, the NG Core 5 generates core network context information (e.g., NG Core Context IE) including the security-related information and sends a Handover Preparation Response message including this core network context information to the source NR NB 3. The core network context information may be information transparent to the source NR NB 3, or may be sent by the NG Core 5 as information that the source NR NB 3 can recognize (or decode). A process performed by the NG Core 5 in Step 1303 is similar to that performed by the NG Core 5 in Step 1203 in FIG. 12A.

In Step 1304, the source NR NB 3 sends a Handover Request message to the target LTE eNB 2 on the direct inter-base-station interface 101. This Handover Request message contains handover preparation information and also contains the core network context information (e.g., NG Core Context) received from the NG Core 5.

In Step 1305, the target LTE eNB 2 generates a UE context and allocates resources in response to receiving the handover request message containing the handover preparation information and the core network context information (e.g., NG Core Context). A process performed by the LTE eNB 2 in Step 1305 is similar to that performed by the LTE eNB 2 in Step 1204 in FIG. 12A. That is, the target LTE eNB 2 generates a Target To Source Transparent Container (e.g., RRCConnectionReconfiguration) to be sent to the UE 1. The target LTE eNB 2 sends a Handover Request Acknowledge message containing this Target To Source Transparent Container to the source NR NB 3 on the direct inter-base-station interface 101.

Processes in Steps 1306 to 1311 are similar to those in Steps 1205 to 1210 shown in FIG. 2A.

The detailed procedure of handover from the NG System to the LTE System according to this embodiment is not limited to the above-described specific examples. For instance, the names of messages in the handover procedure are not limited to those shown in the above-described several examples. In the above-described several examples of the handover procedure, the order of messages may be changed and some of them may be omitted. Further, they may include one or more additional messages.

Figure 14:
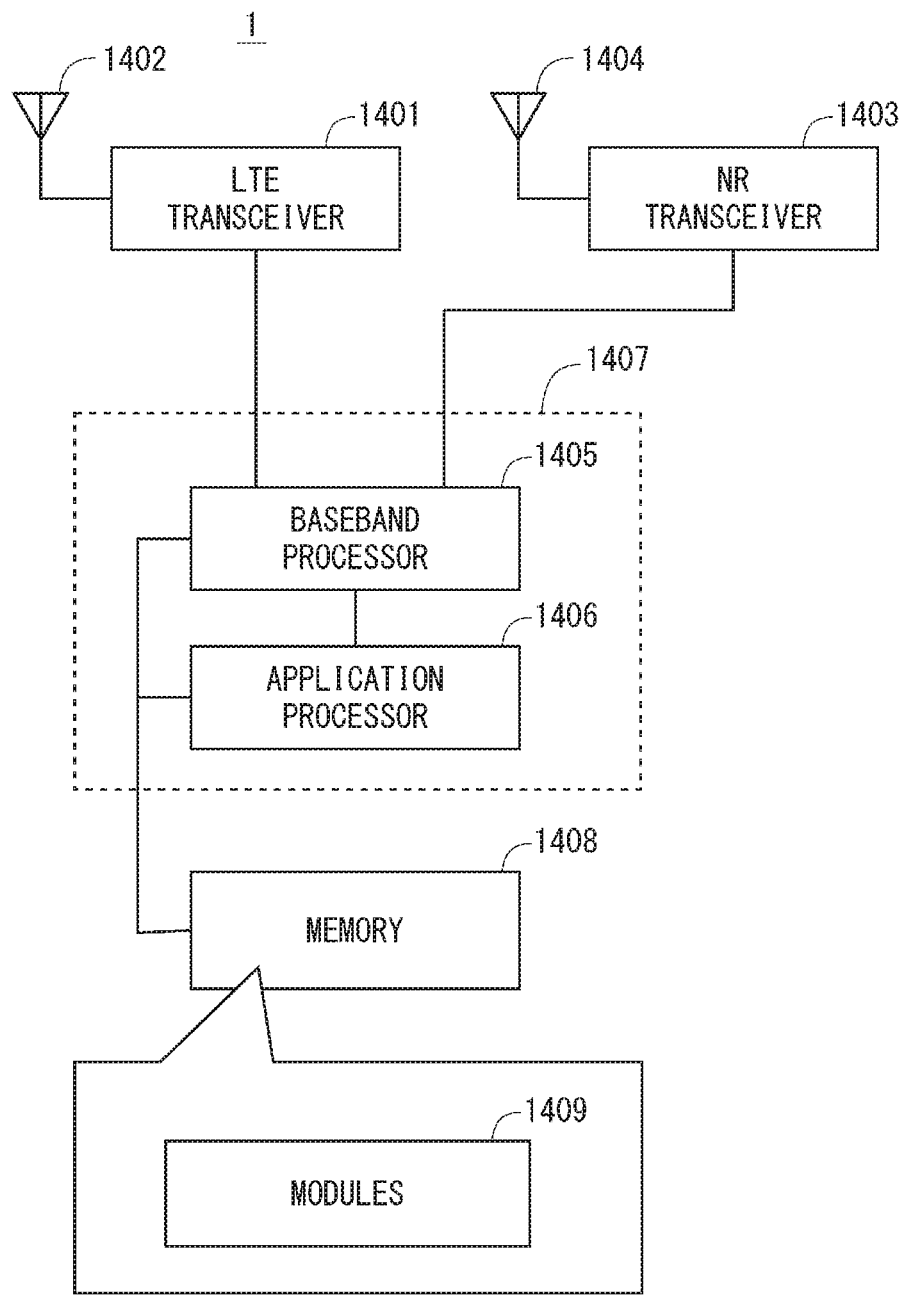
FIG. 14 is a block diagram showing a configuration example of a radio terminal according to some embodiments.

The following provides configuration examples of the UE 1, the LTE eNB 2, the NR NB 3, and the core network nodes according to the above-described embodiments. FIG. 14 is a block diagram showing a configuration example of the UE 1. An LTE transceiver 1401 performs an analog RF signal processing related to the PHY layer of the LTE RAT to communicate with the LTE eNB 2. The analog RF signal processing performed by the LTE transceiver 1401 includes frequency up-conversion, frequency down-conversion, and amplification. The LTE transceiver 1401 is coupled to an antenna 1402 and a baseband processor 1405. That is, the LTE transceiver 1401 receives modulated symbol data (or OFDM symbol data) from the baseband processor 1405, generates a transmission RF signal, and supplies the generated transmission RF signal to the antenna 1402. Further, the LTE transceiver 1401 generates a baseband reception signal based on a reception RF signal received by the antenna 1402 and supplies the generated baseband reception signal to the baseband processor 1405.

A New Radio (NR) transceiver 1403 performs an analog RF signal processing related to the PHY layer of the NG RAT to communicate with the NR NB 3. The New 5G transceiver 1403 is coupled to an antenna 1404 and the baseband processor 1405.

The baseband processor 1405 performs digital baseband signal processing (i.e., data-plane processing) and control-plane processing for radio communication. The digital baseband signal processing includes (a) data compression/decompression, (b) data segmentation/concatenation, (c) composition/decomposition of a transmission format (i.e., transmission frame), (d) channel coding/decoding, (e) modulation (i.e., symbol mapping)/demodulation, and (f) generation of OFDM symbol data (i.e., baseband OFDM signal) by Inverse Fast Fourier Transform (IFFT). Meanwhile, the control-plane processing includes communication management of layer 1 (e.g., transmission power control), layer 2 (e.g., radio resource management and hybrid automatic repeat request (HARQ) processing), and layer 3 (e.g., signaling regarding attach, mobility, and packet communication).

In the case of LTE or LTE-Advanced, for example, the digital baseband signal processing performed by the baseband processor 1405 may include signal processing of the Packet Data Convergence Protocol (PDCP) layer, Radio Link Control (RLC) layer, Medium Access Control (MAC) layer, and Physical (PHY) layer. Further, the control-plane processing performed by the baseband processor 1405 may include processing of Non-Access Stratum (NAS) protocol, RRC protocol, and MAC CEs.

The baseband processor 1405 may include a modem processor (e.g., Digital Signal Processor (DSP)) that performs the digital baseband signal processing and a protocol stack processor (e.g., Central Processing Unit (CPU) or a Micro Processing Unit (MPU)) that performs the control-plane processing. In this case, the protocol stack processor, which performs the control-plane processing, may be integrated with an application processor 1406 described in the following.

The application processor 1406 may also be referred to as a CPU, an MPU, a microprocessor, or a processor core. The application processor 1406 may include a plurality of processors (processor cores). The application processor 1406 loads a system software program (Operating System (OS)) and various application programs (e.g., communication application for acquiring metering data or sensing data) from a memory 1408 or from another memory (not shown) and executes these programs, thereby providing various functions of the UE 1.

In some implementations, as represented by a dashed line (1407) in FIG. 14, the baseband processor 1405 and the application processor 1406 may be integrated on a single chip. In other words, the baseband processor 1405 and the application processor 1406 may be implemented in a single System on Chip (SoC) device 1407. A SoC device may be referred to as a system Large Scale Integration (LSI) or a chipset.

The memory 1408 is a volatile memory, a nonvolatile memory, or a combination thereof. The memory 1408 may include a plurality of memory devices that are physically independent from each other. The volatile memory is, for example, a Static Random Access Memory (SRAM), a Dynamic RAM (DRAM), or a combination thereof. The non-volatile memory is, for example, a mask Read Only Memory (MROM), an Electrically Erasable Programmable ROM (EEPROM), a flash memory, a hard disc drive, or any combination thereof. The memory 1408 may include, for example, an external memory device that can be accessed by the baseband processor 1405, the application processor 1406, and the SoC 1407. The memory 1408 may include an internal memory device that is integrated in the baseband processor 1405, the application processor 1406, or the SoC

1407. Further, the memory 1408 may include a memory in a Universal Integrated Circuit Card (UICC).

The memory 1408 may store one or more software modules (computer programs) 1409 including instructions and data to perform processing by the UE 1 described in the above embodiments. In some implementations, the baseband processor 1405 or the application processor 1406 may load the software modules 1409 from the memory 1408 and execute the loaded software modules, thereby performing the processing of the UE 1 described in the above embodiments.

Figure 15:
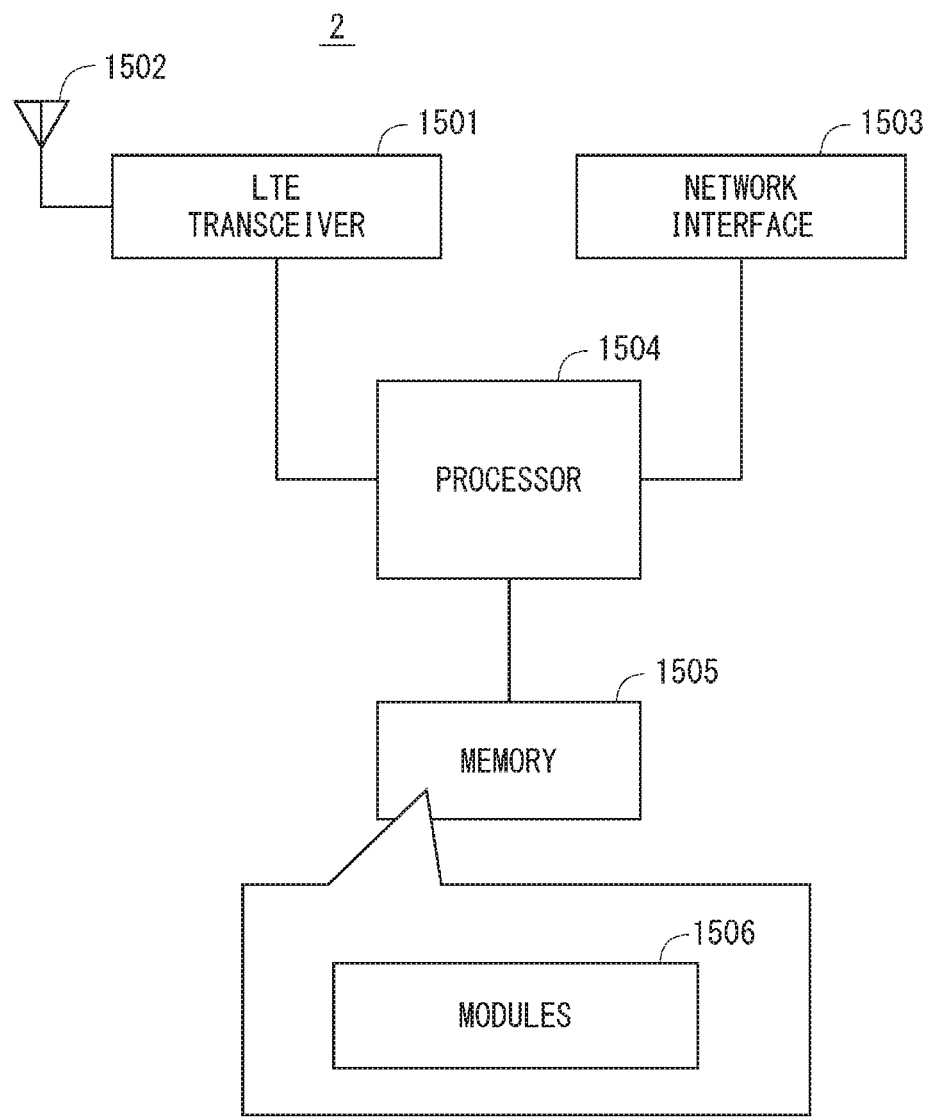
FIG. 15 is a block diagram showing a configuration example of a base station according to some embodiments.

FIG. 15 is a block diagram showing a configuration example of the LTE eNB 2 according to the above-described embodiments. As shown in FIG. 15, the LTE eNB 2 includes an LTE transceiver 1501, a network interface 1503, a processor 1504, and a memory 1505. The LTE transceiver 1501 performs analog RF signal processing to communicate with UEs that support the LTE RAT, including the UE 1. The LTE transceiver 1501 may include a plurality of transceivers. The LTE transceiver 1501 is connected to an antenna 1502 and the processor 1504. The LTE transceiver 1501 receives modulated symbol data (or OFDM symbol data) from the processor 1504, generates a transmission RF signal, and supplies the generated transmission RF signal to the antenna 1502. Further, the LTE transceiver 1501 generates a baseband reception signal based on a reception RF signal received by the antenna 1502 and supplies this signal to the processor 1504.

The network interface 1503 is used to communicate with network nodes (e.g., the control node and the transfer node). The network interface 1503 may include, for example, a network interface card (NIC) conforming to the IEEE 802.3 series.

The processor 1504 performs digital baseband signal processing (i.e., data-plane processing) and control-plane processing for radio communication. In the case of LTE or LTE-Advanced, for example, the digital baseband signal processing performed by the processor 1504 may include signal processing of the PDCP layer, RLC layer, MAC layer, and PHY layer. Further, the control-plane processing performed by the processor 1504 may include processing of S1 protocol, RRC protocol, and MAC CE.

The processor 1504 may include a plurality of processors. The processor 1504 may include, for example, a modem processor (e.g., DSP) that performs the digital baseband signal processing and a protocol-stack-processor (e.g., CPU or MPU) that performs the control-plane processing.

The memory 1505 is composed of a combination of a volatile memory and a nonvolatile memory. The volatile memory is, for example, an SRAM, a DRAM, or a combination thereof. The nonvolatile memory is, for example, an MROM, a PROM, a flash memory, a hard disk drive, or a combination thereof. The memory 1505 may include a storage located separately from the processor 1504. In this case, the processor 1504 may access the memory 1505 through the network interface 1503 or an I/O interface (not shown).

The memory 1505 may store one or more software modules (computer programs) 1506 including instructions and data to perform processing by the LTE eNB 2 described in the above embodiments. In some implementations, the processor 1504 may load the one or more software modules 1506 from the memory 1505 and execute the loaded software modules, thereby performing the processing of the LTE eNB 2 described in the above embodiments.

Figure 16:
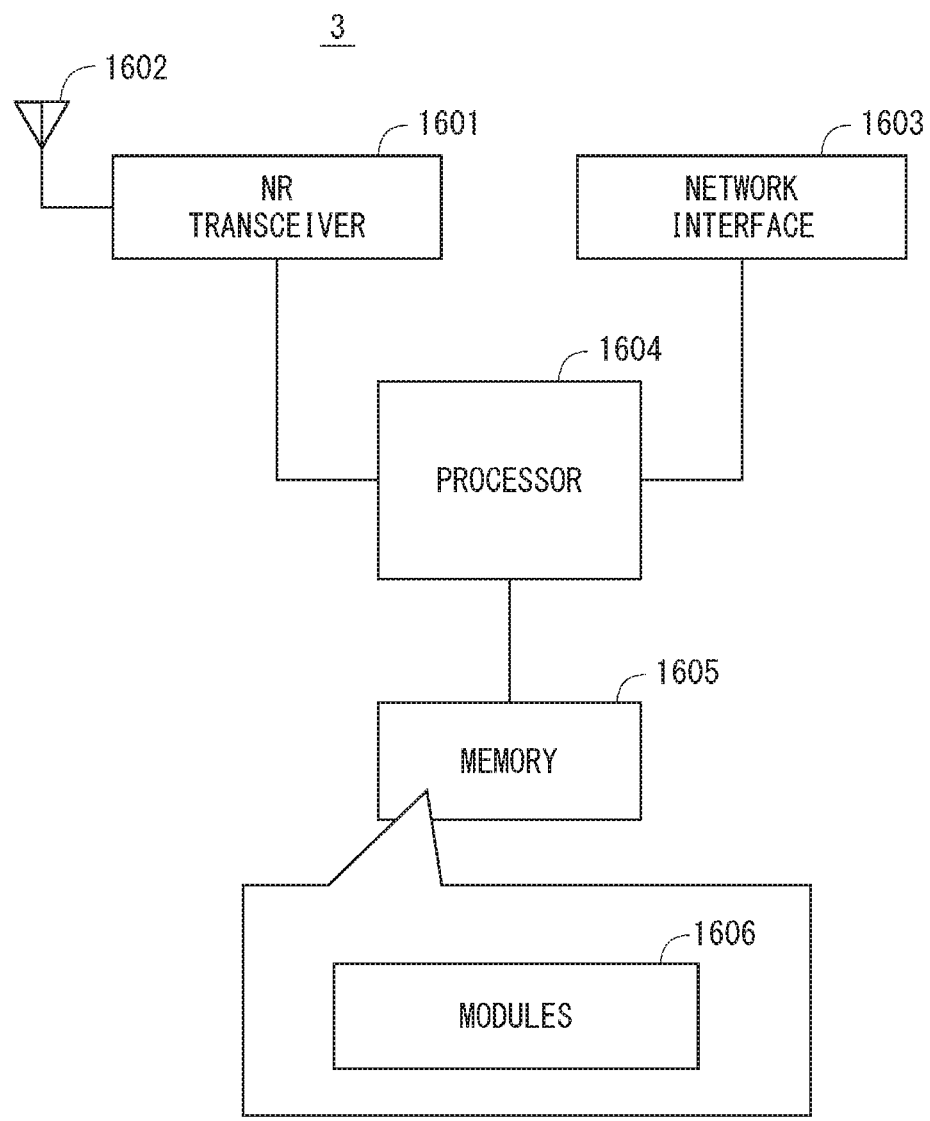
FIG. 16 is a block diagram showing a configuration example of a base station according to some embodiments.

FIG. 16 is a block diagram showing a configuration example of the NR NB 3 according to the above-described embodiments. As shown in FIG. 16, the NR NB 3 includes a New Radio (NR) transceiver 1601, a network interface 1603, a processor 1604, and a memory 1605. The NR transceiver 1601 performs analog RF signal processing to communicate with UEs that support the NG RAT, including the UE 1. The NR transceiver 1601 may include a plurality of transceivers. The NR transceiver 1601 is connected to an antenna 1602 and the processor 1604. The NR transceiver 1601 receives modulated symbol data from the processor 1604, generates a transmission RF signal, and supplies the generated transmission RF signal to the antenna 1602. Further, the NR transceiver 1601 generates a baseband reception signal based on a reception RF signal received by the antenna 1602 and supplies this signal to the processor 1604.

The network interface 1603 is used to communicate with network nodes (e.g., the control node and the transfer node in the NG Core 5). The network interface 1603 may include, for example, a network interface card (NIC) conforming to the IEEE 802.3 series.

The processor 1604 performs digital baseband signal processing (i.e., data-plane processing) and control-plane processing for radio communication. The processor 1604 may include a plurality of processors. The processor 1604 may include, for example, a modem processor (e.g., DSP) that performs the digital baseband signal processing and a protocol-stack-processor (e.g., CPU or MPU) that performs the control-plane processing.

The memory 1605 is composed of a combination of a volatile memory and a nonvolatile memory. The volatile memory is, for example, an SRAM, a DRAM, or a combination thereof. The nonvolatile memory is, for example, an MROM, a PROM, a flash memory, a hard disk drive, or a combination thereof. The memory 1605 may include a storage located separately from the processor 1604. In this case, the processor 1604 may access the memory 1605 through the network interface 1603 or an I/O interface (not shown).

The memory 1605 may store one or more software modules (computer programs) 1606 including instructions and data to perform processing by the NR NB 3 described in the above embodiments. In some implementations, the processor 1604 may load the one or more software modules 1606 from the memory 1605 and execute the loaded software modules, thereby performing the processing of the NR NB 3 described in the above embodiments.

Figure 17:
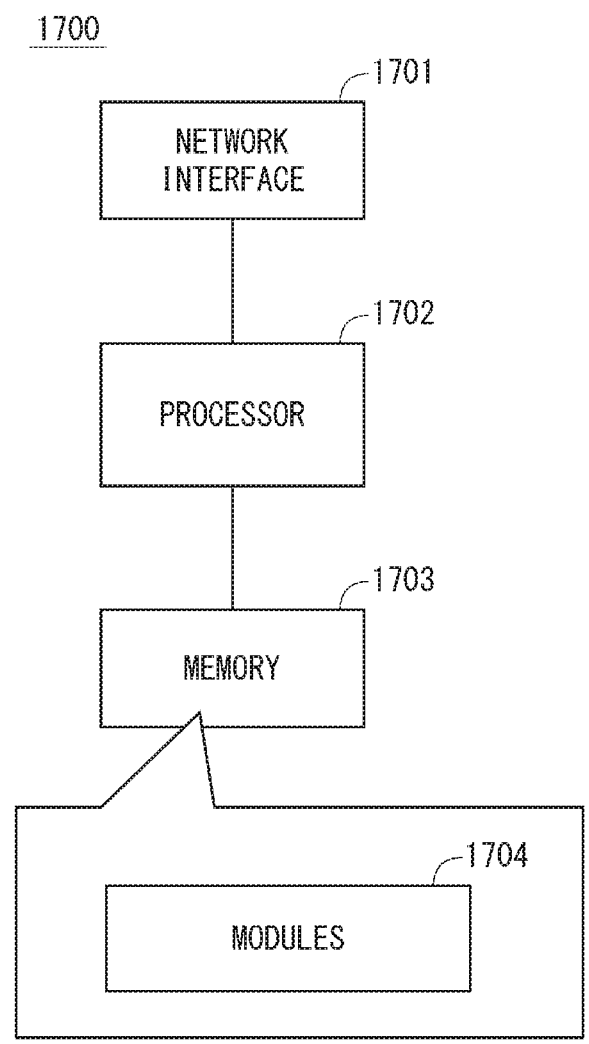
FIG. 17 is a block diagram showing a configuration example of a core network node according to some embodiments.

FIG. 17 is a block diagram showing a configuration example of a core network node 1700 according to the above-described embodiments. The core network node 1700 is, for example, the control node in the NG Core 5 (e.g., Common NFs 51). As shown in FIG. 17, the core network node 1700 includes a network interface 1701, a processor 1702, and a memory 1703. The network interface 1701 is used to communicate with network nodes (e.g., RAN nodes or other core network nodes). The network interface 1701 may include, for example, a network interface card (NIC) conforming to the IEEE 802.3 series.

The processor 1702 may be, for example, a microprocessor, an MPU, or a CPU. The processor 1702 may include a plurality of processors.

The memory 1703 is composed of a combination of a volatile memory and a nonvolatile memory. The volatile memory is, for example, an SRAM, a DRAM, or a combination thereof. The nonvolatile memory is, for example, an MROM, a PROM, a flash memory, a hard disk drive, or a combination thereof. The memory 1703 may include a storage located separately from the processor 1702. In this case, the processor 1702 may access the memory 1703 through the network interface 1701 or an I/O interface (not shown).

The memory 1703 may store one or more software modules (computer programs) 1704 including instructions and data to perform processing by the core network node (e.g., the control node in the NG Core 5) described in the above embodiments. In some implementations, the processor 1702 may load the one or more software modules 1704 from the memory 1703 and execute the loaded software modules, thereby performing the processing of the core network node described in the above embodiments.

As described above with reference to FIGS. 14 to 17, each of the processors included in the UE 1, the LTE eNB 2, the NR NB 3, and the core network nodes in the above embodiments executes one or more programs including a set of instructions to cause a computer to perform an algorithm described above with reference to the drawings. These programs may be stored in various types of non-transitory computer readable media and thereby supplied to computers. The non-transitory computer readable media includes various types of tangible storage media. Examples of the non-transitory computer readable media include a magnetic recording medium (such as a flexible disk, a magnetic tape, and a hard disk drive), a magneto-optic recording medium (such as a magneto-optic disk), a Compact Disc Read Only Memory (CD-ROM), CD-R, CD-R/W, and a semiconductor memory (such as a mask ROM, a Programmable ROM (PROM), an Erasable PROM (EPROM), a flash ROM, and a Random Access Memory (RAM)). These programs may be supplied to computers by using various types of transitory computer readable media. Examples of the transitory computer readable media include an electrical signal, an optical signal, and an electromagnetic wave. The transitory computer readable media can be used to supply programs to a computer through a wired communication line (e.g., electric wires and optical fibers) or a wireless communication line.

Fourth Embodiment

This embodiment provides specific examples of the RRC messages, the control messages between the RAN and the core network (i.e., NG2 messages), and the control messages between the source base station and the target base station (i.e., X3 messages) described in the above embodiments.

FIGS. 18A and 18B show examples of a format of the Mobility from EUTRA command message. In the case of handover from the LTE System to the NG System, the MobilityFromEUTRACommand message includes a purpose set as "handover" and a targetRAT-Type set as "ngutra" corresponding to the NG RAN. Further, the Mobility-FromEUTRACommand message includes targetRAT-MessageContainer. The targetRAT-MessageContainer contains an RRCConnectionReconfigurationNR message generated by the target NR NB 3. Furthermore, when the targetRAT-Type is "OTHERRAN", i.e., is "utra", "geran", or "ngutra", the MobilityFromEUTRACommand message includes nasSecurityParamFromEUTRA.

FIG. 19 shows an example of a format of the Handover Preparation Required message sent from the LTE eNB 2 to the control node in the NG Core 5 (e.g., Common Control plane NF (CCNF)) on the NG2 interface in Step 202 in FIG. 2A. This Handover Preparation Required message includes a Handover Type set as "LTEtoNR" or "eLTE to NR over X3", and also includes a Source to Target Transparent Container. Further, this Handover Preparation Required message includes a CCNF UE NG2AP ID and an eNB UE NG2AP ID. The CCNF UE NG2AP ID is an identifier assigned by the control node (e.g., CCNF) in the NG Core 5 to identify the UE 1 on the NG2 interface. The eNB UE NG2AP ID is an identifier assigned by the LTE eNB 2 to identify the UE 1 on the NG2 interface.

FIGS. 20 to 22 show a couple of examples of a format of the Source NR NB to Target NR NB Transparent Container contained in the Handover Preparation Required message. In the example shown in FIG. 20, the Source NR NB to Target NR NB Transparent Container includes an RRC container and a NextGen (NG)-RABs Information List. The RRC container includes an RRC Handover Preparation Information message. The NG-RABs Information List indicates a list of radio access bearers (e.g., NG-RABs) handed over from the LTE eNB 2 to the NR NB 3. The format shown in FIG. 20 may be used when the NG System including the NR NB 3 and the NG Core 5 is configured to support a bearer-based transfer using a bearer per QoS class and per PDU session. As already described, a bearer may be configured between a pair of Network Functions (NFs), for example between the NR NB 3 and a user plane function in the NG Core 5, or between two user plane functions in the NG Core 5. A bearer in the NG System may be referred to as an NG-EPS-bearer and a radio access bearer in the NG System may be referred to as an NG-RAB.

The Source NR NB to Target NR NB Transparent Container shown in FIG. 21 includes an RRC container and an NG-RABs Information List as in the case of FIG. 20. However, the NG-RABs Information List shown in FIG. 21 includes a Flows Information List indicating a list of packet flows (e.g., PDU flows) mapped to each NG-RAB. The format shown in FIG. 21 may be used when the NG System including the NR NB 3 and the NG Core 5 is configured to support a bearer-based transfer using a bearer per QoS class and per PDU session and to distinguish between packet flows (e.g., PDU flows) in the bearer to perform QoS handling (e.g., discard of packets) on a per-data-flow basis (e.g., on a per-PDU-flow basis).

A Source NR NB to Target NR NB Transparent Container shown in FIG. 22 may include either or both of a Sessions Information List and an NG-RABs Information List. The format shown in FIG. 22 may be used when the NG System including the NR NB 3 and the NG Core 5 supports both the bearer-based transfer and the flow-based transfer. Further, the format shown in FIG. 22 may be used when the NG System including the NR NB 3 and the NG Core 5 supports only the flow-based transfer.

FIG. 23 shows an example of a format of the IRAT Handover Request message sent from the NG Core 5 to the NR NB 3 on the NG2 interface in Step 203 of FIG. 2A. This IRAT Handover Request message includes a CCNF UE NG2AP ID. The CCNF UE NG2AP ID is an identifier assigned by the control node (CCNF) in the NG Core 5 to identify the UE 1 on the NG2 interface. Note that the CCNF is merely an example. That is, names of other control plane network functions or nodes (e.g., CNF, CPF, SMF, and MMF) may be used instead of the CCNF. This IRAT Handover Request message further includes a Security Context and NAS Security Parameters to NG-UTRAN. The Security Context indicates, for example, a Next Hop parameter (NH) and a Next Hop Chaining Counter parameter (NCC). The NAS Security Parameters to NG-UTRAN are included in the IRAT Handover Request message in the case of handover from the E-UTRAN to the NG RAN (NG-UTRAN). The Security Context and the NAS Security Parameters to NG-UTRAN may be configured per network slice.

Further, in the example shown in FIG. 23, the IRAT Handover Request message includes an NG-RABs To Be Setup List. The NG-RABs To Be Setup List indicates a list of radio access bearers (e.g., NG-RABs) that should be set up in the target NR NB 3. The format shown in FIG. 23 may be used when the NG System including the NR NB 3 and the NG Core 5 is configured to support a bearer-based transfer using a bearer per QoS class and per PDU session.

FIG. 24 shows a modified example of the format of the IRAT Handover Request message. In the example shown in FIG. 24, the IRAT Handover Request message includes an NG-RABs To Be Setup List as in the case of the example shown in FIG. 23. However, the NG-RABs To Be Setup List shown in FIG. 24 includes a Flows Information List indicating a list of packet flows (e.g., PDU flows) mapped to each NG-RAB. The format shown in FIG. 24 may be used when the NG System including the NR NB 3 and the NG Core 5 is configured to support a bearer-based transfer using a bearer per QoS class and per PDU session and to distinguish between packet flows (e.g., PDU flows) in the bearer to perform QoS handling (e.g., discard of packets) on a per-data-flow basis (e.g., on a per-PDU-flow basis).

FIG. 25 shows another modified example of the format of the IRAT Handover Request message. The IRAT Handover Request message shown in FIG. 25 may include either or both of a Session To Be Setup List and a NG-RABs To Be Setup List. The Session To Be Setup List includes information about one or more sessions of the UE 1 to be handed over. For example, the Session To Be Setup List includes Slice Information per session. The Slice Information shown in FIG. 25 corresponds to the slice information described in the above embodiments. Further, the Session To Be Setup List includes a Session Endpoint Identifier (SEID) per session. The format shown in FIG. 25 may be used when the NG System including the NR NB 3 and the NG Core 5 supports both the bearer-based transfer and the flow-based transfer. Further, the format shown in FIG. 25 may be used when the NG System including the NR NB 3 and the NG Core 5 supports only the flow-based transfer.

FIG. 26 shows an example of a format of the Slice Information. As described in detail in the first embodiment, the Slice Information includes an identifier of a network slice determined (or selected) for the UE 1 (i.e., Network Slice Instance ID) and an identifier of a network function or a node associated with this network slice (i.e., Network Function ID). The Slice Information may include type information of the network slice (i.e., Multi-Dimensional Descriptor). Further, the Slice Information may include a Mobility Class or a Session Class or both.

FIG. 27 shows an example of a format of the Session Endpoint ID. As described in detail in the first embodiment, the Session Endpoint ID may be a GTP-TEID, a GRE-TEID, or an identifier of a network function or a node (NF ID).

FIG. 28 shows an example of a format of the X3AP: NR Handover Command message sent from the target NR NB 3 to the source LTE eNB on the direct inter-base-station interface 101 (X3 interface) in Step 204 of FIG. 2A. The NR Handover Command message may be referred to as a Handover Acceptance message. This NR Handover Command message includes a Target to Source Transparent Container. The Target to Source Transparent Container contains radio resource configuration information (e.g., radio parameters) generated by the target NR NB 3. As shown in FIG. 29, the Target to Source Transparent Container may include an RRC Container containing an RRC NG-UTRA Handover Command message. Further, in the example shown in FIG. 28, the NR Handover Command message includes an NG-RABs Admitted List. The NG-RABs Admitted List indicates a list of radio access bearers (NG-RABs), resources for which have been prepared in the target cell.

FIG. 30 shows an example of a format of the Handover Preparation Required message sent from the LTE eNB 2 to the control node in the NG Core 5 (e.g., Common Control plane NF (CCNF)) on the NG2 interface in Step 302 in FIG. 3A. The format shown in FIG. 30 differs from the format shown in FIG. 19 in that it does not include a Source to Target Transparent Container.

FIG. 31 shows an example of a format of the Handover Preparation Response message sent from the control node in the NG Core 5 (e.g., Common Control plane NF (CCNF)) to the LTE eNB 2 on the NG2 interface in Step 303 in FIG. 3A. This Handover Preparation Response message includes core network context information (i.e., NG Core Context). The NG Core Context is included in the Handover Preparation Response message in the case of a handover from the E-UTRAN to the NG RAN (NG-UTRAN). The NG Core Context may be information transparent to the source LTE eNB 2, or may be sent by the NG Core 5 as information that the source LTE eNB 2 can recognize (or decode).

FIG. 32 shows an example of a format of the NG Core Context. As already described, the NG Core Context may include either or both of core network information (NG Core Information) and security-related information. The NG Core Information includes, for example, slice information and flow information (or PDU session information). The security-related information includes NAS security configuration information (e.g., NAS Security Parameters to NG-UTRAN). The security-related information may be configured per slice. In other words, the security-related information or the NAS security configuration information (e.g., NAS Security Parameters to NG-UTRAN) may include one or both of a security key and a security algorithm for each slice.

A format of the Slice Information included in the NG Core Context may be similar to that shown in FIG. 26. FIG. 33 shows an example of a format of the Flow Information included in the NG Core Context. As described above in detail in the first embodiment, the flow information includes information (e.g., PDU session Information List) about at least one session (i.e., PDU session(s)) established in the NG system to transfer at least one packet flow (i.e., PDU flow(s)) of the UE 1. The flow information includes a session identifier (e.g., PDU Session ID), and also includes address (Transport Layer Address) and uplink (UL) Session Endpoint ID (SIED) of a transfer node in the NG Core 5. A format of the Session Endpoint ID may be similar to that shown in FIG. 27.

The Flow Information shown in FIG. 33 further includes an NE-RAB ID. The NextGen E-RAB (NE-RAB) is an E-RAB set up between the UE and a User-plane Function (e.g., CUNF) in the NG Core 5 through an eLTE eNB which is enhanced to support interfaces with the NG Core.

FIG. 34 shows an example of a format of the X3AP: NR Handover Request message sent from the source LTE eNB to the target NR NB 3 on the direct inter-base-station interface 101 (X3 interface) in Step 304 in FIG. 3A. This NR Handover Request message includes an identifier (i.e., Globally Unique CNF ID (GUCNFI)) of the control node (Common NF (CNF)) in the NG Core 5. This NR Handover Request message further includes an NG Core Context send from the NG Core 5 to the source LTE eNB. Furthermore, the NR Handover Request message includes UE Context Information.

FIG. 35 shows an example of a format of the UE Context Information. In the example shown in FIG. 35, the UE Context Information includes an NE-RABs To Be Setup List. The NE-RABs To Be Setup List indicates a list of radio access bearers (NE-RABs) that should be set up in the target NR NB 3. The format shown in FIG. 35 may be used when the NG System including the NR NB 3 and the NG Core 5 is configured to support a bearer-based transfer using a bearer per QoS class and per PDU session.

The UE Context Information shown in FIG. 35 further includes an RRC Context. The RRC Context includes a RRC Handover Preparation Information message. The RRC Handover Preparation Information message corresponds to the handover preparation information described in the first embodiment.

FIG. 36 shows an example of a format of an X3AP: NR Handover Request Acknowledge message sent from the target NR NB 3 to the source LTE eNB on the direct inter-base-station interface 101 (X3 interface) in Step 305 in FIG. 3A. This NR Handover Command message includes a Target to Source Transparent Container. The Target to Source Transparent Container includes radio resource configuration information (e.g., radio parameters) generated by the target NR NB 3. As shown in FIG. 29, the Target to Source Transparent Container may include an RRC Container containing an RRC NG-UTRA Handover Command message. Further, in the example shown in FIG. 36, the NR Handover Request Acknowledge message includes an NE-RABs Admitted List. The NE-RABs Admitted List indicates a list of radio access bearers (NE-RABs), resources for which have been prepared in the target cell.

Other Embodiments

Each of the above embodiments may be used individually, or two or more of the embodiments may be appropriately combined with one another.

The above embodiments have been described based on a configuration example of a network in which both the LTE eNBs 2 and the NR NB 3 are connected to the NG Core 5. Alternatively, the LTE eNB 2 may be connected to an EPC (i.e., enhanced EPC (eEPC)) that is enhanced to perform interworking with the NG System. An (e)MME in the eEPC may be connected to a control node (i.e., CPF node) in the NG Core 5 through a control-plane interface. Further, one or more nodes in the eEPC may be connected to one or more data nodes (i.e., UPF nodes) in the NG Core 5 through a user-plane interface.

The E-URAN and the NG RAN described in the above embodiments may be implemented based on a Cloud Radio Access Network (C-RAN) concept. The C-RAN is also referred to as a Centralized RAN. In this case, processes and operations performed by each of the LTE eNB 2 and the NR NB 3 described in the above embodiments may be provided by a Digital Unit (DU) included in the C-RAN architecture, or by a combination of a DU and a Radio Unit (RU). The DU is also referred to as a Baseband Unit (BBU) or a Central Unit (CU). The RU is also referred to as a Remote Radio Head (RRH), a Remote Radio Equipment (RRE), or a Distributed Unit (DU). The DU and the RU may provide the functions of the AS layer provided in the entire RAN while dividing them into functions provided by the DU and those provided by the RU. For example, the DU and the RU may be provided by a configuration in which a part of the AS layer (e.g., layer 2/layer 3 or their sublayers, or a part of the function of the layer) is disposed in the DU and the remaining layers (or the remaining part of the layer) is disposed in the RU. That is, processes and operations performed by each of the LTE eNB 2 and the NR NB 3 described in the above embodiments may be provided by one or more radio stations (or RAN nodes).

The NR NB 3 may be configured to dynamically change the allocation of the AS layers or their functions to the DU and the RU. In other words, the NR NB 3 may be configured to dynamically change a split point of the AS layers or their functions between the DU and the RU. For example, the NR NB 3 may be configured to dynamically select one of a plurality of different functional split options. In this case, in the HO procedure from LTE to NR in the above embodiments, the NG Core 5 may determine allocations of the AS layers or their functions to the DU and the RU of the NR NB 3 in response to receiving a Handover Preparation Required message or an NR Path Switch Request message. Alternatively, the NR NB 3 may determine allocations of the AS layers or their functions to the DU and the RU of the NR NB 3. The NG Core 5 or the NR NB 3 may select one functional split option to be applied to the NR NB 3 from among a plurality of predetermined functional split options.

In an example, the functional split option to be applied to the NR NB 3 may be determined (or selected) based on an E-RAB QoS information IE, e.g., a QCI or an ARP, or flow information included in the Handover Preparation Required message or the NR Path Switch Request message. Additionally or alternatively, the functional split option to be applied to the NR NB 3 may be determined based on a slice created by the NG Core 5 or the NR NB 3, or information about this slice (i.e., slice information). Additionally or alternatively, the functional split option to be applied to the NR NB 3 may be determined based on network slice assistance information included in NAS information transmitted from the UE 1.

Further, in the above embodiments, a UE identifier may be included in a message transferred between nodes. This UE identifier is used in the handover procedure to identify the UE 1 to be handed over.

More specifically, this UE identifier may be a UE identifier used on an interface (e.g., Sn interface or an NG2 interface, n is an integer) between the NR NB 3 and a control node that corresponds to an MME and is included in the NG Core 5. This UE identifier may be expressed as an NR NB UE SnAP ID (NR NB UE Sn Application Protocol Identifier) or an NR NB UE NG2AP ID.

Alternatively, this UE identifier may be a UE identifier used on an interface (e.g., Xn interface, n is an integer) between the NR NB 3 and the LTE eNB 2. This UE identifier may be expressed as an NR NB UE XnAP ID.

Alternatively, this UE identifier may be a UE identifier used on an interface (e.g., Sm interface, m is an integer) between an MME in the EPC 4 and a control node that corresponds to the MME and is included in the NG Core 5. This UE identifier may be expressed as an eMME UE SmAP ID.

Alternatively, this UE identifier may be a UE identifier that is used on an interface (e.g., S1 interface, 1 is an integer) between the LTE eNB 2 and a control node that corresponds to an MME and is included in the NG Core 5, and assigned by the control node. This UE identifier may be expressed as an eMME UE S1AP ID.

Further, these UE identifiers may be transferred among nodes during the handover procedure. Note that, Sn, NG2, Sm, S1 and Xn which are used to identify respective interfaces are merely example and may be expressed by different symbols.

Further, the above-described embodiments are merely examples of applications of the technical ideas obtained by the inventors. These technical ideas are not limited to the above-described embodiments and various modifications may be made thereto.

For example, the whole or part of the embodiments disclosed above can be described as, but not limited to, the following supplementary notes.

(Supplementary Note 1)

A target radio access network (RAN) node associated with a second network, comprising:
   at least one memory; and
   at least one processor coupled to the at least one memory and configured to:
      receive, directly from a core network, core network context information about a handover of a radio terminal from a first network to the second network;
      control communication of the radio terminal based on the core network context information; and
      transfer, in response to receiving the core network context information, a handover signaling message on a direct interface with a source RAN node associated with the first network, wherein
   the core network context information includes at least one of flow information, slice information, and security-related information,
   the slice information relates to a network slice in the second network to which the radio terminal is to be connected,
   the flow information relates to at least one session to be established in the second network in order to transfer at least one packet flow of the radio terminal, and
   the security-related information includes Non-Access Stratum (NAS) security configuration information.

(Supplementary Note 2)

The target RAN node described in Supplementary note 1, wherein
   the first network is a bearer-based network and the second networks is a bearer-less network,
   the core network context information includes the flow information,
   the at least one processor is configured to send to the source RAN node, on the direct interface, the handover signaling message containing a transparent container, and
   the transparent container contains at least one of: a predetermined parameter included in the flow information; and radio resource configuration information generated based on the flow information, and the transparent container is to be forwarded to the radio terminal by the source RAN node.

(Supplementary Note 3)

The target RAN node described in Supplementary note 2, wherein the flow information includes a flow identifier and a flow QoS parameter in respect of each packet flow of the radio terminal.

(Supplementary Note 4)

The target RAN node described in any one of Supplementary notes 1 to 3, wherein
   the core network context information includes the slice information,
   the at least one processor is configured to send to the source RAN node, on the direct interface, the handover signaling message containing a transparent container, and
   the transparent container contains at least one of: a predetermined parameter included in the slice information; and radio resource configuration information generated based on the slice information, and the transparent container is to be forwarded to the radio terminal by the source RAN node.

(Supplementary Note 5)

The target RAN node described in Supplementary note 4, wherein the slice information includes: (a) identification information of the network slice selected for the radio terminal; (b) type information of the network slice selected for the radio terminal; or (c) identification information of a network node or a network function associated with the network slice selected for the radio terminal; or any combination thereof.

(Supplementary Note 6)

The target RAN node described in Supplementary note 4 or 5, wherein the slice information includes at least one of a mobility class and a session class that are supported by the network slice selected for the radio terminal.

(Supplementary Note 7)

The target RAN node described in any one of Supplementary notes 4 to 6, wherein the at least one processor is configured to determine, based on the slice information, whether to accept a bearer or flow of the radio terminal on a per-bearer or per-flow basis.

(Supplementary Note 8)

The target RAN node described in any one of Supplementary notes 4 to 7, wherein the at least one processor is configured to determine, based on the slice information, whether it is possible to accept each network slice.

(Supplementary Note 9)

The target RAN node described in any one of Supplementary notes 1 to 8, wherein
   the core network context information includes the security-related information including the Non-Access Stratum (NAS) security configuration information and a security parameter used by the target RAN node to derive an Access Stratum (AS) security key,
   the at least one processor is configured to send to the source RAN node, on the direct interface, the handover signaling message containing a transparent container, and
   the transparent container contains the NAS security configuration information.

(Supplementary Note 10)

A source radio access network (RAN) node associated with a first network, comprising:
   at least one memory; and
   at least one processor coupled to the at least one memory and configured to:
      determine a handover of a radio terminal from the first network to a second network;
      request, upon determining the handover, a core network to transmit core network context information, and receive the core network context information from the core network; and
      send a handover request message containing the core network context information to a target RAN node on a direct interface in order to start the handover, wherein
   the core network context information includes at least one of flow information, slice information, and security-related information,
   the slice information relates to a network slice in the second network to which the radio terminal is to be connected,
   the flow information relates to at least one session to be established in the second network in order to transfer at least one packet flow of the radio terminal, and
   the security-related information includes Non-Access Stratum (NAS) security configuration information.

(Supplementary Note 11)

The source RAN node described in Supplementary note 10, wherein the first network is a bearer-based network and the second networks is a bearer-less network, the core network context information includes the flow information, the at least one processor is configured to receive from the target RAN node, on the direct interface, a handover request acknowledge message containing a transparent container, the at least one processor is configured to transmit, to the radio terminal, a mobility command message containing the transparent container and indicating the handover to the second network, and the transparent container contains at least one of: a predetermined parameter included in the flow information; and radio resource configuration information generated by the target RAN node based on the flow information.

(Supplementary Note 12)

The source RAN node described in Supplementary note 11, wherein the flow information includes a flow identifier and a flow QoS parameter in respect of each packet flow of the radio terminal.

(Supplementary Note 13)

The source RAN node described in any one of Supplementary notes 10 to 12, wherein the core network context information includes the slice information, the at least one processor is configured to receive from the target RAN node, on the direct interface, a handover request acknowledge message containing a transparent container, the at least one processor is configured to transmit, to the radio terminal, a mobility command message containing the transparent container and indicating the handover to the second network, and the transparent container contains at least one of: a predetermined parameter included in the slice information; and radio resource configuration information generated by the target RAN node based on the slice information.

(Supplementary Note 14)

The source RAN node described in Supplementary note 12, wherein the slice information includes: (a) identification information of the network slice selected for the radio terminal; (b) type information of the network slice selected for the radio terminal; or (c) identification information of a network node or a network function associated with the network slice selected for the radio terminal; or any combination thereof.

(Supplementary Note 15)

The source RAN node described in Supplementary note 13 or 14, wherein the slice information includes at least one of a mobility class and a session class that are supported by the network slice selected for the radio terminal.

(Supplementary Note 16)

The source RAN node described in any one of Supplementary notes 10 to 15, wherein the core network context information includes the security-related information including the Non-Access Stratum (NAS) security configuration information and a security parameter used by the target RAN node to derive an Access Stratum (AS) security key, the at least one processor is configured to receive from the target RAN node, on the direct interface, a handover request acknowledge message containing a transparent container, the at least one processor is configured to transmit, to the radio terminal, a mobility command message containing the transparent container and indicating a handover to the second network, and the transparent container contains the NAS security configuration information.

(Supplementary Note 17)

A method in a target radio access network (RAN) node associated with a second network, the method comprising:

receiving, directly from a core network, core network context information about a handover of a radio terminal from a first network to the second network;

controlling communication of the radio terminal based on the core network context information; and transferring, in response to receiving the core network context information, a handover signaling message on a direct interface with a source RAN node associated with the first network, wherein the core network context information includes at least one of flow information, slice information, and security-related information, the slice information relates to a network slice in the second network to which the radio terminal is to be connected, the flow information relates to at least one session to be established in the second network in order to transfer at least one packet flow of the radio terminal, and the security-related information includes Non-Access Stratum (NAS) security configuration information.

(Supplementary Note 18)

A method in a source radio access network (RAN) node associated with a first network, the method comprising:

determining a handover of a radio terminal from the first network to a second network;

requesting, upon determining the handover, a core network to transmit core network context information, and receiving the core network context information from the core network; and sending a handover request message containing the core network context information to a target RAN node on a direct interface in order to start the handover, wherein the core network context information includes at least one of flow information, slice information, and security-related information, the slice information relates to a network slice in the second network to which the radio terminal is to be connected, the flow information relates to at least one session to be established in the second network in order to transfer at least one packet flow of the radio terminal, and the security-related information includes Non-Access Stratum (NAS) security configuration information.

(Supplementary Note 19)

A program for causing a computer to perform a method in a target radio access network (RAN) node associated with a second network, wherein the method comprises:

receiving, directly from a core network, core network context information about a handover of a radio terminal from a first network to the second network;

controlling communication of the radio terminal based on the core network context information; and transferring, in response to receiving the core network context information, a handover signaling message on a direct interface with a source RAN node associated with the first network, the core network context information includes at least one of flow information, slice information, and security-related information, the slice information relates to a network slice in the second network to which the radio terminal is to be connected, the flow information relates to at least one session to be established in the second network in order to transfer at least one packet flow of the radio terminal, and the security-related information includes Non-Access Stratum (NAS) security configuration information.

(Supplementary Note 20)

A program for causing a computer to perform a method in a source radio access network (RAN) node associated with a first network, wherein the method comprises:

determining a handover of a radio terminal from the first network to a second network;

requesting, upon determining the handover, a core network to transmit core network context information, and receiving the core network context information from the core network; and sending a handover request message containing the core network context information to a target RAN node on a direct interface in order to start the handover, the core network context information includes at least one of flow information, slice information, and security-related information, the slice information relates to a network slice in the second network to which the radio terminal is to be connected, the flow information relates to at least one session to be established in the second network in order to transfer at least one packet flow of the radio terminal, and the security-related information includes Non-Access Stratum (NAS) security configuration information.

(Supplementary Note 21)

A radio terminal comprising:

at least one memory; and at least one processor coupled to the at least one memory and configured to, during handover from a first network to which the radio terminal is connected to a second network, receive a handover-related message from a radio access network (RAN) node of the first network, the handover-related message containing at least one of slice information about a network slice in the second network and radio resource configuration information based on the network slice in the second network.

(Supplementary Note 22)

The radio terminal described in Supplementary note 21, wherein the at least one processor is configured to:

receive from the RAN node a mobility command message indicating the handover from the first network to the second network, the mobility command message containing the radio resource configuration information generated by a target RAN node associated with the second network, the radio resource configuration information being needed by the radio terminal to establish a radio connection associated with the network slice, which is included in the second network and to which the radio terminal is to be connected; and establish the radio connection with the target RAN node associated with the second network by using the radio resource configuration information.

(Supplementary Note 23)

The radio terminal described in Supplementary note 21 or 22, wherein the handover-related message further includes at least one of flow information and radio resource configuration information derived from the flow information, the flow information relating to at least one session to be established in the second network in order to transfer at least one packet flow of the radio terminal.

(Supplementary Note 24)

A core network node comprising:

at least one memory; and at least one processor coupled to the at least one memory and configured to, during handover of a radio terminal from a first network to a second network, send, to a target radio access network (RAN) node associated with the second network, slice information about a network slice which is included in the second network and to which the radio terminal is to be connected.

(Supplementary Note 25)

The core network node described in Supplementary note 24, wherein the at least one processor is further configured to, during handover of the radio terminal from the first network to the second network, send flow information to the target RAN node, the flow information relating to at least one session to be established in the second network in order to transfer at least one packet flow of the radio terminal.

(Supplementary Note 26)

The core network node described in Supplementary note 24 or 25, wherein the at least one processor is configured to send the slice information to the target RAN node in a handover preparation phase before the source RAN node issues a handover instruction to the radio terminal.

REFERENCE SIGNS LIST

1 User Equipment (UE)
2 LTE eNodeB (eNB)
3 New Radio (NR) NodeB (NB)
5 NextGen (NG) Core
1405 BASEBAND PROCESSOR
1406 APPLICATION PROCESSOR
1408 MEMORY
1504 PROCESSOR
1505 MEMORY
1604 PROCESSOR
1605 MEMORY
1702 PROCESSOR
1703 MEMORY

The invention claimed is:

1. A method in a target radio access network (RAN) node associated with a second network, the method comprising:

receiving, directly from a core network, core network context information about a handover of a radio terminal from a first network to the second network;

controlling communication of the radio terminal based on the core network context information; and transferring, in response to receiving the core network context information, a handover signaling message on a direct interface between the target RAN node and a source RAN node associated with the first network, wherein the core network context information includes slice information relating to a network slice, the network slice being included in the core network, and the radio terminal being configured to be connected to the network slice.

2. The method according to claim 1, wherein the first network is a bearer-based network and the second network is a bearer-less network, wherein the core network context information further includes flow information relating to at least one session to be established in the second network in order to transfer at least one packet flow of the radio terminal, wherein said transferring comprises sending to the source RAN node, on the direct interface, the handover signaling message containing a transparent container, wherein the transparent container contains at least one of:
  a predetermined parameter included in the flow information; and
  radio resource configuration information generated based on the flow information, and
wherein the transparent container is to be forwarded to the radio terminal by the source RAN node.

3. The method according to claim 2, wherein the flow information includes a flow identifier and a flow QoS parameter in respect of each packet flow of the radio terminal.

4. The method according to claim 1, wherein said transferring comprises sending to the source RAN node, on the direct interface, the handover signaling message containing a transparent container,
wherein the transparent container contains at least one of:
  a predetermined parameter included in the slice information; and
  radio resource configuration information generated based on the slice information, and
wherein the transparent container is to be forwarded to the radio terminal by the source RAN node.

5. The method according to claim 4, wherein the slice information includes: (a) identification information of the network slice selected for the radio terminal; (b) type information of the network slice selected for the radio terminal; or (c) identification information of a network node or a network function associated with the network slice selected for the radio terminal; or any combination thereof.

6. The method according to claim 4, wherein the slice information includes at least one of a mobility class and a session class that are supported by the network slice selected for the radio terminal.

7. The method according to claim 4, further comprising determining, based on the slice information, whether to accept a bearer or flow of the radio terminal on a per-bearer or per-flow basis.

8. The method according to claim 4, further comprising determining, based on the slice information, whether it is possible to accept each network slice.

9. The method according to claim 1, wherein the core network context information further includes security related information including Non-Access Stratum (NAS) security configuration information and a security parameter used by the target RAN node to derive an Access Stratum (AS) security key,
wherein said transferring comprises sending to the source RAN node, on the direct interface, the handover signaling message containing a transparent container, and
wherein the transparent container contains the NAS security configuration information.

10. A method in a source radio access network (RAN) node associated with a first network, the method comprising:
  receiving a measurement report from a radio terminal;
  determining a handover of the radio terminal from the first network to a second network;
  requesting, upon determining the handover, a core network to transmit core network context information, and receive the core network context information from the core network; and
  sending a handover request message containing the core network context information to a target RAN node on a direct interface between the source RAN node and the target RAN node in order to start the handover,
wherein the core network context information includes at least one of flow information, slice information, and security-related information,
wherein the slice information relates to a network slice, the network slice being included in the second network, and the radio terminal being configured to be connected to the network slice,
wherein the flow information relates to at least one session to be established in the second network in order to transfer at least one packet flow of the radio terminal, and
wherein the security-related information includes Non-Access Stratum (NAS) security configuration information.

11. The method according to claim 10, wherein the first network is a bearer-based network and the second networks is a bearer-less network,
wherein the core network context information includes the flow information,
wherein the method further comprises:
  receiving from the target RAN node, on the direct interface, a handover request acknowledge message containing a transparent container; and
  transmitting, to the radio terminal, a mobility command message containing the transparent container and indicating the handover to the second network, and
wherein the transparent container contains at least one of:
  a predetermined parameter included in the flow information; and
  radio resource configuration information generated by the target RAN node based on the flow information.

12. The method according to claim 11, wherein the flow information includes a flow identifier and a flow QoS parameter in respect of each packet flow of the radio terminal.

13. The method according to claim 10, wherein the core network context information includes the slice information,
wherein the method further comprises:
  receiving from the target RAN node, on the direct interface, a handover request acknowledge message containing a transparent container; and
  transmitting, to the radio terminal, a mobility command message containing the transparent container and indicating the handover to the second network, and
wherein the transparent container contains at least one of:
  a predetermined parameter included in the slice information; and
  radio resource configuration information generated by the target RAN node based on the slice information.

14. The method according to claim 12, wherein the slice information includes: (a) identification information of the network slice selected for the radio terminal; (b) type information of the network slice selected for the radio terminal; or (c) identification information of a network node or a network function associated with the network slice selected for the radio terminal; or any combination thereof.

15. The method according to claim 13, wherein the slice information includes at least one of a mobility class and a session class that are supported by the network slice selected for the radio terminal.

16. The method according to claim 10, wherein the core network context information includes the security-related information including the Non-Access Stratum (NAS) security configuration information and a security parameter used by the target RAN node to derive an Access Stratum (AS) security key,
wherein the method further comprises:
  receiving from the target RAN node, on the direct interface, a handover request acknowledge message containing a transparent container; and transmitting, to the radio terminal, a mobility command message containing the transparent container and indicating a handover to the second network, and
wherein the transparent container contains the NAS security configuration information.

17. The method according to claim 10, wherein the core network context information includes the slice information.

* * * * *